(12) United States Patent
Richard et al.

(10) Patent No.: US 12,269,903 B2
(45) Date of Patent: Apr. 8, 2025

(54) COMPOSITIONS COMPRISING GLUCOSE AND HEMICELLULOSE AND THEIR USE

(71) Applicant: Comet Biorefining Inc., Sarnia (CA)

(72) Inventors: Andrew Richard, London (CA); Dennis D'Agostino, Waterdown (CA); Richard Lloyd Troyer, Jr., Glen Ellyn, IL (US)

(73) Assignee: Comet Biorefining Inc., London (CA)

( * ) Notice: Subject to any disclaimer, the term of this patent is extended or adjusted under 35 U.S.C. 154(b) by 117 days.

(21) Appl. No.: 17/985,583

(22) Filed: Nov. 11, 2022

(65) Prior Publication Data

US 2023/0167202 A1 Jun. 1, 2023

Related U.S. Application Data

(60) Continuation of application No. 16/783,622, filed on Feb. 6, 2020, now Pat. No. 11,525,016, which is a division of application No. 16/409,335, filed on May 10, 2019, now Pat. No. 10,633,461.

(60) Provisional application No. 62/669,684, filed on May 10, 2018.

(51) Int. Cl.
*C08B 37/00* (2006.01)
*A23L 27/30* (2016.01)
*A23L 29/262* (2016.01)
*A23L 29/30* (2016.01)
*C08L 5/14* (2006.01)

(52) U.S. Cl.
CPC .......... *C08B 37/0003* (2013.01); *A23L 27/33* (2016.08); *A23L 29/262* (2016.08); *A23L 29/30* (2016.08); *C08B 37/0057* (2013.01); *C08L 5/14* (2013.01); *A23V 2002/00* (2013.01); *A23V 2200/132* (2013.01); *A23V 2200/15* (2013.01); *A23V 2200/16* (2013.01); *A23V 2200/328* (2013.01); *A23V 2200/332* (2013.01); *A23V 2250/51088* (2013.01); *A23V 2250/61* (2013.01)

(58) Field of Classification Search
CPC ... C08B 37/0057; C08B 37/0003; C08L 5/14; A23L 27/33; A23L 29/262
See application file for complete search history.

(56) References Cited

U.S. PATENT DOCUMENTS

| | | |
|---|---|---|
| 4,025,389 A | 5/1977 | Poulsen et al. |
| 5,560,914 A | 10/1996 | Ghoneum et al. |
| 5,902,782 A | 5/1999 | Hall et al. |
| 5,967,157 A | 10/1999 | Chatterjee et al. |
| 6,090,595 A | 7/2000 | Foody et al. |
| 6,632,448 B2 | 10/2003 | Tanaka et al. |
| 6,692,578 B2 | 2/2004 | Schmidt et al. |
| 7,427,643 B2 | 9/2008 | Gatenholm et al. |
| 7,449,209 B2 | 11/2008 | Dreese et al. |
| 7,670,678 B2 | 3/2010 | Phan |
| 7,709,033 B2 | 5/2010 | Kvist et al. |
| 7,807,419 B2 | 10/2010 | Hennessey et al. |
| 7,998,713 B2 | 8/2011 | Dunson, Jr. et al. |
| 8,017,820 B2 | 9/2011 | Foody et al. |
| 8,022,260 B2 | 9/2011 | O'Connor et al. |
| 8,148,495 B2 | 4/2012 | Harris et al. |
| 8,211,483 B2 | 7/2012 | Lee et al. |
| 8,227,448 B2 | 7/2012 | Van Laere et al. |
| 8,318,458 B2 | 11/2012 | Harris et al. |
| 8,460,898 B2 | 6/2013 | Diner et al. |
| 8,465,788 B2 | 6/2013 | Ekhart et al. |
| 8,623,402 B2 | 1/2014 | Delcour |
| 8,658,405 B2 | 2/2014 | Johal et al. |
| 8,685,690 B2 | 4/2014 | Yang et al. |
| 8,741,376 B2 | 6/2014 | Broekaert et al. |
| 8,778,639 B1 | 7/2014 | Spodsberg |
| 8,809,033 B2 | 8/2014 | Sweeney et al. |
| 8,815,561 B2 | 8/2014 | Liu et al. |
| 8,877,474 B2 | 11/2014 | Yang et al. |
| 8,894,771 B2 | 11/2014 | Floyd et al. |
| 8,927,038 B2 | 1/2015 | Broekaert et al. |
| 8,962,288 B2 | 2/2015 | Quinlan et al. |
| 9,061,046 B2 | 6/2015 | Broekaert et al. |
| 9,080,165 B2 | 7/2015 | Fidantsef et al. |
| 9,109,213 B2 | 8/2015 | Schooneveld-Bergmans et al. |
| 9,121,013 B2 | 9/2015 | Schooneveld-Bergmans et al. |
| 9,150,936 B2 | 10/2015 | Dottori et al. |
| 9,163,223 B2 | 10/2015 | Schooneveld-Bergmans et al. |
| 9,175,050 B2 | 11/2015 | Schooneveld-Bergmans et al. |
| 9,175,277 B2 | 11/2015 | McBrayer et al. |
| 9,193,982 B2 | 11/2015 | Sjoede et al. |
| 9,200,302 B2 | 12/2015 | Cotti Comettini et al. |
| 9,260,704 B2 | 2/2016 | Schooneveld-Bergmans et al. |
| 9,303,074 B2 | 4/2016 | Schnorr et al. |

(Continued)

FOREIGN PATENT DOCUMENTS

| | | |
|---|---|---|
| CA | 1175820 | 10/1984 |
| CA | 2615904 | 2/1994 |

(Continued)

OTHER PUBLICATIONS

Sanchez-Bastardo et al., Carbohydrate Polymers, 2017, 160, p. 143-152. (Year: 2017).*

(Continued)

*Primary Examiner* — Jonathan S Lau
(74) *Attorney, Agent, or Firm* — Fish & Richardson P.C.

(57) ABSTRACT

Provided herein are purified hemicellulose compositions, sweetener compositions including purified hemicellulose compositions, as well as methods for making the same. Also provided are uses of the compositions.

15 Claims, 12 Drawing Sheets

(56) References Cited

U.S. PATENT DOCUMENTS

| | | |
|---|---|---|
| 9,353,363 B2 | 5/2016 | Lange et al. |
| 9,365,843 B2 | 6/2016 | Zhang et al. |
| 9,370,193 B2 | 6/2016 | Sorensen et al. |
| 9,410,136 B2 | 8/2016 | Schnorr et al. |
| 9,428,772 B2 | 8/2016 | Hamrick |
| 9,434,788 B2 | 9/2016 | Yadav et al. |
| 9,441,214 B2 | 9/2016 | Schooneveld-Bergmans et al. |
| 9,506,049 B2 | 11/2016 | Tang et al. |
| 9,506,098 B2 | 11/2016 | Cotti Comettini et al. |
| 9,624,481 B2 | 4/2017 | Liu et al. |
| 9,677,060 B2 | 6/2017 | Johansen et al. |
| 9,689,011 B2 | 6/2017 | Ellegård et al. |
| 9,695,433 B2 | 7/2017 | Zhang et al. |
| 9,738,881 B2 | 8/2017 | Los et al. |
| 9,752,168 B2 | 9/2017 | Quinlan et al. |
| 9,752,169 B2 | 9/2017 | Cotti Comettini et al. |
| 9,765,373 B2 | 9/2017 | Schnorr et al. |
| 9,771,568 B2 | 9/2017 | Liu et al. |
| 9,783,860 B2 | 10/2017 | Floyd et al. |
| 9,790,530 B2 | 10/2017 | Shaghasi et al. |
| 9,795,628 B2 | 10/2017 | Hageman |
| 9,797,021 B2 | 10/2017 | Floyd et al. |
| 9,848,626 B2 | 12/2017 | Shen et al. |
| 9,879,294 B2 | 1/2018 | Huang et al. |
| 9,896,707 B2 | 2/2018 | Thompson et al. |
| 9,932,414 B2 | 4/2018 | Quinlan et al. |
| 9,957,491 B2 | 5/2018 | Zhang et al. |
| 9,963,725 B2 | 5/2018 | Lali et al. |
| 9,994,833 B2 | 6/2018 | Liu et al. |
| 10,041,136 B2 | 8/2018 | St. John et al. |
| 10,131,715 B2 | 11/2018 | Hepworth et al. |
| 10,174,351 B2 | 1/2019 | Smits et al. |
| 10,190,103 B2 | 1/2019 | Börjesson et al. |
| 10,207,197 B2 | 2/2019 | Mitchell |
| 10,246,522 B2 | 4/2019 | Hepworth et al. |
| 10,308,921 B2 | 6/2019 | Tang et al. |
| 10,633,461 B2 | 4/2020 | Richard et al. |
| 11,406,120 B2 | 8/2022 | Falck |
| 11,525,016 B2 | 12/2022 | Richard et al. |
| 2002/0037331 A1 | 3/2002 | Hwang et al. |
| 2005/0209122 A1 | 9/2005 | Jorgensen et al. |
| 2008/0227166 A1 | 9/2008 | Allain et al. |
| 2009/0056889 A1 | 3/2009 | Ren et al. |
| 2009/0062232 A1 | 3/2009 | Fujikawa et al. |
| 2010/0035302 A1 | 2/2010 | Broekaert et al. |
| 2010/0298611 A1 | 11/2010 | Parekh et al. |
| 2011/0020498 A1 | 1/2011 | Broekaert et al. |
| 2011/0020873 A1 | 1/2011 | Ren et al. |
| 2011/0111456 A1 | 5/2011 | Medoff |
| 2011/0159554 A1 | 6/2011 | Takahashi et al. |
| 2011/0250645 A1 | 10/2011 | Schiffino et al. |
| 2011/0263004 A1* | 10/2011 | Ilvesniemi .............. D21C 5/00 44/589 |
| 2011/0300586 A1 | 12/2011 | Liu et al. |
| 2012/0015902 A1 | 1/2012 | Broekaert et al. |
| 2012/0111514 A1 | 5/2012 | Dottori et al. |
| 2012/0230955 A1 | 9/2012 | Ekhart et al. |
| 2012/0240921 A1 | 9/2012 | Fukuoka et al. |
| 2013/0004994 A1 | 1/2013 | Hanakawa |
| 2013/0005952 A1 | 1/2013 | Belanger et al. |
| 2013/0029406 A1 | 1/2013 | Dottori et al. |
| 2013/0052713 A1 | 2/2013 | Yang et al. |
| 2013/0059345 A1 | 3/2013 | Kurihara et al. |
| 2013/0244293 A1 | 9/2013 | Balan et al. |
| 2013/0261340 A1 | 10/2013 | Medoff |
| 2014/0038244 A1 | 2/2014 | Chesonis et al. |
| 2014/0093918 A1 | 4/2014 | Zhang et al. |
| 2014/0106418 A1 | 4/2014 | Parekh et al. |
| 2015/0307952 A1 | 10/2015 | Saville |
| 2015/0368372 A1 | 12/2015 | Yadav et al. |
| 2016/0249662 A1 | 9/2016 | Medoff |
| 2017/0369517 A1 | 12/2017 | Shekiro, III et al. |
| 2018/0119188 A1 | 5/2018 | Richard et al. |
| 2019/0345265 A1 | 11/2019 | Richard et al. |
| 2020/0216574 A1 | 7/2020 | Richard et al. |
| 2022/0218735 A1 | 7/2022 | Richard et al. |

FOREIGN PATENT DOCUMENTS

| | | |
|---|---|---|
| CA | 2179970 | 12/1996 |
| CA | 2189899 | 5/1997 |
| CA | 2240035 | 12/1998 |
| CA | 2282094 | 4/2000 |
| CA | 2368872 | 10/2000 |
| CA | 2373936 | 1/2001 |
| CA | 2400336 | 8/2001 |
| CA | 2418726 | 2/2002 |
| CA | 2420064 | 2/2002 |
| CA | 2477196 | 8/2003 |
| CA | 2583256 | 3/2006 |
| CA | 2580226 | 4/2006 |
| CA | 2580228 | 4/2006 |
| CA | 2535246 | 8/2006 |
| CA | 2603645 | 10/2006 |
| CA | 2831082 | 1/2007 |
| CA | 2655035 | 12/2007 |
| CA | 2595484 | 2/2008 |
| CA | 2565433 | 4/2008 |
| CA | 2576317 | 7/2008 |
| CA | 2674534 | 7/2008 |
| CA | 2684007 | 10/2008 |
| CA | 2685177 | 11/2008 |
| CA | 2691524 | 12/2008 |
| CA | 2694245 | 1/2009 |
| CA | 2694875 | 2/2009 |
| CA | 2697962 | 2/2009 |
| CA | 2698641 | 3/2009 |
| CA | 2701862 | 4/2009 |
| CA | 2701949 | 4/2009 |
| CA | 2703085 | 5/2009 |
| CA | 2720177 | 10/2009 |
| CA | 2731983 | 2/2010 |
| CA | 2731350 | 3/2010 |
| CA | 2739451 | 4/2010 |
| CA | 2739704 | 5/2010 |
| CA | 2739709 | 5/2010 |
| CA | 2746783 | 6/2010 |
| CA | 2738886 | 7/2010 |
| CA | 2745508 | 7/2010 |
| CA | 2715458 | 10/2010 |
| CA | 2714946 | 12/2010 |
| CA | 2763588 | 12/2010 |
| CA | 2673134 | 1/2011 |
| CA | 2714937 | 1/2011 |
| CA | 2767290 | 1/2011 |
| CA | 2789199 | 1/2011 |
| CA | 2772112 | 3/2011 |
| CA | 2772115 | 3/2011 |
| CA | 2775355 | 4/2011 |
| CA | 2775656 | 4/2011 |
| CA | 2783794 | 6/2011 |
| CA | 2784105 | 6/2011 |
| CA | 2783201 | 7/2011 |
| CA | 2786949 | 8/2011 |
| CA | 2786951 | 8/2011 |
| CA | 2788548 | 8/2011 |
| CA | 2695823 | 9/2011 |
| CA | 2795503 | 9/2011 |
| CA | 2800996 | 12/2011 |
| CA | 2804662 | 1/2012 |
| CA | 2806130 | 2/2012 |
| CA | 2806132 | 2/2012 |
| CA | 2802221 | 3/2012 |
| CA | 2809519 | 3/2012 |
| CA | 2810455 | 4/2012 |
| CA | 2811681 | 4/2012 |
| CA | 2818759 | 5/2012 |
| CA | 2818175 | 6/2012 |
| CA | 2693125 | 8/2012 |
| CA | 2434144 | 12/2012 |
| CA | 2838560 | 1/2013 |
| CA | 2842781 | 1/2013 |

(56) References Cited

FOREIGN PATENT DOCUMENTS

| | | |
|---|---|---|
| CA | 2860704 | 7/2013 |
| CA | 2873106 | 11/2013 |
| CA | 2820210 | 12/2013 |
| CA | 2569856 | 9/2014 |
| CA | 2900759 | 9/2014 |
| CA | 2746008 | 5/2016 |
| CA | 2733551 | 6/2016 |
| CA | 2982187 | 10/2016 |
| CA | 2756541 | 8/2019 |
| CN | 103896992 | 7/2014 |
| CN | 104136466 | 11/2014 |
| CN | 108291244 | 7/2018 |
| EP | 1758470 | 7/2008 |
| EP | 1675481 | 11/2008 |
| EP | 2270237 | 1/2011 |
| EP | 2179048 | 2/2012 |
| EP | 2414532 | 2/2012 |
| EP | 2355670 | 3/2013 |
| EP | 2265127 | 10/2013 |
| EP | 2323669 | 5/2015 |
| EP | 2313514 | 11/2016 |
| EP | 2621503 | 11/2017 |
| EP | 2117322 | 10/2018 |
| EP | 2648540 | 10/2018 |
| EP | 3157340 | 12/2018 |
| EP | 2582820 | 4/2019 |
| JP | H05253000 | 10/1993 |
| JP | H05-317075 | 12/1993 |
| JP | H06-217761 | 8/1994 |
| JP | 2000-236899 | 9/2000 |
| JP | 2001-145498 | 5/2001 |
| JP | 2004-182609 | 7/2004 |
| JP | 2004-210666 | 7/2004 |
| JP | 2006-075067 | 3/2006 |
| JP | 2007-269659 | 10/2007 |
| JP | 4039550 | 1/2008 |
| JP | 2017-530701 | 10/2017 |
| JP | 2018-512178 | 5/2018 |
| WO | WO 1994/029424 | 12/1994 |
| WO | WO 1995/020065 | 7/1995 |
| WO | WO 2001/030855 | 5/2001 |
| WO | WO 2001/067891 | 9/2001 |
| WO | WO 2006/027529 | 3/2006 |
| WO | WO 2010/071805 | 6/2010 |
| WO | WO 2011/046816 | 4/2011 |
| WO | WO 2011/157968 | 12/2011 |
| WO | WO 2012/040003 | 3/2013 |
| WO | WO 2013/040702 | 3/2013 |
| WO | WO 2013/071883 | 5/2013 |
| WO | WO 2013/101650 | 7/2013 |
| WO | WO 2013/117823 | 8/2013 |
| WO | WO 2013/131015 | 9/2013 |
| WO | WO 2013/163571 | 10/2013 |
| WO | WO 2013/164234 | 11/2013 |
| WO | WO 2013/171100 | 11/2013 |
| WO | WO 2014/026154 | 2/2014 |
| WO | WO 2014/031667 | 2/2014 |
| WO | WO 2014/110223 | 7/2014 |
| WO | WO 2014/119990 | 8/2014 |
| WO | WO 2014/144588 | 9/2014 |
| WO | WO 2014/147393 | 9/2014 |
| WO | WO 2015/016930 | 2/2015 |
| WO | WO 2015/040159 | 3/2015 |
| WO | WO 2015/050881 | 4/2015 |
| WO | WO 2015/063549 | 5/2015 |
| WO | WO 2015/086782 | 6/2015 |
| WO | WO 2015/086783 | 6/2015 |
| WO | WO 2015/101693 | 7/2015 |
| WO | WO 2015/104460 | 7/2015 |
| WO | WO 2015/107413 | 7/2015 |
| WO | WO 2015/176173 | 11/2015 |
| WO | WO 2016/005519 | 1/2016 |
| WO | WO 2016/045569 | 3/2016 |
| WO | WO 2016/161515 | 10/2016 |
| WO | WO 2017/044039 | 3/2017 |
| WO | WO 2017/147163 | 8/2017 |
| WO | WO 2019/217844 | 11/2019 |

OTHER PUBLICATIONS

Bataillon et al., Industrial Crops and Products, 1998, 8, p. 37-43. (Year: 1998).*
Vegas et al., Bioresource Technology, 2008, 99, p. 5341-5351. (Year: 2008).*
Zhao et al., Chemical Engineering Research and Design, 2011, 89, p. 2176-2181. (Year: 2011).*
[No Author], "AOAC Official Method 2011.25: Insoluble, Soluble, and Total Dietary Fiber in Foods," AOAC International, 2012, 10 pages.
Akpinar et al., "Enzymatic Processing and Antioxidant Activity of Agricultural Waste Autohydrolysis Liquors," BioResources, 2010, 5(2):699-711.
Alkasrawi et al., "The effect of Tween-20 on simultaneous saccharification and fermentation of softwood to Ethanol", Enzyme and Microbial Technology, 2003, 33:71-78.
Belafi-Bako et al., "Continuous enzymatic cellulose hydrolysis in a tubular membrane bioreactor," Enzyme and Microbial Technology, 38(1-2):155-161, Jan. 2006.
Bensah and Mensah, "Chemical Pretreatment Methods for the Production of Cellulosic Ethanol: Technologies and Innovations," International Journal of Chemical Engineering, 2013, 21 pages.
Brethauer et al, "The effect of bovine serum albumin on batch and continuous enzymatic cellulose hydrolysis mixed by stirring or shaking", Bioresource Technology, 2011, 102:6295-6298.
Carrasco et al., "Steam pretreatment and fermentation of the straw material Paja Brava using simultaneous saccharification and co-fermentation," J. Biosci. Bioengineering, Oct. 18, 2010, 111(2):167-174.
Cheng et al, "Separation, Purification and Characterization of Corn Stover Hemicelluloses," Cellulose Chemistry and Technology, 2017, 51:215-222.
Cloetens et al., "Tolerance of arabinoxylan-oligosaccharides and their prebiotic activity in healthy subjects: a randomised, placebo-controlled cross-over study," Br. J. Nutrition, Mar. 2010, 103(5):703-713.
Correia et al., "Structure and Function of an Arabinoxylan-specific Xylanase," J. Biol. Chemistry, Jun. 24, 2011, 286(25):22510-22520.
Dekker and Wallis, "Enzymic Saccharification of Sugarcane Bagasse Pretreated by Autohydrolysis—Steam Explosion" Biotechnology and Bioengineering, 1983, 25:3027-3048.
Ding et al., "Enzymatic conversion of cellulosic materials in a continuous stirred take reactor with an ultrafiltration membrane," Food for Health in the Pacific Rim: 3rd International Conference of Food Science and Technology. Trumbull, Connecticut, USA: Food & Nutrition Press, Inc., pp. 433-445, Dec. 2004.
Egüés et al., "Effect of alkaline and autohydrolysis processes on the purity of obtained hemicelluloses from corn stalks," Bioresour. Technology, Jan. 2012, 103(1):239-248.
EP Extended Search Report in European Appln. No. 19799609.3, dated Jun. 17, 2021, 7 pages.
Extended European Search Report received for EP16775983, on Dec. 6, 2018, 8 pages.
Fang et al., "Comparative study of hemicelluloses from wheat straw by alkali and hydrogen peroxide extractions," Polymer Degradation and Stability, Dec. 1999, 66(3):423-432.
Francois et al., "Effects of a wheat bran extract containing arabinoxylan oligosaccharides on gastrointestinal health parameters in healthy adult human volunteers: a double-blind, randomised, placebo-controlled, cross-over trial," Br. J. Nutrition, Dec. 28, 2012, 108(12):2229-2242.
Francois et al., "Tolerance and the effect of high doses of wheat bran extract, containing arabinoxylan-oligosaccharides, and oligofructose on faecal output: a double-blind, randomised, placebo-controlled, cross-over trial," J. Nutr. Science, Oct. 20, 2014, 3:e49, 12 pages.

(56) References Cited

OTHER PUBLICATIONS

Ghose et al., "A model for continuous enzymatic saccharification of cellulose with simultaneous removal of glucose syrup," Biotechnol. Bioeng., 12(6):921-946, Nov. 1970.

Gonçalves et al., "Functional characterization and synergic action of fungal xylanase and arabinofuranosidase for production of xylooligosaccharides," Bioresour. Technology, May 2012, 119:293-299.

Harris et al., "Two-Stage, Dilute Sulfuric Acid Hydrolysis of Hardwood for Ethanol Production" Energy Research, Development, and Application, Forest Products Laboratory, Forest Service, USDA, Madison, Wisconsin 53705, 1984, 20 pages.

Hodge et al., "Model-based fed-batch for high-solids enzymatic cellulose hydrolysis," Appl. Biochem. Biotechnol., 152(1):88-107, Jan. 2009.

Hooshmand, "Purification And Characterisation Of Xylooligosaccharides (XOS) From Wheat-Based Dried Distillers Grains With Solubles," Thesis for the degree of Master of Chemistry, Lund University, 2012, 30 pages.

Horii et al., "Hypocholesterolemic Activity of Desalted Miso in Rats Fed an Atherogenic Diet," Nippon Shokuhin Kogyo Gakkaishi, 1990, 37(2):148-153.

International Search Report and Written Opinion, PCT/CA2016/050402, dated Aug. 11, 2016, 11 pages.

Kaya et al, "Influence of surfactants on the enzymatic hydrolysis of xylan and cellulose", Tappi Journal, 1995, 78:(10):150-157.

Kyung et al., "Effects of xylooligosaccharide-sugar mixture on glycemic index (GI) and blood glucose response in healthy adults," J. Nutr. Health, Aug. 2014, 47(4):229-235 (with English Abstract).

Lu et al., "Arabinoxylan fiber, a byproduct of wheat flour processing, reduces the postprandial glucose response in normoglycemic subjects," Am. J. Clin. Nutrition, May 2000, 71(5):1123-1128.

Magaletta et al., "In vitro method for predicting glycemic index of foods using simulated digestion and an artificial neural network" Cereal Chemistry, Jul./Aug. 2010, 87(4):363-369.

Malunga et al., "Antioxidant Capacity of Water-Extractable Arabinoxylan from Commercial Barley, Wheat, and Wheat Fractions," Cereal Chemistry, Jan./Feb. 2015, 92(1):29-36.

Mandelli et al., "Simultaneous production of xylooligosaccharides and antioxidant compounds from sugarcane bagasse via enzymatic hydrolysis," Ind. Crops Products, Jan. 2014, 52:770-775.

Mandels et al., "The use of adsorbed cellulase in the continuous conversion of cellulose to glucose," J. Polymer Sci., 36(1):445-459, 1971.

McCleary et al., "Hydrolysis of wheat flour arabinoxylan, acid-debranched wheat flour arabinoxylan and arabino-xylo-oligosaccharides by β-xylanase, α-L-arabinofuranosidase and β-xylosidase," Carbohydr. Research, Apr. 2015, 407:79-96.

Nour et al., "HPLC Determination of Phenolic Acids, Flavonoids and Juglone in Walnut Leaves," J. Chromatogr. Science, Oct. 2013, 51(9):883-890.

PCT International Preliminary Report on Patentability in International Appln. No. PCT/US2019/031760, dated Nov. 10, 2020, 8 pages.

PCT International Search Report and Written Opinion in International Appln. No. PCT/US2019/031760, dated Jul. 19, 2019, 10 pages.

Perez and Samain, "Structure and Engineering of Cellulose" Advances in Carbohydrate Chemistry and Biochemistry, 64:22-116, Jan. 2010.

Schutte et al., "Nutritional implications of L-arabinose in pigs," Br. J. Nutrition, 1992, 68:195-207.

Sluiter et al., "Determination of Sugars, Byproducts, and Degradation Products in Liquid Fraction Process Samples," Technical Report NREL/TP-510-42623, U.S. Department of Energy: National Renewable Energy Laboratory, Jan. 2008, 14 pages.

Sun et al., "Physico-chemical and structural characterization of hemicelluloses from wheat straw by alkaline peroxide extraction," Polymer, Mar. 2000, 41(7):2647-2656.

Sun et al., "Structural Characterization of Hemicelluloses from Bamboo Culms," Cellulose Chemistry and Technology, 2012, 46(3-4):165-76.

Tanaka et al., "Removal of lignin and reuse of cellulases for continuous saccharification of lignocelluloses," Biotechnol. Bioeng., 32(7):897-902, Sep. 1988.

Tjerneld et al, "Enzymatic Hydrolysis of Cellulose in Aqueous Two-Phase Systems. II. Semicontinuous Conversion of a Model Substrate, Solka Floc BW 200", Biotechnology and Bioengineering, 1985, 27:1044-1050.

Tjerneld et al., "Enzymatic hydrolysis of cellulose in aqueous two-phase systems. I. partition of cellulases from Trichoderma reesei", Biotechnology and Bioengineering, 27(7):1036-43, Jul. 1985.

Tu et al, "The potential of enzyme recycling during the hydrolysis of a mixed softwood feedstock", Bioresource Technology, 2009, 100:6407-6415.

Wang, "Cellulose Fiber Dissolution in Sodium Hydroxide Solution at Low Temperature: Dissolution Kinetics and Solubility Improvement," Georgia Institute of Technology, 2008, 148 pages.

Yang et al., "Aqueous extraction of corncob xylan and production of xylooligosaccharides," LWT-Food Science and Technology, 38(6):677-82, Sep. 2005.

Zheng et al., "[Functional Food]," Sep. 1999, vol. 2, China Light Industry Press, Chapter 2, Section 1, Part 1, pp. 56-57 (with Machine Translation).

[Production Technology and Product Quality Control Standards for Sugar and Sugar Products], Ding Jihua (ed)., Ethnic Publishing House, Aug. 2003, pp. 89-93 (with Machine Translation).

Damay et al., "Steam explosion of sweet sorghum stems: Optimisation of the production of sugars by response surface methodology combined with the severity factor," Industrial Crops and Products, Jan. 2018, 111:482-493.

Mathew et al., "Extraction of soluble arabinoxylan from enzymatically pretreated wheat bran and production of short xylo-oligosaccharides and arabinoxylo-oligosaccharides from arabinoxylan by glycoside hydrolase family 10 and 11 endoxylanases," J. Biotechnol., Oct. 2017, 260:53-61.

Peng et al., "Fractional purification and bioconversion of hemicelluloses," Biotechnol. Adv., Jul.-Aug. 2012, 30(4):879-903.

Yuan et al., "Pilot-plant production of xylo-oligosaccharides from corncob by steaming, enzymatic hydrolysis and nanofiltration," J. Chem. Technol. Biotechnol., Oct. 2004, 79(10):1073-1079.

\* cited by examiner

Control

Nutrition Facts
Serving Size (89g)

Amount Per Serving

| Calories 110 | Calories from Fat 0 |
|---|---|
| | % Daily Value* |
| Total Fat 0g | 0% |
| Saturated Fat 0g | 0% |
| Trans Fat 0g | |
| Cholesterol 0mg | 0% |
| Sodium 40mg | 2% |
| Total Carbohydrate 29g | 10% |
| Dietary Fiber 0g | 0% |
| Sugars 24g | |
| Protein 1g | |
| Vitamin A 2% • Vitamin C 0% | |
| Calcium 0% • Iron 0% | |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Comet

Nutrition Facts
Serving Size (89g)

Amount Per Serving

| Calories 100 | Calories from Fat 0 |
|---|---|
| | % Daily Value* |
| Total Fat 0g | 0% |
| Saturated Fat 0g | 0% |
| Trans Fat 0g | |
| Cholesterol 0mg | 0% |
| Sodium 45mg | 2% |
| Total Carbohydrate 27g | 9% |
| Dietary Fiber 3g | 12% |
| Sugars 21g | |
| Protein 1g | |
| Vitamin A 2% • Vitamin C 0% | |
| Calcium 0% • Iron 0% | |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Comet

Nutrition Facts

Serving Size (30g)
Servings Per Container

Amount Per Serving

Calories 130  Calories from Fat 60

| | % Daily Value* |
|---|---|
| Total Fat 6g | 9% |
| Saturated Fat 3.5g | 18% |
| Trans Fat 0g | |
| Cholesterol 5mg | 2% |
| Sodium 60mg | 3% |
| Total Carbohydrate 19g | 6% |
| Dietary Fiber 2g | 8% |
| Sugars 11g | |
| Protein 2g | |

Vitamin A 0%  •  Vitamin C 0%
Calcium 0%  •  Iron 2%

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Control

Nutrition Facts

Serving Size (30g)
Servings Per Container

Amount Per Serving

Calories 130  Calories from Fat 60

| | % Daily Value* |
|---|---|
| Total Fat 6g | 9% |
| Saturated Fat 2.5g | 13% |
| Trans Fat 1g | |
| Cholesterol 5mg | 2% |
| Sodium 55mg | 2% |
| Total Carbohydrate 18g | 6% |
| Dietary Fiber 1g | 4% |
| Sugars 11g | |
| Protein 2g | |

Vitamin A 0%  •  Vitamin C 0%
Calcium 0%  •  Iron 2%

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Figure 8

Control

Nutrition Facts

Serving Size (40g)
Servings Per Container

| Amount Per Serving | | |
|---|---|---|
| Calories 160 | Calories from Fat 40 | |
| | | % Daily Value* |
| Total Fat 4.5g | | 7% |
| Saturated Fat 1.5g | | 8% |
| Trans Fat 0g | | |
| Cholesterol 0mg | | 0% |
| Sodium 65mg | | 3% |
| Total Carbohydrate 29g | | 10% |
| Dietary Fiber 2g | | 8% |
| Sugars 14g | | |
| Protein 3g | | |
| Vitamin A 0% | • Vitamin C 0% | |
| Calcium 0% | • Iron 4% | |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Comet

Nutrition Facts

Serving Size (40g)
Servings Per Container

| Amount Per Serving | | |
|---|---|---|
| Calories 150 | Calories from Fat 40 | |
| | | % Daily Value* |
| Total Fat 4.5g | | 7% |
| Saturated Fat 1.5g | | 8% |
| Trans Fat 0g | | |
| Cholesterol 0mg | | 0% |
| Sodium 55mg | | 2% |
| Total Carbohydrate 29g | | 10% |
| Dietary Fiber 4g | | 16% |
| Sugars 14g | | |
| Protein 3g | | |
| Vitamin A 0% | • Vitamin C 0% | |
| Calcium 0% | • Iron 4% | |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300mg |
| Sodium | Less than | 2,400mg | 2,400mg |
| Total Carbohydrate | | 300g | 375g |
| Dietary Fiber | | 25g | 30g |

Figure 12

COMPOSITIONS COMPRISING GLUCOSE AND HEMICELLULOSE AND THEIR USE

CROSS REFERENCE TO RELATED APPLICATIONS

This application is a continuation of U.S. application Ser. No. 16/783,622, filed Feb. 6, 2020, which is a divisional of U.S. application Ser. No. 16/409,335, filed May 10, 2019, which claims the benefit of U.S. Provisional Application Ser. No. 62/669,684, filed May 10, 2018. The disclosures of the prior applications are considered part of (and are incorporated by reference in) the disclosure of this application.

FIELD OF THE INVENTION

The present description relates to compositions comprising glucose and hemicellulose and to their use, particularly as a food ingredient or as sweeteners or additives for orally consumed products.

BACKGROUND

Additives and sweeteners are used in the production of foods and beverages and in other items for ingestion such as pharmaceuticals and supplements. Many sweeteners used in the production of such products are derived from natural sources. These natural sugars and their precursors can be selected and combined in order to impart desirable properties to a particular product. For example, sugar derived by hydrolysis of corn starch is commonly used in the food and beverage industry to impart a sweet taste but can also impart other features to a food or beverage, such as bulk and texture.

The processing of starch into sugar is typically based on enzyme-catalyzed reactions which may include hydrolysis of starch to glucose and isomerization of glucose to fructose. By these processes, both glucose and fructose, the components of sucrose, can be produced from starch. By modifying the degree of processing under these reactions, syrups with varying viscosity and sweetness as well as other functional specifications can be produced from starch. The syrups can also be concentrated or crystalized to form dry additives products. The resulting sweeteners can be classified in various ways, such as by the measure of dextrose equivalent (DE). Dextrose equivalent (DE) is a measure of the amount of reducing sugars present in a sugar product relative to dextrose, expressed as a percentage on a dry basis.

Glucose syrup sweeteners of varying DE are commercially available, including 42 DE and 63 DE syrups. These sweeteners are used in a wide variety of manufactured products which rely on the consistent chemical and physical properties such as sweetness and viscosity, provided by the sweeteners. Replacing these sweeteners in commercially manufactured products can be difficult because in addition to providing a sweet flavor, these sweeteners can also provide bulk, viscosity and other properties to the product. Lower DE syrups can be produced by incomplete or partial hydrolysis of starch to provide mixtures of starch and glucose. The degree of hydrolysis can be controlled in order to produce a product having a particular DE for a particular application.

High potency sweeteners have been the subject of extensive research for use in reduced calorie food and beverage products. Many difficulties have been encountered in developing such products including health and safety concerns or off tastes such as metallic or overly sweet flavors. Another obstacle encountered in the production of high potency sweeteners is that these products typically have very different properties in terms of bulk and viscosity as compared to sugar compositions having equivalent sweetness. These differences can be problematic when trying to incorporate high potency sweeteners into existing recipes or products, as the texture of the product may be significantly altered even though the same degree of sweetness is achieved.

Prebiotic fiber is a non-digestible part of foods that goes through the small intestine undigested and is fermented when it reaches the colon. The fermentation process feeds beneficial bacteria colonies in the digestive tract and may help to increase the number of desirable bacteria in a digestive system, which may reduce the risk of certain diseases and improve overall health. Fiber syrups that are derived from plant sources can be a source of prebiotic fiber. Fiber syrups can include isomalto-oligosaccharides, protected starches, polydextrose, beta glucan and/or other types of soluble fiber. Fiber syrups may also include naturally occurring sweetening agents or added sweetening agents. Fiber syrups can be used to provide bulk in calorie reduced products, as long chain fibers are not readily digested and pass through the gut. Soluble fiber in the diet can improve digestion by drawing water into the intestines. It can also create a feeling of fullness and prevent blood glucose and insulin spikes, thereby reducing food cravings and reducing or preventing intake of inappropriate foods or inappropriate amounts of foods.

The production of sugars, such as glucose, from cellulosic biomass has been the focus of considerable research and development. A number of different methods for converting cellulosic biomass into sugars are known in the art. These generally include a pre-treatment step wherein cellulosic biomass is physically and/or chemically altered to open up the structure of the polymeric sugars contained in cellulosic biomass and an enzymatic or chemical hydrolysis step wherein the polymeric sugars are broken down into monomeric sugars.

Lower glycemic index foods and drinks may provide health advantages in the management of blood sugar and insulin levels which may in turn reduce the risk of heart disease and/or diabetes. Foods having a lower glycemic index may also be useful in controlling appetite and weight loss. Foods containing soluble fiber can help to reduce overall cholesterol levels and may lower the risk of heart disease.

There exists a need for alternative sweetening products or food ingredients which have a lower caloric content and/or a lower glycemic index and still provide similar bulk and/or viscosity properties at the same level of sweetness as sugar or corn syrup.

There is also a need for alternative sweetening products which include soluble fiber and/or components which may act as prebiotics.

SUMMARY

It has been found that a sweetener composition comprising glucose, xylose, xylo-oligosaccharide, and xylan can be prepared. It has further been found that these compositions can be prepared in various ratios to provide compositions having varying sweetness and viscosity or bulking properties.

In one aspect, there is provided a sweetener composition comprising glucose, xylose, xylo-oligosaccharide, and xylan. In a further aspect, the glucose, xylose, xylo-oligosaccharide, and xylan are derived from lignocellulosic biomass. In a particular embodiment, the glucose is derived from cellulose, and the xylose, xylo-oligosaccharide, and xylan are derived from hemicellulose. In a further aspect, there is provided a sweetener composition comprising glucose and purified hemicellulose.

In a further aspect, the ratio of glucose, xylose, xylo-oligosaccharide, and xylan can be varied to provide compositions having varying degrees of sweetness and viscosity or bulking properties. In a particular embodiment, these characteristics can be selected to mimic existing marketed sweeteners such as those derived from starch.

In another aspect, there is provided a method for preparing a sweetener composition from lignocellulosic biomass comprising:

obtaining glucose;
obtaining purified hemicellulose; and
combining glucose and the purified hemicellulose.

In a particular embodiment, the purified hemicellulose comprises a mixture of xylose, xylo-oligosaccharide, and xylan. In another embodiment, the glucose is derived from cellulose. In still a further embodiment, the glucose, xylose, xylo-oligosaccharide, and xylan are derived from lignocellulosic biomass. In a further embodiment, the glucose, xylose, xylo-oligosaccharide, and xylan are derived from the same source of lignocellulosic biomass.

In one embodiment, the proportion of glucose, xylose, xylo-oligosaccharide, and xylan is selected to provide desired properties. The properties may include degree of sweetness, DE value, viscosity, bulk, dietary fiber, soluble fiber, or calories.

In another aspect, there is provided a use of a sweetener composition as described above for sweetening a food or beverage. In a further aspect, the sweetener composition may be added to a food or beverage to impart properties other than sweetness, such as viscosity, bulk, moisture retention, and the like.

In another aspect, there is provided a use of a sweetener composition as described above as an additive in a pharmaceutical composition or supplement.

In another aspect, there is provided a food additive comprising purified hemicellulose. In one embodiment, the purified hemicellulose is partially hydrolyzed to provide a mixture of xylose, xylo-oligosaccharide, and xylan.

In a further aspect, there is provided a use of the food product comprising purified hemicellulose in a food, beverage, pharmaceutical, or supplement.

In one aspect, provided herein is a sweetener composition including about 5% to about 95% by dry weight of glucose and about 5% to about 95% by dry weight of a purified hemicellulose.

Implementations can include one or more of the following features. The purified hemicellulose can include xylose, xylo-oligosaccharide, and xylan. The purified hemicellulose can include hydrolysis products of xylose, hydrolysis products of xylo-oligosaccharide, or hydrolysis products of xylan. The sweetener composition can include about 30% to about 75% by dry weight of glucose. The sweetener composition can include about 40% to about 60% by dry weight of glucose. The sweetener composition can include about 45% to about 55% by dry weight of glucose. The sweetener composition can include about 30% to about 75% by dry weight of purified hemicellulose. The sweetener composition can include about 40% to about 60% by dry weight of purified hemicellulose. The sweetener composition can include about 45% to about 55% by dry weight of purified hemicellulose. The purified hemicellulose can include about 20% to about 95% by dry weight of xylan. The purified hemicellulose can include about 30% to about 95% by dry weight of xylan. The purified hemicellulose can include about 50% to about 95% by dry weight of xylan. The purified hemicellulose can include about 80% to about 95% by dry weight of xylan. The purified hemicellulose can include about 87% by dry weight of xylan. The xylan can include about 70% to about 99% by dry weight of arabinoxylan. The xylan can include about 80% to about 99% by dry weight of arabinoxylan. The xylan can include about 90% to about 99% by dry weight of arabinoxylan. The xylan can include about 95% to about 99% by dry weight of arabinoxylan. The purified hemicellulose can include about 5% to about 60% by dry weight of xylo-oligosaccharide. The purified hemicellulose can include about 5% to about 30% by dry weight of xylo-oligosaccharide. The purified hemicellulose can include about 5% to about 15% by dry weight of xylo-oligosaccharide. The purified hemicellulose can include about 9% by dry weight of xylo-oligosaccharide. The purified hemicellulose can include about 0.1% to about 25% by dry weight of xylose. The purified hemicellulose can include about 0.1% to about 40% by dry weight of xylose. The purified hemicellulose can include about 0.1% to about 10% by dry weight of xylose. The purified hemicellulose can include about 4% by dry weight of xylose. The purified hemicellulose can include glucomannan, maltose, or a combination thereof. The purified hemicellulose can include less than 10% by dry weight of glucomannan, maltose, or a combination thereof. The purified hemicellulose can include less than 5% by dry weight of glucomannan, maltose, or a combination thereof. The purified hemicellulose can include less than 1% by dry weight of glucomannan, maltose, or a combination thereof. The sweetener composition can include less than 10% by dry weight of glucomannan, maltose, or a combination thereof. The sweetener composition can include less than 5% by dry weight of glucomannan, maltose, or a combination thereof. The sweetener composition can include less than 1% by dry weight of glucomannan, maltose, or a combination thereof. The purified hemicellulose can include less than 10% by dry weight of a sugar or a sugar polymer that is not xylose, xylo-oligosaccharide, xylan, or a hydrolysis product thereof. The purified hemicellulose can include less than 5% by dry weight of a sugar or a sugar polymer that is not xylose, xylo-oligosaccharide, xylan, or a hydrolysis product thereof. The purified hemicellulose can include less than 1% by dry weight of a sugar or a sugar polymer that is not xylose, xylo-oligosaccharide, xylan, or a hydrolysis product thereof. The sweetener composition can include less than 10% by dry weight of a sugar or a sugar polymer that is not dextrose, xylose, xylo-oligosaccharide, xylan, or a hydrolysis product thereof. The sweetener composition can include less than 5% by dry weight of a sugar or a sugar polymer that is not dextrose, xylose, xylo-oligosaccharide, xylan, or a hydrolysis product thereof. The sweetener composition can include less than 1% by dry weight of a sugar or a sugar polymer that is not dextrose, xylose, xylo-oligosaccharide, xylan, or a hydrolysis product thereof. The sweetener composition can have a DE of about 35 to about 75. The sweetener composition can have a DE of about 40 to about 65. The sweetener composition can have a DE of 42, 53, or 63. The sweetener composition can have a DE of 42. The sweetener composition can have a DE of 53. The sweetener composition can have a DE of 63. The sweetener composition can have a glycemic index of about 35 to about 50. The sweetener composition can have a glycemic index of about 40 to about 45. The sweetener composition can have a glycemic index of about 42. The sweetener composition can provide about 175 to about 225 calories per 100 g of the sweetener composition. The sweetener composition can provide about 180 to about 200 calories per 100 g of the sweetener composition. The sweetener composition can provide about 190 calories per 100 g of the sweetener composition. The sweetener composition can include soluble fiber. The sweetener composition can include about 20 g to about 60 g of soluble fiber per 100 g of the sweetener composition. The sweetener composition can include about 35 g to about 45 g of soluble fiber per 100 g of the sweetener composition. The sweetener composition can include about 41 g of soluble fiber per 100 g of the sweetener composition. The sweetener composition can include prebiotics. The sweetener composition can include about 2 g to about 6 g of prebiotics per 100 g of the sweetener composition. The sweetener composition can include about 3 g to about 5 g of prebiotics per 100 g of the sweetener composition. The sweetener composition can include about 4 g of prebiotics per 100 g of the sweetener composition. The sweetener composition can lack insoluble fiber. The glucose can be provided, at least in part, in the form of dextrose. The sweetener composition can be a solid. The sweetener composition can be a syrup. The sweetener composition can have a viscosity of about 2500 to about 3000 cP at a temperature of 120° C. The sweetener composition can have a viscosity of about 2700 to about 2900 cP at a temperature of 120° C. The sweetener composition can have a viscosity of about 2800 cP at a temperature of 120° C. The purified hemicellulose can have a molecular weight (Mw) of less than 4000 Da. The purified hemicellulose can have a polyphenol content of less than about 0.5% by dry weight. The purified hemicellulose can have an antioxidant level of less than about 10000 μmol TE/100 g. The purified hemicellulose can have a purity of at least 95%. The xylan can include about 70% to about 99% by dry weight of arabinoxylan. The xylan can include about 80% to about 99% by dry weight of arabinoxylan. The xylan can include about 90% to about 99% by dry weight of arabinoxylan. The xylan can include about 95% to about 99% by dry weight of arabinoxylan.

In another aspect, provided herein is a sweetener composition including about 48% to about 53% by dry weight of dextrose, about 41% to about 45% by dry weight of xylan, about 4% to about 5% by dry weight of xylo-oligosaccharides, and about 2% to about 2.5% by dry weight of xylose.

In another aspect, provided herein is a sweetener composition including about 50% by dry weight of dextrose, about 43% by dry weight of xylan, about 4% by dry weight of xylo-oligosaccharides, and about 2% by dry weight of xylose.

In yet another aspect, provided herein is a food product including any one or more of the sweetener compositions provided herein.

In another aspect, provided herein is a pharmaceutical composition including any one or more of the sweetener compositions provided herein.

In another aspect, provided herein is a dietary supplement including any one or more of the sweetener compositions provided herein.

In another aspect, provided herein is a use of any one or more of the sweetener compositions provided herein in a food product.

In another aspect, provided herein is a use of any one or more of the sweetener compositions provided herein in a pharmaceutical composition.

In another aspect, provided herein is a use of any one or more of the sweetener compositions provided herein in a dietary supplement.

In another aspect, provided herein is a method of sweetening a food product including adding any one or more of the sweetener compositions provided herein to the food product.

In another aspect, provided herein is a method of sweetening a pharmaceutical composition including adding any one or more of the sweetener compositions provided herein to the pharmaceutical composition.

In another aspect, provided herein is a method of sweetening a dietary supplement including adding any one or more of the sweetener compositions provided herein to the dietary supplement.

In another aspect, provided herein is a method of reducing the calorie content of a food product prepared from a recipe including providing a recipe including an amount of a sugar or sugar syrup, and preparing the food product according to the recipe, but replacing at least a portion of the amount of the sugar or sugar syrup with any one or more of the sweetener compositions provided herein in an amount of about 50% to about 150% of the portion of the amount of the sugar or sugar syrup. In another aspect, provided herein is a method of reducing the glycemic index of a food product prepared from a recipe including providing a recipe including an amount of a sugar or sugar syrup, and preparing the food product according to the recipe, but replacing at least a portion of the amount of the sugar or sugar syrup with any one or more of the sweetener compositions provided herein in an amount of about 50% to about 150% of the portion of the amount of the sugar or sugar syrup.

Implementations can include one or more of the following features. The portion of the amount of the sugar or sugar syrup can be replaced with any one or more of the sweetener compositions provided herein in an amount of about 80% to about 120% of the portion of the amount of the sugar or sugar syrup. The amount of the sugar or sugar syrup can be replaced with any one or more of the sweetener compositions provided herein in an amount of about 100% of the portion of the amount of the sugar or sugar syrup.

In another aspect, provided herein is a purified hemicellulose composition including about 82% to about 92% by dry weight of xylan, about 8% to about 9% by dry weight of xylo-oligosaccharide, and about 4% to about 5% by dry weight of xylose. In another aspect, provided herein is a purified hemicellulose composition including about 87% to about 88% by dry weight of xylan, about 8% to about 9% by dry weight of xylo-oligosaccharide, and about 4% to about 5% by dry weight of xylose. In another aspect, provided herein is a purified hemicellulose composition including about 87.3% by dry weight of xylan, about 8.5% by dry weight of xylo-oligosaccharide, and about 4.2% by dry weight of xylose.

In another aspect, provided herein is purified hemicellulose composition including about 85% to about 95% by dry weight of xylan, about 5% to about 25% by dry weight of xylo-oligosaccharide, and about 0% to about 5% by dry weight of xylose. Implementations can include one or more of the following features. The purified hemicellulose composition can include about 85% to about 93% by dry weight of xylan. The purified hemicellulose can include about 85% to about 91% by dry weight of xylan. The purified hemicellulose can include about 85% to about 89% by dry weight of xylan. The purified hemicellulose can include about 85% to about 87% by dry weight of xylan. The purified hemicellulose can include about 87% to about 95% by dry weight of xylan. The purified hemicellulose can include about 89% to about 95% by dry weight of xylan. The purified hemicellulose can include about 91% to about 95% by dry weight of xylan. The purified hemicellulose can include about 93% to about 95% by dry weight of xylan. The purified hemicellulose can include about 87% to about 93% by dry weight of xylan. The purified hemicellulose can include about 86% to about 88% by dry weight of xylan. The purified hemicellulose can include about 88% to about 92% by dry weight of xylan. The purified hemicellulose can include about 90% to about 95% by dry weight of xylan. The purified hemicellulose composition can include about 5% to about 20% by dry weight of xylo-oligosaccharide. The purified hemicellulose composition can include about 5% to about 15% by dry weight of xylo-oligosaccharide. The purified hemicellulose composition can include about 5% to about 10% by dry weight of xylo-oligosaccharide. The purified hemicellulose composition can include about 5% to about 8% by dry weight of xylo-oligosaccharide. The purified hemicellulose composition can include about 10% to about 25% by dry weight of xylo-oligosaccharide. The purified hemicellulose composition can include about 15% to about 25% by dry weight of xylo-oligosaccharide. The purified hemicellulose composition can include about 20% to about 25% by dry weight of xylo-oligosaccharide. The purified hemicellulose composition can include about 10% to about 20% by dry weight of xylo-oligosaccharide. The purified hemicellulose composition can include about 6% to about 12% by dry weight of xylo-oligosaccharide. The purified hemicellulose composition can include about 8% to about 10% by dry weight of xylo-oligosaccharide. The purified hemicellulose composition can include about 0% to about 4% by dry weight of xylose. The purified hemicellulose composition can include about 0% to about 2% by dry weight of xylose. The purified hemicellulose composition can include about 0% to about 1% by dry weight of xylose. The purified hemicellulose composition can include about 0% to about 0.5% by dry weight of xylose. The purified hemicellulose composition can include about 0% to about 0.1% by dry weight of xylose. The purified hemicellulose composition can include about 0.1% to about 5% by dry weight of xylose. The purified hemicellulose composition can include about 0.5% to about 5% by dry weight of xylose. The purified hemicellulose composition can include about 1% to about 5% by dry weight of xylose. The purified hemicellulose composition can include about 2% to about 5% by dry weight of xylose. The purified hemicellulose composition can include about 4% to about 5% by dry weight of xylose. The purified hemicellulose composition can include about 0.1% to about 5% by dry weight of xylose. The purified hemicellulose composition can include about 0.1% to about 4% by dry weight of xylose. The purified hemicellulose composition can include about 0.1% to about 2% by dry weight of xylose. The purified hemicellulose composition can include about 0.1% to about 1% by dry weight of xylose. The purified hemicellulose composition can include about 0.1% to about 0.5% by dry weight of xylose. The purified hemicellulose composition can include about 0.5% to about 4% by dry weight of xylose. The purified hemicellulose composition can include about 0.5% to about 2% by dry weight of xylose. The purified hemicellulose composition can include about 0.5% to about 1% by dry weight of xylose.

Implementations can include one or more of the following features. The purified hemicellulose composition can be off-white. The purified hemicellulose composition can have a molecular weight ($M_w$) of less than 4000 Da. The purified hemicellulose composition can have a polyphenol content of less than about 0.5% by dry weight. The purified hemicellulose composition can have an antioxidant level of less than about 10000 µmol TE/100 g. The purified hemicellulose composition can have a purity of at least 95%. The xylan can include about 70% to about 99% by dry weight of arabinoxylan. The xylan can include about 80% to about 99% by dry weight of arabinoxylan. The xylan can include about 90% to about 99% by dry weight of arabinoxylan. The xylan can include about 95% to about 99% by dry weight of arabinoxylan.

In another aspect, provided herein is a food product including any one or more of the purified hemicellulose compositions provided herein.

In another aspect, provided herein is a sweetener composition including any one or more of the purified hemicellulose compositions provided herein.

In another aspect, provided herein is a pharmaceutical composition including any one or more of the purified hemicellulose compositions provided herein.

In another aspect, provided herein is a dietary supplement including any one or more of the purified hemicellulose compositions provided herein.

In another aspect, provided herein is a use of any one or more of the purified hemicellulose compositions provided herein in a food product.

In another aspect, provided herein is a use of any one or more of the purified hemicellulose compositions provided herein in a sweetener composition.

In another aspect, provided herein is a use of any one or more of the purified hemicellulose compositions provided herein in a pharmaceutical composition.

In another aspect, provided herein is a use of any one or more of the purified hemicellulose compositions provided herein in a dietary supplement.

In another aspect, provided herein is a method of preparing purified hemicellulose including providing a lignocellulosic biomass, combining the lignocellulosic biomass with water, activating the lignocellulosic biomass and water using conditions including a first temperature and a first pressure to form a first activated cellulose stream, washing the first activated cellulose stream to form a washed first activated cellulose stream and a first soluble extract, wherein the first soluble extract can include hemicellulose, and purifying the first soluble extract to form purified hemicellulose.

Implementations can have one or more of the following features. The first temperature can be about 190° C. to about 225° C. The first pressure can be about 200 to about 500 psig. The activating step can have a duration of about 1 to about 30 minutes. Washing can include washing with water at a temperature of about 40° C. and about 100° C. Purifying can include one or more of decolorizing, treating with carbon, performing ion exchange (IX), performing reverse osmosis, nanofiltering, or a combination thereof. Treating with carbon can be treating with activated carbon. Performing IX can include performing two-stage ion exchange. Performing reverse osmosis can include using a nanofiltration membrane. Decolorizing can include alkaline peroxide treatment. Decolorizing can include conditions including a pH of about 9.5 to about 11.5. Decolorizing can include conditions including a pH of about 10.0 to about 11.0. Decolorizing can include peroxide treatment. Peroxide treatment can include a peroxide loading of about 5% to about 40% based on the dry weight of a xylan component of the hemicellulose. Peroxide treatment can include a peroxide loading of about 5% to about 40% based on the dry weight of an arabinoxylan component of the hemicellulose. Decolorizing can have a duration of about 1 to about 5 hours. Decolorizing can have a duration of about 2 to about 4 hours. Decolorizing can be performed at a temperature of about 50° C. to about 100° C. Decolorizing can be performed at a temperature of about 60° C. to about 80° C. Purifying can include, sequentially, decolorizing, treating with carbon, performing ion exchange (IX), and performing reverse osmosis, to form purified hemicellulose. The method can further include, adding a reduced-mass hemicellulose to a decolorized hemicellulose. The method can further include drying the purified hemicellulose.

In another aspect, provided herein is a purified hemicellulose prepared by the any of the methods provided herein.

In another aspect, provided herein is a method of preparing a sweetener composition including providing glucose, providing purified hemicellulose, and combining the glucose and the purified hemicellulose to form a sweetener composition.

Implementations can include one or more of the following features. The glucose can include glucose prepared from lignocellulosic biomass. The purified hemicellulose can include purified hemicellulose prepared from lignocellulosic biomass. The lignocellulosic biomass can include hard wood, soft wood, plant stems, plant stalks, or a combination thereof. The lignocellulosic biomass can include wheat straw, wheat flour, wheat bran, corn stover, sugarcane bagasse, hard wood, soft wood, or a combination thereof. The glucose can be prepared by a method including steam treatment of a lignocellulosic biomass, enzymatic treatment of a lignocellulosic biomass, or a combination thereof. The purified hemicellulose can be prepared by a method including steam treatment of a lignocellulosic biomass, enzymatic treatment of a lignocellulosic biomass, or a combination thereof. The hemicellulose can be prepared by any of the methods provided herein. The purified hemicellulose can be any purified hemicellulose provided herein. About 1-20 parts by dry weight of glucose are combined with about 1 part by dry weight of purified hemicellulose. About 1 part by dry weight of glucose can be combined with about 1 part by dry weight of purified hemicellulose. The purified hemicellulose can include xylose, xylo-oligosaccharide, and xylan. The purified hemicellulose can include hydrolysis products of xylose, hydrolysis products of xylo-oligosaccharide, or hydrolysis products of xylan. The sweetener composition can include about 30% to about 75% by dry weight of glucose. The sweetener composition can include about 40% to about 60% by dry weight of glucose. The sweetener composition can include about 45% to about 55% by dry weight of glucose. The sweetener composition can include about 30% to about 75% by dry weight of purified hemicellulose. The sweetener composition can include about 40% to about 60% by dry weight of purified hemicellulose. The sweetener composition can include about 45% to about 55% by dry weight of purified hemicellulose. The purified hemicellulose can include about 20% to about 95% by dry weight of xylan. The purified hemicellulose can include about 30% to about 95% by dry weight of xylan. The purified hemicellulose can include about 50% to about 95% by dry weight of xylan. The purified hemicellulose can include about 80% to about 95% by dry weight of xylan. The purified hemicellulose can include about 87% by dry weight of xylan. The xylan can include about 70% to about 99% by dry weight of arabinoxylan. The xylan can include about 80% to about 99% by dry weight of arabinoxylan. The xylan can include about 90% to about 99% by dry weight of arabinoxylan. The xylan can include about 95% to about 99% by dry weight of arabinoxylan. The purified hemicellulose can include about 5% to about 60% by dry weight of xylo-oligosaccharide. The purified hemicellulose can include about 5% to about 30% by dry weight of xylo-oligosaccharide. The purified hemicellulose can include about 5% to about 15% by dry weight of xylo-oligosaccharide. The purified hemicellulose can include about 9% by dry weight of xylo-oligosaccharide. The purified hemicellulose can include about 1% to about 25% by dry weight of xylose. The purified hemicellulose can include about 1% to about 40% by dry weight of xylose. The purified hemicellulose can include about 1% to about 10% by dry weight of xylose. The purified hemicellulose can include about 4% by dry weight of xylose. The purified hemicellulose can include glucomannan, maltose, or a combination thereof. The purified hemicellulose can include less than 10% by dry weight of glucomannan, maltose, or a combination thereof. The purified hemicellulose can include less than 5% by dry weight of glucomannan, maltose, or a combination thereof. The purified hemicellulose can include less than 1% by dry weight of glucomannan, maltose, or a combination thereof. The sweetener composition can include less than 10% by dry weight of glucomannan, maltose, or a combination thereof. The sweetener composition can include less than 5% by dry weight of glucomannan, maltose, or a combination thereof. The sweetener composition can include less than 1% by dry weight of glucomannan, maltose, or a combination thereof. The purified hemicellulose can include less than 10% by dry weight of a sugar or a sugar polymer that is not xylose, xylo-oligosaccharide, xylan, or a hydrolysis product thereof. The purified hemicellulose can include less than 5% by dry weight of a sugar or a sugar polymer that is not xylose, xylo-oligosaccharide, xylan, or a hydrolysis product thereof. The purified hemicellulose can include less than 1% by dry weight of a sugar or a sugar polymer that is not xylose, xylo-oligosaccharide, xylan, or a hydrolysis product thereof. The sweetener composition can include less than 10% by dry weight of a sugar or a sugar polymer that is not dextrose, xylose, xylo-oligosaccharide, xylan, or a hydrolysis product thereof. The sweetener composition can include less than 5% by dry weight of a sugar or a sugar polymer that is not dextrose, xylose, xylo-oligosaccharide, xylan, or a hydrolysis product thereof. The sweetener composition can include less than 1% by dry weight of a sugar or a sugar polymer that is not dextrose, xylose, xylo-oligosaccharide, xylan, or a hydrolysis product thereof. The sweetener composition can have a DE of about 35 to about 75. The sweetener composition can have a DE of about 40 to about 65. The sweetener composition can have a DE of 42, 53, or 63. The sweetener composition can have a DE of 42. The sweetener composition can have a DE of 53. The sweetener composition can have a DE of 63. The sweetener composition can have a glycemic index of about 35 to about 50. The sweetener composition can have a glycemic index of about 40 to about 45. The sweetener composition can have a glycemic index of about 42. The sweetener composition provides about 175 to about 225 calories per 100 g of the sweetener composition. The sweetener composition provides about 180 to about 200 calories per 100 g of the sweetener composition. The sweetener composition provides about 190 calories per 100 g of the sweetener composition. The sweetener composition can include soluble fiber. The sweetener composition can include about 20 g to about 60 g of soluble fiber per 100 g of the sweetener composition. The sweetener composition can include about 35 g to about 45 g of soluble fiber per 100 g of the sweetener composition. The sweetener composition can include about 41 g of soluble fiber per 100 g of the sweetener composition. The sweetener composition can include prebiotics. The sweetener composition can include about 2 g to about 6 g of prebiotics per 100 g of the sweetener composition. The sweetener composition can include about 3 g to about 5 g of prebiotics per 100 g of the sweetener composition. The sweetener composition can include about 4 g of prebiotics per 100 g of the sweetener composition. The sweetener composition can lack insoluble fiber. The glucose can be provided, at least in part, in the form of dextrose. The sweetener composition can be a solid. The sweetener composition can be a syrup. The sweetener composition can have a viscosity of about 2500 to about 3000 cP at a temperature of 120° C. The sweetener composition can have a viscosity of about 2700 to about 2900 cP at a temperature of 120° C. The sweetener composition can have a viscosity of about 2800 cP at a temperature of 120° C.

In another aspect, provided herein is a sweetener composition prepared by any of the methods provided herein.

In another aspect, provided herein is a food product including a sweetener composition prepared by any of the methods provided herein.

In another aspect, provided herein is a pharmaceutical composition including a sweetener composition prepared by any of the methods provided herein.

In another aspect, provided herein is a dietary supplement including a sweetener composition prepared by any of the methods provided herein.

In another aspect, provided herein is a use of a sweetener composition prepared any of the methods provided herein in a food product.

In another aspect, provided herein is a use of a sweetener composition prepared by any of the methods provided herein in a pharmaceutical composition.

In another aspect, provided herein is a use of a sweetener composition prepared by any of the methods provided herein in a dietary supplement.

In another aspect, provided herein is a food product including an amount of any one or more of the sweetener compositions provided herein, wherein the food product has organoleptic properties comparable to a similar food product including an amount of an alternate sweetener composition other than the sweetener composition, wherein the amount of the sweetener composition in the food product can be from about 50% to about 150% of the amount of the alternate sweetener composition in the similar food product.

Implementations can include one or more of the following features. A dextrose equivalent (DE) of the sweetener composition can be from about 50% to about 150% of a DE of the alternate sweetener composition. The food product can have a calorie content of no more than about 95% of a calorie content of the similar food product. The food product can have a calorie content of no more than about 92% of a calorie content of the similar food product. A serving of the food product provides at least one gram more of dietary fiber than a serving of the similar food product. A serving of the food product provides at least two grams more of dietary fiber than a serving of the similar food product. The DE of the sweetener composition can be about 30 to about 75. The DE of the sweetener composition can be 42, 53, or 63.

In another aspect provided herein is a sweetener composition including glucose, xylose, xylo-oligosaccharide, and xylan.

Implementations can include one or more of the following features. The glucose, xylose, xylo-oligosaccharide, and xylan can be obtained from lignocellulosic biomass. The glucose can be obtained from cellulose, and the xylose, xylo-oligosaccharide, and xylan can be obtained from hemicellulose. The sweetener composition can have a DE of from 35-75. The sweetener composition can have a DE of 42, 53, or 63. The sweetener composition can have a DE of 53. The viscosity can be about 2800 at 120° F. (cP). The sweetener composition can have fewer calories per gram than corn syrup of the same DE. The xylose, xylo-oligosaccharide, and xylan can be a source of soluble fiber. The xylose, xylo-oligosaccharide, and xylan can be a source of prebiotics.

In another aspect, provided herein is a sweetener composition including 50.4 wt % dextrose, 2.1 wt % xylose, 4.2 wt % xylo-oligosaccharide, and 43.3 wt % xylan.

In another aspect, provided herein is a method of making a sweetener from lignocellulosic biomass including obtaining glucose, obtaining a purified hemicellulose, and combining the glucose and the purified hemicellulose.

Implementations can include one or more of the following features. The glucose can be dextrose obtained by hydrolysis of cellulose. The purified hemicellulose can include a mixture of xylose, xylo-oligosaccharide and xylan. The purified hemicellulose can be prepared by steam treatment of lignocellulosic biomass. The purified hemicellulose can be prepared by enzymatic treatment of lignocellulosic biomass. The purified hemicellulose can be prepared by steam treatment and enzymatic treatment of lignocellulosic biomass. The glucose and the mixture of xylose, xylo-oligosaccharide, and xylan can be combined in a proportion to provide a sweetener having a desired dextrose equivalent (DE) value. The DE value can be in the range of 35-75. The DE can be in the range of 40-64. The DE can be 53, 42, or 63. The glucose and purified hemicellulose can be produced in the same processing facility and/or from the same source of lignocellulosic material.

In another aspect, provided herein is a use of any one or more of the sweetener compositions provided herein in a food or beverage.

In another aspect, provided herein is a use of any one or more of the sweetener compositions provided herein in a pharmaceutical or supplement.

In another aspect, provided herein is a food additive including purified hemicellulose where the hemicellulose can be purified by sequential treatment with activated carbon (to remove organic impurities) and then two stage ion exchange (cationic/anionic) to remove inorganic impurities.

Implementations can include one or more of the following features. The purified hemicellulose can be partially hydrolyzed to provide a mixture of xylan, xylo-oligosaccharide, and xylose. The amount of xylan can range from 20-95%, the amount of xylo-oligosaccharide can range from 5-60% and the xylose can range from 1-40%. The purified hemicellulose further can include other sugar polymers such as glucuronoxylan, arabinoxylan, glucomannan, and xyloglucan and sugars derived therefrom. The food additive can include about 87% xylan, about 9% xylo-oligosaccharide and about 4% xylose. The purified hemicellulose can be a source of soluble fiber. The purified hemicellulose can be a source of prebiotics.

In another aspect, provided herein is the use of any one or more of the food additives provided herein in a food or beverage.

In another aspect, provided herein is a use of any one or more of the food additives provided herein in a pharmaceutical or supplement.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims. The word "comprising" in the claims may be replaced by "consisting essentially of" or with "consisting of," according to standard practice in patent law.

DESCRIPTION OF THE DRAWINGS

FIG. 4 shows nutrition facts for a cherry pie filling prepared with an exemplary sweetener composition according to some embodiments (Comet) and for a control cherry pie filling (Control).

FIG. 5 shows nutrition facts for a yogurt prepared with an exemplary sweetener composition according to some embodiments (Comet) and for a control yogurt (Control).

FIG. 8 shows nutrition facts for a cookie prepared with an exemplary sweetener composition according to some embodiments (Comet) and for a control cookie (Control).

FIG. 12 shows nutrition facts for a cereal bar prepared with an exemplary sweetener composition according to some embodiments (Comet) and for a control cereal bar (Control).

DETAILED DESCRIPTION

Figure 1:
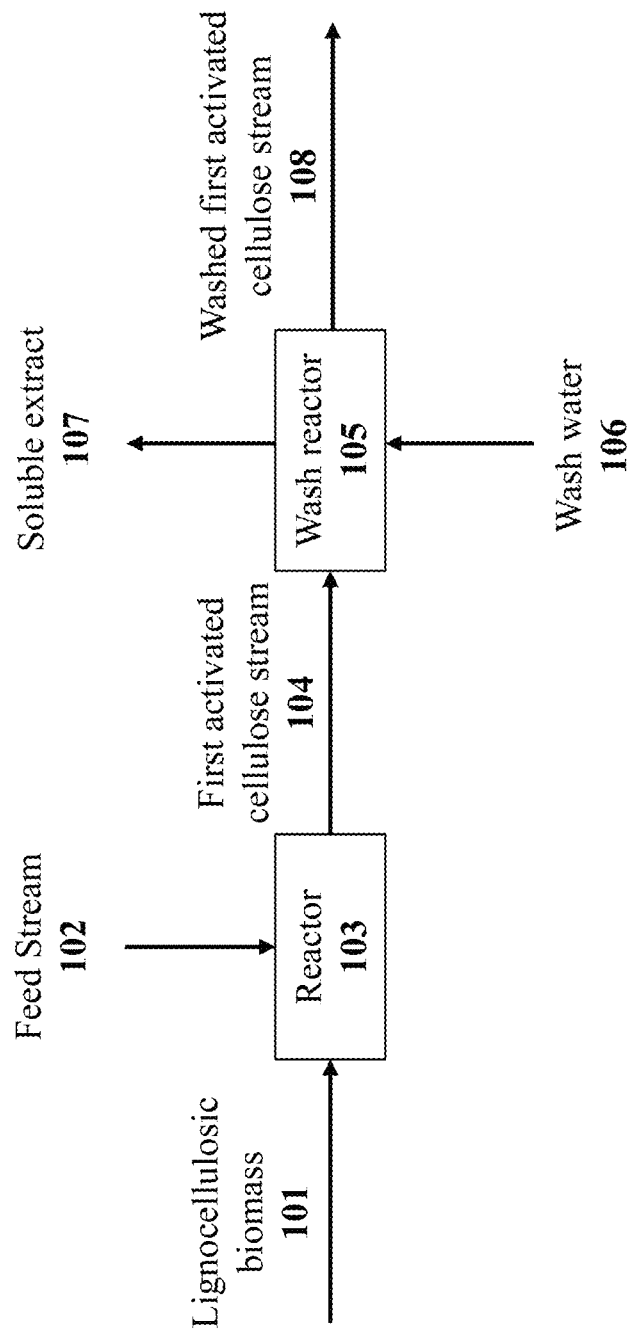
FIG. 1 shows an exemplary diagram of lignocellulosic biomass processing according to some embodiments.

As used herein, the term "lignocellulosic biomass", refers to plant dry matter composed of the carbohydrate polymers cellulose, hemicellulose and the aromatic polymer lignin. It can be obtained from naturally occurring, plants such as trees, bushes and grass or from waste biomass, produced as a by-product from various industries such as agriculture (corn stover, sugarcane bagasse, straw, etc.) and forestry (saw mill and paper mill discards). The terms "cellulosic biomass", "lignocellulose", and "biomass" may also be used herein as short forms for the term "lignocellulosic biomass".

As used herein, the term "carbohydrate component of lignocellulosic biomass" refers to the cellulose and hemicellulose carbohydrate polymers derived from lignocellulose biomass.

As used herein, the term "cellulose" refers to the polysaccharide polymer consisting of linear chains of D-glucose typically derived from plant material.

As used herein, the term "hemicellulose" refers to the polysaccharide heteropolymers such as xylan (e.g., glucuronoxylan, arabinoxylan, and xyloglucan) and glucomannan. Hemicellulose, like cellulose, is also derived from plant material.

It will be understood that arabinoxylan is a type of hemicellulose. Commonly, arabinoxylan has a xylose backbone (e.g., 1,4-linked xylose) which is covalently linked to one or more arabinose units (e.g., via a 2,3-linkage). It will be understood that arabinoxylan can be further linked to other sugars, such as glucose, galactose, and maltose. In some cases, arabinoxylan may be further covalently linked to one or more polyphenols. In some embodiments, polyphenol units can include ferulic acid, gallic acid, 4-hydroxybenzoic acid, coumaric acid, syringic acid, sinapic acid, rosemarinic acid, vanillin, epigallochatechin gallate or combinations thereof. In some embodiments, polyphenols can be covalently attached to the arabinoxylan, can be free polyphenols, or can be a combination thereof. In some cases, polyphenol units can be free units. In some embodiments, polyphenols can be predominantly attached to the arabinoxylan.

As used herein, the term "purified hemicellulose" refers to hemicellulose that has been purified by one or more chemical, or physical purification methods, including one or more of hydrolysis, extraction, membrane separation, carbon or ion exchange, chromatographic separation and precipitation. The term "purified hemicellulose" is not meant to indicate that the hemicellulose is necessarily absolutely pure, merely that it is purer than a hemicellulose that has not been purified by one or more chemical or physical purification methods. The hydrolysis may be chemical hydrolysis, for example by acid or steam, or enzyme catalyzed hydrolysis. Hydrolysis can be partial or complete. Extraction can be carried out using water or various other known solvents. Similarly, other separation and purification methods can be carried out under various conditions which are known in the art. Purification processes can also be used to remove some or all of organic acids, inorganics, pre-treatment inhibitors, lignin and degradation products from upstream processing.

As used herein, the term "xylo-oligosaccharide" or "xylooligsaccharide" or "XOS" refers to polysaccharides having 2-10 xylose units.

As used herein, the term "xylan" refers to polysaccharides having >10 xylose units. It will be understood that "xylan" includes glucuronoxylan (GX), arabinoxylan (AX), and glucoarabinoxylan (GAX).

As used herein, the term "Dextrose Equivalent" or "DE" is a measure of the amount of reducing sugar present in a sugar product expressed as a percentage on a dry weight basis relative to dextrose. A DE can be measured by any appropriate method. For example, in some embodiments, a DE can be measured using Lane-Eynon titration. In some embodiments, a DE can be determined using osmometry.

A "dietary supplement" can include medicinal products, natural health products, nutraceuticals, vitamins, minerals, protein supplements and the like. In some cases, a "dietary supplement" can be defined by a regulatory agency (e.g., the United States Food and Drug Administration) under an appropriate statute (e.g., 21 U.S.C. § 321).

As used herein, a "food product" is a material that is used for food or drink by humans or animals, chewing gum, or materials used for components thereof (see, e.g., 21 U.S.C. § 321). In some embodiments, a food product can be a food (e.g., a solid food). For example, in some embodiments, a food product can be pie filing, a cookie (e.g., a chocolate chip cookie), a candy (e.g., a taffy chew), a bar (e.g., a cereal bar or a granola bar), a cake, a bread, a cracker, a canned food (e.g., canned soup, canned fruit), or a dairy product (e.g., yogurt, ice cream). In some embodiments, a food product can be a beverage. For example, in some embodiments, a food product can be a juice (e.g., a juice cocktail), a soda, or an energy drink. In some embodiments, a food product can be chewing gum.

Various references to percentage of components of the composition appear throughout the application. The percentages are percent-by-weight unless otherwise indicated.

Cellulose and hemicellulose are two of the main components found in plant material along with a third component lignin. While these materials are a natural source of hexose (C6) and pentose (C5) sugars, they typically cannot be digested in the human gut. Dextrose (D-glucose) is a commonly used form of digestible C6 sugar. In some cases, dextrose can be obtained by chemical or enzymatic hydrolysis of cellulose derived from plant sources. Hemicellulose can also be fully or partially hydrolyzed by, e.g., chemical or enzymatic processing. For example, hemicellulose can be partially hydrolyzed to xylo-oligosaccharides or fully hydrolyzed to xylose. In some cases, hydrolysis conditions can be controlled to provide incomplete hydrolysis, yielding a mixture of xylose, xylo-oligosaccharides and xylan.

In some embodiments, a sweetener composition can be prepared by combining glucose with purified hemicellulose. In some embodiments, the purified hemicellulose is partially hydrolyzed hemicellulose and comprises a mixture of xylan, xylo-oligosaccharide and xylose. In some embodiments, the glucose is derived from cellulose. The cellulose and hemicellulose can, in some embodiments, be obtained from lignocellulosic biomass and in some embodiments, the cellulose and hemicellulose may be derived from the same lignocellulosic biomass. The lignocellulosic biomass may comprise plant material that is not typically considered suitable for direct human digestion, such as hard or soft wood, plant stems and stalks. Sources of lignocellulosic biomass include but are not limited to straw (e.g., wheat straw), corn stover, sugarcane bagasse, hardwoods, softwoods and the like. The lignocellulosic biomass can be obtained as a by-product of other industry, such as agriculture, forestry, and energy crops.

Purified hemicellulose for use in the compositions can be partially hydrolyzed to provide a mixture of xylan, xylo-oligosaccharide, and xylose, in any appropriate proportion. In some cases, the amount of xylan can range from 20-95%, the amount of xylo-oligosaccharide can range from 5-60%, and the xylose can range from 1-40% by dry weight of the purified hemicellulose. In some embodiments, the amount of xylan can range from 50-95%, the amount of xylo-oligosaccharide can range from 5-30%, and the amount of xylose can range from 1-25% by dry weight of the purified hemicellulose. In some embodiments, the purified hemicellulose can include less than 10% of other sugars and sugar polymers that are not xylose, xylo-oligosaccharide, and xylan. In a further embodiment, the purified hemicellulose includes less than 5%, or less than 2% or less than 1% of other sugars and sugar polymers that are not xylose, xylo-oligosaccharide, and xylan. In some embodiments, the purified hemicellulose can be partially hydrolyzed hemicellulose derived from lignocellulosic biomass and can comprise about 87% xylan, about 9% xylo-oligosaccharide, and about 4% xylose.

In some cases, a purified hemicellulose composition can be combined with glucose (e.g., purified glucose, dextrose, purified dextrose, or a combination thereof) in various proportions to produce compositions of varying DE. A composition with varying DE can have varying properties with respects to sweetness and viscosity. In some cases, compositions having a DE in the range of 35-75 and particularly 40-65 DE can be made and used as described herein. In some cases, compositions having a DE of 53, 42, and 63 can be made and used as described herein. Sweetener compositions including a purified hemicellulose composition combined with glucose (e.g., purified glucose, dextrose, purified dextrose, or a combination thereof) in varying proportions can be prepared to approximate the DE and viscosity of commercially available syrups comprising dextrose, glucose oligomers and starch, such as corn syrups, are provided herein. In some embodiments, sweetener compositions including a purified hemicellulose composition combined with glucose (e.g., purified glucose, dextrose, purified dextrose, or a combination thereof) in varying proportions can be prepared to approximate the sweetness and viscosity of commercially available syrups of dextrose and starch.

Sweetener compositions also are provided herein. In some embodiments, a sweetener composition can include glucose and hemicellulose. In some embodiments, the hemicellulose can be purified. Hemicellulose can be purified by any appropriate method. In some embodiments, hemicellulose can be purified by a method disclosed herein. A degree of purification can be determined by any appropriate method. In some embodiments, the degree of purification can be determined by determining the percentage (e.g., by dry weight) of one or more impurities remaining in the purified hemicellulose (e.g., polyphenols, ash, protein, or a combination thereof) and subtracting that number from 100. By way of example only, hemicellulose including 0.4% ash and no other impurities could be considered to be 99.6% pure. In some embodiments, the degree of purification can be determined by assessing the percentage (e.g., by dry weight) of one or more desired components (e.g., xylan such as arabinoxylan) and using that percentage as the degree of purity. By way of example only, hemicellulose including 97% arabinoxylan could be considered to be 97% pure. In some embodiments, hemicellulose can be about 80% to about 99.9% pure (e.g., about 85% to about 99.9%, about 90% to about 99.9%, about 95% to about 99.9%, about 98% to about 99.9%, about 99% to about 99.9%, about 80% to about 99%, about 80% to about 98%, about 80% to about 95%, about 80% to about 90%, about 80% to about 85%, about 85% to about 99%, about 90% to about 99%, about 90% to about 95%, about 95% to about 99%, about 92% to about 98%, or about 94% to about 96%). In some embodiments, hemicellulose can be at least about 90% pure (e.g., at least about 91%, 92%, 93%, 94%, 95%, 96%, 97%, 98%, or 99% pure). In some embodiments, glucose can be about 90% to about 99.9% pure (e.g., about 85% to about 99.9%, about 90% to about 99.9%, about 95% to about 99.9%, about 98% to about 99.9%, about 99% to about 99.9%, about 80% to about 99%, about 80% to about 98%, about 80% to about 95%, about 80% to about 90%, about 80% to about 85%, about 85% to about 99%, about 90% to about 99%, about 90% to about 95%, about 95% to about 99%, about 92% to about 98%, or about 94% to about 96%). In some embodiments, glucose can be at least about 90% pure (e.g., at least about 91%, 92%, 93%, 94%, 95%, 96%, 97%, 98%, or 99% pure).

A sweetener composition provided herein can have any appropriate proportion of glucose and hemicellulose (e.g., purified hemicellulose). For example, in some embodiments, a sweetener composition can include about 5% to about 95% by dry weight of glucose (e.g., about 5% to about 90%, 5% to about 80%, about 5% to about 75%, about 5% to about 70%, about 5% to about 60%, about 5% to about 50%, about 5% to about 40%, about 5% to about 30%, about 5% to about 25%, about 5% to about 20%, about 5% to about 10%, about 10% to about 95%, about 10% to about 90%, about 10% to about 80%, about 10% to about 75%, about 10% to about 70%, about 10% to about 60%, about 10% to about 50%, about 10% to about 40%, about 10% to about 30%, about 10% to about 25%, about 10% to about 20%, about 20% to about 95%, about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 95%, about 25% to about 90%, about 25% to about 80%, about 25% to about 75%, about 25% to about 70%, about 25% to about 60%, about 25% to about 50%, about 25% to about 40%, about 25% to about 30%, about 30% to about 95%, about 30% to about 90%, about 30% to about 80%, about 30% to about 75%, about 30% to about 70%, about 30% to about 60%, about 30% to about 50%, about 30% to about 40%, about 40% to about 95%, about 40% to about 90%, about 40% to about 80%, about 40% to about 75%, about 40% to about 70%, about 40% to about 60%, about 40% to about 50%, about 45% to about 55%, about 48% to about 53%, about 50% to about 95%, about 50% to about 90%, about 50% to about 80%, about 50% to about 75%, about 50% to about 70%, about 50% to about 60%, about 60% to about 95%, about 60% to about 90%, about 60% to about 80%, about 60% to about 75%, about 60% to about 70%, about 70% to about 95%, about 70% to about 90%, about 70% to about 80%, about 70% to about 75%, about 75% to about 95%, about 75% to about 90%, about 75% to about 80%, about 80% to about 95%, about 80% to about 90%, or about 90% to about 95%) by dry weight of glucose). For example, in some embodiments, a sweetener composition can include about 5% to about 85% by dry weight of glucose (e.g., about 5% to about 70%, about 5% to about 50%, about 5% to about 30%, about 5% to about 10%, about 10% to about 85%, about 30% to about 85%, about 50% to about 85%, about 70% to about 85%, about 30% to about 70%, about 40% to about 60%, or about 45% to about 55% by dry weight of glucose). For example, in some embodiments, a sweetener composition can include about 5% to about 95% by dry weight of hemicellulose (e.g., purified hemicellulose) (e.g., about 5% to about 95%, about 5% to about 80%, about 5% to about 75%, about 5% to about 70%, about 5% to about 60%, about 5% to about 50%, about 5% to about 40%, about 5% to about 30%, about 5% to about 25%, about 5% to about 20%, about 5% to about 10%, about 10% to about 95%, about 10% to about 90%, about 10% to about 80%, about 10% to about 75%, about 10% to about 70%, about 10% to about 60%, about 10% to about 50%, about 10% to about 40%, about 10% to about 30%, about 10% to about 25%, about 10% to about 20%, about 20% to about 95%, about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 95%, about 25% to about 90%, about 25% to about 80%, about 25% to about 75%, about 25% to about 70%, about 25% to about 60%, about 25% to about 50%, about 25% to about 40%, about 25% to about 30%, about 30% to about 95%, about 30% to about 90%, about 30% to about 80%, about 30% to about 75%, about 30% to about 70%, about 30% to about 60%, about 30% to about 50%, about 30% to about 40%, about 40% to about 95%, about 40% to about 90%, about 40% to about 80%, about 40% to about 75%, about 40% to about 70%, about 40% to about 60%, about 40% to about 50%, about 45% to about 55%, about 50% to about 95%, about 50% to about 90%, about 50% to about 80%, about 50% to about 75%, about 50% to about 70%, about 50% to about 60%, about 60% to about 95%, about 60% to about 90%, about 60% to about 80%, about 60% to about 75%, about 60% to about 70%, about 70% to about 95%, about 70% to about 90%, about 70% to about 80%, about 70% to about 75%, about 75% to about 95%, about 75% to about 90%, about 75% to about 80%, about 80% to about 95%, about 80% to about 90%, or about 90% to about 95%) by dry weight of hemicellulose (e.g., purified hemicellulose)). For example, in some embodiments, a sweetener composition can include about 5% to about 85% by dry weight of hemicellulose (e.g., purified hemicellulose) (e.g., about 5% to about 70%, about 5% to about 50%, about 5% to about 30%, about 5% to about 10%, about 10% to about 85%, about 30% to about 85%, about 50% to about 85%, about 70% to about 85%, about 30% to about 70%, about 40% to about 60%, or about 45% to about 55% by dry weight of hemicellulose (e.g., purified hemicellulose). In some embodiments, the percent by dry weight of glucose and the percent by dry weight of hemicellulose (e.g., purified hemicellulose) in a sweetener composition provided herein add to about 95%, about 96%, about 97%, about 98%, about 99%, or about 100%.

Glucose can be provided in any appropriate form, or in a mixture of forms. In some embodiments, glucose can be provided in the form of dextrose. In some embodiments, glucose can be provided as a mixture of dextrose and other isomer monomers.

In some cases, a sweetener composition described herein can be characterized by components that are not present in the sweetener composition. In some cases, a sweetener composition described herein can lack components that are present in other sweetener compositions. In some cases, a sweetener composition described herein can be characterized by components that are present in amounts different than other sweetener compositions. In some cases, a sweetener composition described herein can lack components that may be present in a starting material (e.g., a lignocellulosic biomass) but that may lend undesired odors, flavors, or colors to a sweetener component (e.g., glucose or hemicellulose such as a purified hemicellulose). In some cases, a sweetener composition described herein can have decreased amounts components that may be present in a starting material (e.g., a lignocellulosic biomass) but that may lend undesired odors, flavors, or colors to a sweetener component (e.g., glucose or hemicellulose such as a purified hemicellulose). For example, a sweetener composition can have an ash content of less than 0.4% (e.g., less than 0.3%, 0.2%, or 0.1%) by dry weight. For example, in some cases, corn syrups can include maltose, maltotriose, or a combination thereof.

In some embodiments, a sweetener composition described herein can lack maltose, maltotriose, or a combination thereof. In some embodiments, a sweetener composition described herein can include maltose in an amount less than about 15% by dry weight (e.g., less than about 14%, 13%, 12%, 11%, 10%, 9%, 8%, 7%, 6%, 5%, 4%, 3%, 2%, or 1% by dry weight). In some embodiments, a sweetener composition described herein can include maltotriose in an amount less than about 15% by dry weight (e.g., less than about 14%, 13%, 12%, 11%, 10%, 9%, 8%, 7%, 6%, 5%, 4%, 3%, 2%, or 1% by dry weight).

In some embodiments, a sweetener composition described herein can have components that are primarily glucose (e.g., dextrose), xylose, xylo-oligosaccharide, xylan, or hydrolysis products thereof. Accordingly, in some embodiments, a sweetener composition described herein can include sugars or sugar polymers that are not glucose (e.g., dextrose), xylose, xylo-oligosaccharide, xylan, or a hydrolysis product thereof in an amount less than about 15% by dry weight (e.g., less than about 14%, 13%, 12%, 11%, 10%, 9%, 8%, 7%, 6%, 5%, 4%, 3%, 2%, or 1% by dry weight).

In some embodiments, a sweetener composition described herein can include sugars other than glucose (e.g., dextrose), xylose, xylo-oligosaccharide, xylan, or a hydrolysis product thereof. Accordingly, in some embodiments, a sweetener composition described herein can include glucomannan, mannose, or a combination thereof in amount less than about 15% by dry weight (e.g., less than about 14%, 13%, 12%, 11%, 10%, 9%, 8%, 7%, 6%, 5%, 4%, 3%, 2%, or 1% by dry weight). In some embodiments, a sweetener composition described herein can include no glucomannan. In some embodiments, a sweetener compositions described herein can include no mannose.

Also provided herein are purified hemicellulose compositions (also called 'purified hemicellulose'). A purified hemicellulose composition can have any appropriate components. In some embodiments, a purified hemicellulose composition can include xylose, xylo-oligosaccharide, and xylan, and hydrolysis products thereof. The components of the purified hemicellulose composition can be present in any appropriate amounts.

For example, xylan can be present in a purified hemicellulose composition in any appropriate amount. In some embodiments, a purified hemicellulose composition can include about 20% to about 95% by dry weight of xylan (e.g., about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 95%, about 25% to about 90%, about 25% to about 80%, about 25% to about 75%, about 25% to about 70%, about 25% to about 60%, about 25% to about 50%, about 25% to about 40%, about 25% to about 30%, about 30% to about 95%, about 30% to about 90%, about 30% to about 80%, about 30% to about 75%, about 30% to about 70%, about 30% to about 60%, about 30% to about 50%, about 30% to about 40%, about 40% to about 95%, about 40% to about 90%, about 40% to about 80%, about 40% to about 75%, about 40% to about 70%, about 40% to about 60%, about 40% to about 50%, about 50% to about 95%, about 50% to about 90%, about 50% to about 80%, about 50% to about 75%, about 50% to about 70%, about 50% to about 60%, about 60% to about 95%, about 60% to about 90%, about 60% to about 80%, about 60% to about 75%, about 60% to about 70%, about 70% to about 95%, about 70% to about 90%, about 70% to about 80%, about 70% to about 75%, about 75% to about 95%, about 75% to about 90%, about 75% to about 80%, about 80% to about 90%, about 82% to about 92%, about 85% to about 89%, about 87% to about 88%, about 90% to about 95%, about 80%, about 81%, about 82%, about 83%, about 84%, about 85%, about 86%, about 87%, about 88%, about 89%, about 90%, about 91%, about 92%, about 93%, about 94%, or about 95% by dry weight of xylan).

In some cases, xylan can include arabinoxylan (AX), glucuronoxylan, xyloglucan, glucomannan, hydrolysis products thereof, or a combination thereof, each of which can be present in the xylan in any appropriate amount. In some embodiments, xylan can be predominantly AX. In some embodiments, xylan can include about 70% to about 99% (e.g., about 70% to about 95%, about 70% to about 90%, about 70% to about 85%, about 70% to about 80%, about 70% to about 75%, about 75% to about 99%, about 75% to about 95%, about 75% to about 90%, about 75% to about 85%, about 75% to about 80%, about 80% to about 99%, about 80% to about 95%, about 80% to about 90%, about 80% to about 85%, about 85% to about 99%, about 85% to about 95%, about 85% to about 90%, about 90% to about 99%, about 90% to about 95%, or about 95% to about 99%) by dry weight of AX. In some embodiments, xylan can include at least about 70% (e.g., at least about 75%, 80%, 85%, 90%, 95%, 96%, 97%, 98%, or 99%) by dry weight of AX.

For example, xylo-oligosaccharide can be present in a purified hemicellulose composition in any appropriate amount. In some embodiments, a purified hemicellulose composition can be about 5% to about 60% by dry weight of xylo-oligosaccharide (e.g., about 5% to about 50%, about 5% to about 40%, about 5% to about 30%, about 5% to about 20%, about 5% to about 15%, about 5% to about 10%, about 8% to about 10%, about 10% to about 60%, about 10% to about 50%, about 10% to about 40%, about 10% to about 30%, about 10% to about 20%, about 10% to about 15%, about 15% to about 60%, about 15% to about 50%, about 15% to about 40%, about 15% to about 30%, about 15% to about 20%, about 20% to about 60%, about 20% to about 50%, about 20% to about 40%, about 20% to about 30%, about 30% to about 60%, about 30% to about 50%, about 30% to about 40%, about 40% to about 60%, about 40% to about 50%, about 50% to about 60%, about 5%, about 6%, about 7%, about 8%, about 9%, about 10%, about 11%, about 12%, about 13%, about 14%, or about 15% by dry weight of xylo-oligosaccharide).

For example, xylose can be present in a purified hemicellulose composition in any appropriate amount. In some embodiments, a purified hemicellulose composition can be about 0% to about 40% by dry weight of xylose (e.g., about 1% to about 30%, about 1% to about 20%, about 1% to about 25%, about 1% to about 20%, about 1% to about 15%, about 1% to about 10%, about 1% to about 5%, about 4% to about 5%, about 5% to about 40%, about 5% to about 30%, about 5% to about 25%, about 5% to about 20%, about 5% to about 15%, about 5% to about 10%, about 10% to about 40%, about 10% to about 30%, about 10% to about 25%, about 10% to about 20%, about 10% to about 15%, about 15% to about 40%, about 15% to about 30%, about 15% to about 25%, about 15% to about 20%, about 20% to about 40%, about 20% to about 30%, about 20% to about 25%, about 25% to about 40%, about 25% to about 30%, about 30% to about 40%, about 0% to about 5%, about 0% to about 1%, about 0.1% to about 40%, about 0.1% to about 25%, about 0.1% to about 10%, about 0.1% to about 5%, about 0.1% to about 1%, about 0.1% to about 0.5%, about 0.1%, about 0.5%, about 1%, about 2%, about 3%, about 4%, about 5%, about 6%, about 7%, about 8%, about 9%, or about 10% by dry weight of xylose). For example, in some embodiments, a purified hemicellulose composition can be about 0% to about 5% by dry weight of xylose (e.g., about 0% to about 4%, about 0% to about 2%, about 0% to about 1%, about 0% to about 0.5%, about 0% to about 0.1%, about 0.1% to about 5%, about 0.5% to about 5%, about 1% to about 5%, about 2% to about 5%, about 4% to about 5%, about 0.1% to about 5%, about 0.1% to about 4%, about 0.1% to about 2%, about 0.1% to about 1%, about 0.1% to about 0.5%, about 0.5% to about 4%, about 0.5% to about 2%, or about 0.5% to about 1% by dry weight of xylose).

In some cases, a purified hemicellulose composition described herein can be characterized by components that are not present in the hemicellulose. In some cases, a purified hemicellulose composition described herein can lack components that are present in other hemicellulose preparations. In some cases, a purified hemicellulose composition described herein can be characterized by components that are present in amounts different than other hemicellulose preparations. In some cases, a purified hemicellulose composition described herein can lack components that may be present in a starting material (e.g., a lignocellulosic biomass) but that may lend undesired odors, flavors, or colors to hemicellulose (e.g., purified hemicellulose). In some cases, a purified hemicellulose composition described herein can have a decreased amount of components that may be present in a starting material (e.g., a lignocellulosic biomass) but that may lend undesired odors, flavors, or colors to hemicellulose. For example, a purified hemicellulose composition described herein can have an ash content of less than about 0.4% (e.g., less than 0.3%, 0.2%, or 0.1%) by dry weight.

Corn syrups are commonly used sweeteners. A purified hemicellulose composition described herein can include different components than some corn syrups. For example, in some cases, corn syrups can include maltose, maltotriose, or a combination thereof. Accordingly, in some embodiments, a purified hemicellulose composition described herein can lack maltose, maltotriose, or a combination thereof. In some embodiments, a purified hemicellulose composition described herein can include maltose in an amount less than about 15% by dry weight (e.g., less than about 14%, 13%, 12%, 11%, 10%, 9%, 8%, 7%, 6%, 5%, 4%, 3%, 2%, or 1% by dry weight). In some embodiments, hemicellulose described herein can include maltotriose in an amount less than about 15% by dry weight (e.g., less than about 14%, 13%, 12%, 11%, 10%, 9%, 8%, 7%, 6%, 5%, 4%, 3%, 2%, or 1% by dry weight).

In some embodiments, a purified hemicellulose composition described herein can have components that are primarily xylose, xylo-oligosaccharide, xylan, or hydrolysis products thereof. Accordingly, in some embodiments, a purified hemicellulose composition described herein can include sugars or sugar polymers that are not xylose, xylo-oligosaccharide, xylan, or a hydrolysis product thereof in an amount less than about less than about 15% by dry weight (e.g., less than about 14%, 13%, 12%, 11%, 10%, 9%, 8%, 7%, 6%, 5%, 4%, 3%, 2%, or 1% by dry weight).

In some embodiments, a purified hemicellulose composition described herein can include sugars other than xylose, xylo-oligosaccharide, xylan, or a hydrolysis product thereof. Accordingly, in some embodiments, a purified hemicellulose composition described herein can include glucomannan, mannose, or a combination thereof in amount less than about 15% by dry weight (e.g., less than about 14%, 13%, 12%, 11%, 10%, 9%, 8%, 7%, 6%, 5%, 4%, 3%, 2%, or 1% by dry weight). In some embodiments, a purified hemicellulose composition described herein can include no glucomannan. In some embodiments, a purified hemicellulose composition described herein can include no mannose.

The hemicellulose material (e.g., the xylan (e.g., arabinoxylan), xylo-oligosaccharides, xylose, or a combination thereof) of a purified hemicellulose composition described herein can have any appropriate molecular weight. A molecular weight can be determined by any appropriate method. For example, the hemicellulose material of a purified hemicellulose composition as described herein can have a molecular weight (as $M_w$) of less than about 4000 Da (e.g., less than about 3500 Da or 3000 Da). As another example, the hemicellulose material of a purified hemicellulose composition described herein can have a molecular weight (as $M_w$) of about 1500 to about 4000 Da (e.g., about 1500 to about 3500 Da, about 1500 to about 3000 Da, about 1500 to about 2500 Da, about 1500 to about 2000 Da, about 2000 to about 4000 Da, about 2000 to about 3500 Da, about 2000 to about 3000 Da, about 2000 to about 2500 Da, about 2500 to about 4000 Da, about 2500 to about 3500 Da, about 2500 to about 3000 Da, about 3000 to about 4000 Da, about 3000 to about 3500 Da, or about 3500 to about 4000 Da).

A purified hemicellulose composition as described herein can have any appropriate color. Without being bound by any particular theory, it is believed that polyphenols can contribute to the color of a purified hemicellulose composition to make it browner; consequently, a lighter-colored purified hemicellulose is believed to be lower in polyphenol content than a darker-colored purified hemicellulose. In some embodiments, a purified hemicellulose composition provided herein can be off-white. In some embodiments, a purified hemicellulose composition provided herein can be white.

A purified hemicellulose composition described herein can have any appropriate polyphenol content. In some embodiments, a purified hemicellulose composition described herein can be less than about 0.5% (e.g., less than about 0.4%, 0.3%, 0.2%, or 0.1%) by dry mass polyphenols.

A purified hemicellulose composition described herein can have any appropriate antioxidant level. An antioxidant level can be measured using any appropriate method. For example, the micromole trolox equivalent per 100 grams (µmol TE/100 g) of a purified hemicellulose composition can be determined. In some embodiments, a purified hemicellulose composition described herein can have an antioxidant level of less than about 10000 (e.g., less than about 9500, 9000, 8500, or 8000) µmole TE/100 g. In some embodiments, a purified hemicellulose composition described herein can have an antioxidant level of about 0 to about 10000 (e.g., about 0 to about 8000, about 0 to about 6000, about 0 to about 4000, about 0 to about 2000, about 0 to about 1000, about 1000 to about 10000, about 1000 to about 10000, about 2000 to about 10000, about 4000 to about 10000, about 6000 to about 10000, about 8000 to about 10000, about 1000 to about 9000, about 3000 to about 7000, or about 7000 to about 9000) µmol TE/100 g.

In some embodiments, a purified hemicellulose composition described herein can include xylan, xylo-oligosaccharides, and xylose in any of the amounts disclosed herein. In some embodiments, a purified hemicellulose composition can include about 82% to about 92% by dry weight of xylan, about 8% to about 9% by dry weight of xylo-oligosaccharide, and about 4% to about 5% by dry weight of xylose. In some embodiments, a purified hemicellulose composition described herein can include about 87% to about 88% by dry weight of xylan, about 8% to about 9% by dry weight of xylo-oligosaccharide, and about 4% to about 5% by dry weight of xylose. In some embodiments, a purified hemicellulose composition described herein can include about 87.3% by dry weight of xylan, about 8.5% by dry weight of xylo-oligosaccharide, and about 4.2% by dry weight of xylose. In some embodiments, a purified hemicellulose composition can include about 85% to about 95% (e.g., about 85% to about 93%, about 85% to about 91%, about 85% to about 89%, about 85% to about 87%, about 87% to about 95%, about 89% to about 95%, about 91% to about 95%, about 93% to about 95%, about 87% to about 93%, about 86% to about 88%, about 88% to about 92%, or about 90% to about 95%) by dry weight of xylan, about 5% to about 25% (e.g., about 5% to about 20%, about 5% to about 15%, about 5% to about 10%, about 5% to about 8%, about 10% to about 25%, about 15% to about 25%, about 20% to about 25%, about 10% to about 20%, about 6% to about 12%, or about 8% to about 10%) by dry weight of xylo-oligosaccharide, and about 0% to about 5% (e.g., about 0% to about 4%, about 0% to about 2%, about 0% to about 1%, about 0% to about 0.5%, about 0% to about 0.1%, about 0.1% to about 5%, about 0.5% to about 5%, about 1% to about 5%, about 2% to about 5%, about 4% to about 5%, about 0.1% to about 5%, about 0.1% to about 4%, about 0.1% to about 2%, about 0.1% to about 1%, about 0.1% to about 0.5%, about 0.5% to about 4%, about 0.5% to about 2%, or about 0.5% to about 1%) by dry weight of xylose. In some embodiments, the xylan can be about 95% to about 99% by dry weight of arabinoxylan. In some embodiments, a purified hemicellulose composition described herein is off-white. In some embodiments, a purified hemicellulose composition described herein has a molecular weight (as $M_w$) of less than 4000 Da. In some embodiments, a purified hemicellulose composition described herein has a polyphenol content of less than about 0.5% by dry weight. In some embodiments, a purified hemicellulose composition described herein has an antioxidant level of less than about 10000 μmol TE/100 g. In some embodiments, a purified hemicellulose composition described herein can have a purity of at least 95%.

It will be understood that the amount of a component of a purified hemicellulose composition described herein (e.g., xylan, xylo-oligosaccharide, or xylose) in a sweetener composition described herein can be determined by multiplying the amount of hemicellulose in the sweetener composition described herein (e.g., as a percent by dry weight) by the amount of the component (e.g., xylan, xylo-oligosaccharide, or xylose) in the purified hemicellulose composition described herein.

Also provided herein is a sweetener composition comprising about 48% to about 53% by dry weight of dextrose, about 41% to about 45% by dry weight of xylan, about 4% to about 5% by dry weight of xylo-oligosaccharides; and about 2% to about 2.5% by dry weight of xylose.

Also provided herein is a sweetener composition comprising about 50% by dry weight of dextrose; about 43% by dry weight of xylan; about 4% by dry weight of xylo-oligosaccharides; and about 2% by dry weight of xylose.

A sweetener composition described herein can have a dextrose equivalent (DE) of any appropriate value. A DE can be determined by any appropriate method. For example, in some embodiments, a sweetener composition described herein can have a DE of about 35 to about 75 (e.g., about 35 to about 40, about 35 to about 45, about 35 to about 50, about 35 to about 55, about 35 to about 60, about 35 go about 65, about 35 to about 75, about 40 to about 45, about 40 to about 50, about 40 to about 55, about 40 to about 60, about 40 to about 65, about 40 to about 70, about 40 to about 75, about 45 to about 50, about 45 to about 55, about 45 to about 60, about 45 to about 65, about 45 to about 70, about 45 to about 75, about 50 to about 55, about 50 to about 60, about 50 to about 65, about 50 to about 70, about 50 to about 75, about 55 to about 60, about 55 to about 65, about 55 to about 70, about 55 to about 75, about 60 to about 65, about 60 to about 70, about 60 to about 75, about 65 to about 70, about 65 to about 75, about 70 to about 75, about 42, about 53, or about 63). Without being bound by any particular theory, it is believed that a sweetener composition described herein with a DE that is within about 10 percent as a commercially available sweetener may be substituted in approximately equal volume (or within about 10 percent) for the commercially available sweetener.

A sweetener composition described herein can have a glycemic index (GI) of any appropriate value. A GI can be determined by any appropriate method. For example, in some embodiments, a sweetener composition described herein can have a GI of about 10 to about 80 (e.g., about 10 to about 60, about 10 to about 50, about 10 to about 40, about 10 to about 30, about 10 to about 20, about 20 to about 80, about 30 to about 80, about 40 to about 80, about 50 to about 80, about 60 to about 80, about 20 to about 70, about 30 to about 60, about 35 to about 50, about 40 to about 50, or about 40 about 45). The glycemic index of glucose (e.g., dextrose) is typically reported to be 100. The glycemic index of sucrose is typically reported to be 65. Without being bound by any particular theory, it is believed that sweeteners with lower GI values can aid in management of blood sugar and insulin levels and/or be useful in controlling appetite and weight loss.

A sweetener composition described herein can have a calorie content of any appropriate value. A calorie content can be determined by any appropriate method. For example, in some embodiments, a sweetener composition described herein can provide about 100 to about 225 calories (e.g., about 100 to about 200, about 100 to about 175, about 100 to about 150, about 100 to about 125, about 125 to about 225, about 150 to about 225, about 175 to about 225, about 200 to about 225, about 125 to about 200, about 150 to about 200, about 175 to about 200, or about 180 to about 200) per 100 g of the sweetener composition.

A sweetener composition described herein can include soluble fiber. In some embodiments, soluble fiber can be provided in a sweetener composition via hemicellulose. A sweetener composition described herein can include any appropriate amount of soluble fiber. Soluble fiber content can be measured using any appropriate method. In some embodiments, a sweetener composition described herein can provide about 4 g to about 95 g (e.g., about 4 g to about 85 g, about 4 g to about 75 g, about 4 g to about 65 g, about 4 g to about 55 g, about 4 g to about 45 g, about 4 g to about 35 g, about 4 g to about 25 g, about 4 g to about 15 g, about 15 g to about 95 g, about 25 g to about 95 g, about 35 g to about 95 g, about 45 g to about 95 g, about 55 g to about 95 g, about 65 g to about 95 g, about 75 g to about 95 g, about 85 g to about 95 g, about 10 g to about 80 g, about 20 g to about 70 g, about 30 g to about 60 g, about 40 g to about 50 g, about 30 to about 40 g, about 35 g to about 45 g, about 45 to about 55 g, about 35 g, about 36 g, about 37 g, about 38 g, about 39 g, about 40 g, about 41 g, about 42 g, about 43 g, about 44 g, or about 45 g) of soluble fiber per 100 g of the sweetener composition. In some embodiments, a sweetener composition described herein can lack insoluble fiber. In some embodiments, the soluble fiber content can be the same as the purified hemicellulose (e.g., arabinoxylan) content (e.g., in percent by dry weight).

A sweetener composition described herein can include prebiotics. In some embodiments, prebiotics can be provided in a sweetener composition via hemicellulose. A sweetener composition described herein can include any appropriate amount of prebiotics. Prebiotic content can be measured using any appropriate method. In some embodiments, a sweetener composition described herein can provide about 4 g to about 95 g (e.g., about 4 g to about 85 g, about 4 g to about 75 g, about 4 g to about 65 g, about 4 g to about 55 g, about 4 g to about 45 g, about 4 g to about 35 g, about 4 g to about 25 g, about 4 g to about 15 g, about 4 g to about 10 g, about 4 g to about 8 g, about 15 g to about 95 g, about 25 g to about 95 g, about 35 g to about 95 g, about 45 g to about 95 g, about 55 g to about 95 g, about 65 g to about 95 g, about 75 g to about 95 g, about 85 g to about 95 g, about 10 g to about 80 g, about 20 g to about 70 g, about 30 g to about 60 g, about 40 g to about 50 g, about 30 to about 40 g, about 35 g to about 45 g, or about 45 to about 55 g) of prebiotics per 100 g of the sweetener composition. In some embodiments, the prebiotic content can be the same as the purified hemicellulose (e.g., arabinoxylan) content (e.g., in percent by dry weight).

A sweetener composition described herein can be in any appropriate form. For example, in some embodiments, a sweetener composition described herein can be a solid. In some embodiments, a sweetener composition described herein can be a syrup. A syrup can have any appropriate properties. For example, in some embodiments, a sweetener composition described herein can have a viscosity of about 2500 to about 7000 cP (e.g., about 2500 to about 6000 cP, about 2500 to about 5000 cP, about 2500 to about 4000 cP, about 2500 to about 3000 cP, about 3000 to about 7000 cP, about 4000 to about 7000 cP, about 5000 to about 7000 cP, about 6000 to about 7000 cP, about 2700 to about 3000 cP, about 3000 to about 6000 cP, about 3000 to about 5000 cP, or about 4000 to about 6000 cP) at 120° C.

This document also provides products comprising any one or more of the purified hemicellulose compositions described herein. For example, this document also provides sweetener compositions comprising any one or more of the purified hemicellulose compositions described herein. For example, this document also provides food products comprising any one or more of the purified hemicellulose compositions described herein. This document also provides pharmaceutical compositions comprising any one or more of the purified hemicellulose compositions described herein. This document also provides dietary supplements comprising any one or more of the purified hemicellulose compositions described herein. Products comprising any one or more of the compositions provided herein can have advantages. Non-limiting examples of such advantages include a reduction in calories, reduction in glycemic index, provision of soluble fiber, provision of prebiotics, and provision of antioxidants. Without being bound by any particular theory, it is believed that hemicellulose (e.g., arabinoxylan) is a low-calorie carbohydrate, and that hemicellulose (e.g., arabinoxylan) is a source of soluble fiber that can be used by components of the microbiome to promote health. It is further believed that, in some cases, polyphenols and/or polyphenol units can act as antioxidants.

This document also provides uses of any one or more of the purified hemicellulose compositions described herein. For example, this document also provides the use of any one or more of the purified hemicellulose compositions described herein in a food product. For example, this document also provides the use of any one or more of the purified hemicellulose compositions described herein in a sweetener composition. This document also provides the use of any one or more of the purified hemicellulose compositions described herein in a pharmaceutical composition. This document also provides the use of any one or more of the purified hemicellulose compositions described herein in a dietary supplement.

This document also provides products comprising any one or more of the sweetener compositions described herein. For example, this document also provides food products comprising any one or more of the sweetener compositions described herein. This document also provides pharmaceutical compositions comprising any one or more of the sweetener compositions described herein. This document also provides dietary supplements comprising any one or more of the sweetener compositions described herein.

This document also provides uses of any one or more of the sweetener compositions described herein. For example, this document also provides the use of any one or more of the sweetener compositions described herein in a food product. This document also provides the use of any one or more of the sweetener compositions described herein in a pharmaceutical composition. This document also provides the use of any one or more of the sweetener compositions described herein in a dietary supplement.

This document also provides methods of sweetening a compositions using any one or more of the sweetener compositions described herein. For example, this document also provides a method of sweetening a food product including adding any one or more of the sweetener compositions described herein to the food product. This document also provides a method of sweetening a pharmaceutical composition including adding any one or more of the sweetener compositions described herein to the pharmaceutical composition. This document also provides a method of sweetening a dietary supplement including adding any one or more of the sweetener compositions described herein to the dietary supplement.

A pharmaceutical composition can be any appropriate pharmaceutical composition. Typically, a pharmaceutical composition includes at least one active ingredient (e.g., one, two, three, four, five, or more active ingredients such as drugs) in a pharmaceutically effective amount. In some embodiments, a pharmaceutical composition is an oral pharmaceutical formulation. Typically, an oral pharmaceutical formulation includes a sweetener.

This document also provides methods of modifying food preparation, for example, to reduce calorie content or to reduce glycemic index. In some embodiments, the methods can include substituting, in part or in whole, any of the sweetener compositions described herein for a sugar or sugar syrup in a recipe. For example, in some embodiments, a sweetener composition described herein can be substituted in an amount of about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) by mass or by volume for a sugar or sugar syrup in a recipe (e.g., 25%, 50%, 75%, or 100% of the sugar or sugar syrup in a recipe).

Accordingly, also provided herein is a method including providing a recipe including an amount of a sugar or sugar syrup and preparing the food product according to the recipe, but replacing at least a portion of the amount of the sugar or sugar syrup with a sweetener composition described herein in an amount of about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of the portion of the amount of the sugar or sugar syrup. Also provided herein is a method of reducing the calorie content of a food product prepared from a recipe including providing a recipe including an amount of a sugar or sugar syrup and preparing the food product according to the recipe, but replacing at least a portion of the amount of the sugar or sugar syrup with a sweetener composition described herein in an amount of about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of the portion of the amount of the sugar or sugar syrup. Also provided herein is a method of reducing the glycemic index of a food product prepared from a recipe comprising providing a recipe including an amount of a sugar or sugar syrup and preparing the food product according to the recipe, but replacing at least a portion of the amount of the sugar or sugar syrup with a sweetener described herein in an amount of about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of the portion of the amount of the sugar or sugar syrup.

In some cases, substituting a sweetener composition provided herein for an alternate sweetener (e.g., a sweetener that is not a sweetener composition provided herein) can provide similar performance (e.g., organoleptic properties (e.g., taste, smell, and/or mouthfeel) or physical properties), while having a lower calorie content, a lower glycemic index, a higher dietary fiber content, or a combination thereof. In some embodiments, substituting can include using about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of a sweetener composition provided herein for a given amount (e.g., by weight or by volume) of an alternate sweetener. In some embodiments, substituting can be an equal substitution (e.g., by dry weight or by volume). For example, in some embodiments, provided herein is a food product including an amount of the any one or more of the sweetener compositions provided herein, wherein the food product has organoleptic properties comparable to a similar food product comprising an amount of an alternate sweetener composition other than the sweetener composition, wherein the amount of the sweetener composition in the food product is from about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of the amount of the alternate sweetener composition in the similar food product. In some embodiments, organoleptic properties can be determined by a trained human panelist. For example, in some embodiments, provided herein is a food product including an amount of the any one or more of the sweetener compositions provided herein, wherein the food product has physical properties (e.g., tensile strength, cohesiveness, viscosity, appearance, temperature stability, storage stability, pH stability, and/or spread upon baking) comparable to a similar food product comprising an amount of an alternate sweetener composition other than the sweetener composition, wherein the amount of the sweetener composition in the food product is from about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of the amount of the alternate sweetener composition in the similar food product. Physical properties can be measured using any appropriate method. In some embodiments, a comparable physical property is within about 25% (e.g., within about 20%, 15%, 10%, 5%, 2%, or 1%) of the same property in the similar food product. In some such embodiments, a dextrose equivalent (DE) of the sweetener composition can be from about 50% to about 150% (e.g., about 50% to about 125%, about 50% to about 100%, about 50% to about 75%, about 75% to about 150%, about 75% to about 125%, about 75% to about 100%, about 100% to about 150%, about 100% to about 125%, about 125% to about 150%, about 50%, about 75%, about 100%, about 125%, or about 150%) of a DE of the alternate sweetener composition. In some cases the DE of the sweetener composition provided herein is about 30 to about 75 (e.g., about 40 to about 65, about 42, about 53, or about 63). In some embodiments, a food product can have a calorie content that is no more than 95% (e.g., no more than 93%, 92%, 91%, 90%, or 85%) of the calorie content of the similar food product. In some embodiments, a food product can have a dietary fiber content that is that at least 1 gram greater per serving (e.g., at least 2, 3, 4, or 5 grams greater per serving) of the dietary fiber of the similar food product. In some embodiments, the alternate sweetener composition is a corn syrup.

In yet a further aspect, compositions comprising various ratios of glucose to purified hemicellulose can be prepared. In one embodiment, the composition comprises less than 95% glucose. In a further embodiment, the composition comprises less than 94% glucose. In a further embodiment, the composition comprises less than 90% glucose or from 5-90% glucose. In a further embodiment, the composition comprises less than 75% glucose or from 30-75% glucose. In a further embodiment, the composition comprises less than 60% glucose or from 30-60% glucose. In still a further embodiment, the composition comprises about 30%, about 40% about 50% or about 60% glucose.

In another aspect, the ratio of the components of the composition comprising glucose, xylose, xylo-oligosaccharide, and xylan may be selected so as not to impart a significant degree of sweetness but rather to be used as a food ingredient primarily to impart other features such as viscosity.

The glycemic index (GI) can be measured using methods known in the art, for example, as described in "In vitro method for predicting glycemic index of foods using simulated digestion and an artificial neural network" R. L. Magaletta et al., Cereal Chemistry vol. 87, no. 4, 2010. Soluble fiber is measured by AOAC Official Methods of Analysis 2011.25.

This document also provides methods of preparing a hemicellulose composition. Any of the purified hemicellulose compositions described herein can be prepared by the methods described herein.

In some cases, the methods described herein can include extracting hemicellulose from a lignocellulosic biomass and purifying the extracted hemicellulose. Extracting hemicellulose from a lignocellulosic biomass can be accomplished by any appropriate method. Purifying the extracted hemicellulose can be accomplished using any appropriate method.

In some embodiments, a lignocellulosic biomass can be combined with water, and the lignocellulosic biomass can be activated using conditions comprising a first temperature and a first pressure to form an activated cellulose stream (e.g., a first activating step). In some embodiments, a pre-activating step can precede a first activating step. A first activated cellulose stream can be washed to form a washed first activated cellulose stream and a first soluble extract. A first soluble extract can be separated from a washed first activated cellulose stream by any appropriate method. In some embodiments, a first soluble extract can be separated from a washed first activated cellulose stream using filtration (e.g., vacuum filtration).

An exemplary method is shown in FIG. 1. Lignocellulosic biomass 101 can be fed to reactor 103 wherein lignocellulosic biomass 101 is subjected to a first activation step to produce a first activated cellulose stream 104. In the first activation step, lignocellulosic biomass 101 may be treated at an elevated temperature and pressure to produce first activated cellulose stream 104, e.g., comprising cellulose II and insoluble solids. The first activation step can be conducted in the presence of water. Water may be introduced into reactor 103 by one or more of: being present in lignocellulosic biomass 101, being present in reactor 103 when lignocellulosic biomass is introduced into reactor 103, or being introduced by feed stream 102. Reactor 103 can be a batch reactor or a continuous process reactor. In the case of a batch reactor, lignocellulosic biomass 101 can be fed to reactor 103, and the reactor, which can be a stirred tank reactor, can be raised to the operating conditions for a desired time. If reactor 103 is a continuous flow reactor, then it can be a steam exposition reactor and can be maintained at the desired operating condition. First activated cellulose stream 104 can be washed to extract soluble non-cellulosic components such as hemicellulose and some ash, extractives and lignin. First activated cellulose stream 104 and wash water 106 may be introduced to wash reactor 105 to produce soluble extract 107 and a washed first activated cellulose stream 108. Wash reactor 105 can be any appropriate reactor. Optionally, wash reactor 105 may be operated counter-currently, and it may be a counter-current belt filter. Other filtration or separation methods may be used such as a filter press, twin wire press, twin roll press, rotary vacuum filter or a centrifuge.

A lignocellulosic biomass can be any appropriate feedstock. For example, the lignocellulosic biomass may comprise one or more of straw, corn stover, bagasse, hardwoods, softwoods, energy crops, and the like. The raw agricultural material which is provided can, in some cases, be treated to remove rocks, soil, or other material present in the raw agricultural material and to reduce the size of the raw agricultural or forest based material that is fed to the process, such as by comminution, grinding, milling or otherwise treated. In some cases, a lignocellulosic biomass used to produce a purified hemicellulose composition described herein is wheat straw.

In some cases, a pre-activating step can include treating lignocellulosic biomass (e.g., wheat straw) with steam. A pre-activating step can include any appropriate temperature, pressure, and duration. In some embodiments, the temperature of a pre-activating step can be about 110° C. to about 150° C. (e.g., about 110° C. to about 140° C., about 110° C. to about 130° C., about 120° C. ° C. to about 150° C., about 120° C. to about 140° C., or about 125° C. to about 135° C.). In some embodiments, the duration of a pre-activating step can be about 5 minutes to about 30 minutes (e.g., about 5 minutes to about 25 minutes, about 5 minutes to about 15 minutes, about 10 minutes to about 30 minutes, about 20 minutes to about 30 minutes, about 10 minutes to about 30 minutes, or about 13 minutes to about 17 minutes). In some embodiments, the pressure of a pre-activation step can be about 10 psi to about 20 psi (e.g., about 10 to about 15 psi, about 15 to about 20 psi, about 10 psi, about 15 psi, or about 20 psi).

In some cases, a first activation step may be conducted under conditions that increase the amount of cellulose II in the first activated cellulose stream relative to the amount of cellulose II in the feedstock.

The temperature of a first activation step can be any appropriate temperature. In some cases, the temperature of a first activation step can be greater than 190° C. (e.g., greater than 200° C., 210° C., 220° C., 230° C., or 240° C.). In some embodiments, the temperature of a first activation step can be less than about 250° C. (e.g., less than 240° C., 230° C., or 220° C.). In some embodiments, the temperature of a first activation step can be about 190° C. to about 250° C. (e.g., about 190° C. to about 240° C., about 190° C. to about 230° C., about 190° C. to about 220° C., about 190° C. to about 210° C., about 190° C. to about 200° C., about 200° C. to about 250° C., about 200° C. to about 240° C., about 200° C. to about 230° C., about 200° C. to about 220° C., about 200° C. to about 210° C., about 210° C. to about 250° C., about 210° C. to about 240° C., about 210° C. to about 230° C., about 210° C. to about 220° C., about 220° C. to about 250° C., about 220° C. to about 240° C., about 220° C. to about 230° C., about 222° C. to about 230° C., about 230° C. to about 250° C., about 230° C. to about 240° C., or about 240° C. to about 250° C.).

The amount of moisture that is introduced in the first activation step can be any appropriate amount. In some embodiments, the amount of moisture can be at least about 30% (e.g., at least about 40% or at least about 50%) on the basis of the lignocellulosic biomass plus the moisture. In some embodiments, the amount of moisture can be less than 90% (e.g., less than 80%, 70%, or 60%). In some embodiments, the amount of moisture in the first activation step can be about 50%. In some embodiments, the amount of moisture in the first activation step can be about 10% to about 65% (e.g., about 10% to about 60%, about 10% to about 50%, about 10% to about 40%, about 10% to about 30%, about 10% to about 20%, about 20% to about 65%, about 30% to about 65%, about 40% to about 65%, about 50% to about 65%, about 20% to about 50%, about 30% to about 60%, or about 35% to about 55%).

The moisture in the first activation step can be in the form of steam or liquid water. It will be appreciated that the temperature and pressure of the first activation step may be selected such that liquid water in the first activation step. It will be appreciated that the temperature and pressure of the first activation step may be selected such that steam is present in the first activation step.

The pressure of a first activation step can be any appropriate pressure. In some embodiments, the pressure can be at least about 200 psig (e.g., at least about 250, 300, or 350 psig). In some embodiments, the pressure can be less than 500 psig (e.g., less than about 450 or 400 psig. Without being bound by any particular theory, it is believed that pressure in a reactor corresponds to temperature as per saturated steam thermodynamics as a minimum. In some embodiments, pressure may be increased over and above that value by adding a pressurized gas, or adding superheat.

The duration of the first activation step can be any appropriate duration. In some embodiments, the first activation step can be less than 30 minutes (e.g., less than 20, 10, or 5 minutes). In some embodiments, the duration of the first activation step can be about 1 minute to about 30 minutes (e.g., about 1 to about 25 minutes, about 1 to about 20 minutes, about 1 to about 15 minutes, about 1 to about 10 minutes, about 1 to about 5 minutes, about 5 to about 30 minutes, about 5 to about 25 minutes, about 5 to about 20 minutes, about 5 to about 15 minutes, about 5 to about 10 minutes, about 10 to about 30 minutes, about 10 to about 25 minutes, about 10 to about 20 minutes, about 10 to about 15 minutes, about 15 minutes to about 30 minutes, about 15 to about 25 minutes, about 15 to about 20 minutes, about 20 to about 30 minutes, about 20 to about 25 minutes, about 25 to about 30 minutes, about 1 minute, about 5 minutes, about 10 minutes, about 15 minutes, about 20 minutes, about 25 minutes, or about 30 minutes). It will be appreciated that duration of the first activation step can vary depending upon many factors including severity of the first activation step, e.g., the temperature and pressure of the first activation step.

It will be appreciated that the temperatures, pressures, and duration of treatment may be combined in any desired combination. Accordingly, for example, the first activation step may comprise subjecting the feedstock to a pressure between 200 and 500 psig and a temperature between 200 and 250° C. for 1 to 30 minutes, or a pressure between 200 and 500 psig and a temperature between 190 and 215° C. for less than 4 minutes.

A first activated cellulose stream can have any appropriate solids content. For example, a first activated cellulose stream can have a solids content of between about 30% and 50% solids by weight. In some cases, the solids can be mainly cellulose. In some cases, the solids can include lignin, hemicellulose and/or minor components such as ash, protein, or extractives.

A first activated cellulose stream can be washed to form a first washed activated cellulose stream and a first soluble extract. A first activated cellulose stream can be washed with water. The water can include any appropriate solutes. In some embodiments, the wash water can have a temperature of about 40° C. to about 100° C. (e.g., about 40° C. to about 95° C., about 40° C. to about 90° C., about 40° C. to about 80° C., about 40° C. to about 70° C., about 40° C. to about 60° C., about 40° C. to about 50° C., about 50° C. to about 100° C., about 50° C. to about 95° C., about 50° C. to about 90° C., about 50° C. to about 80° C., about 50° C. to about 70° C., about 50° C. to about 60° C., about 60° C. to about 100° C., about 60° C. to about 95° C., about 60° C. to about 90° C., about 60° C. to about 80° C., about 60° C. to about 70° C., about 70° C. to about 100° C., about 70° C. to about 95° C., about 70° C. to about 90° C., about 70° C. to about 80° C., about 80° C. to about 100° C., about 80° C. to about 95° C., about 80° C. to about 90° C., about 90° C. to about 100° C., about 90° C. to about 95° C., or about 95° C. to about 100° C.). In some embodiments, the wash water can have a temperature of about 25° C. to about 95° C. (e.g., about 25° C. to about 75° C., about 25° C. to about 50° C., about 50° C. to about 95° C., about 75° C. to about 95° C., about 25° C. to about 50° C., or about 25° C. to about 75° C.).

A first activated cellulose stream, a first washed activated cellulose stream, or a combination thereof, can undergo further processing steps in some cases. In some embodiments, a first activated cellulose stream, a first washed activated cellulose stream, or a combination thereof can undergo a second activation step to produce a second activated cellulose stream.

In some cases, a second activation step may be conducted under conditions that increase the amount of cellulose IV in the second activated cellulose stream relative to the amount of cellulose IV in a washed first activated cellulose stream.

A second activation step can be carried out at any appropriate temperature. In some embodiments, the temperature can be greater than about 60° C. (e.g., greater than about 70° C.). In some embodiments, the temperature can be less than about 180° C. (e.g., less than about 170° C., 160° C., 150° C., 140° C., 130° C., 120° C., 110° C., 100° C., 90° C., or 80° C.). In some embodiments, a second activation step can be conducted at a temperature in the range of about 60° C. to about 180° C. (e.g., about 60° C. to about 160° C., about 60° C. to about 140° C., about 60° C. to about 120° C., about 60° C. to about 100° C., about 60° C. to about 80° C., about 80° C. to about 180° C., about 80° C. to about 160° C., about 80° C. to about 140° C., about 80° C. to about 120° C., about 80° C. to about 100° C., about 100° C. to about 180° C., about 100° C. to about 160° C., about 100° C. to about 140° C., about 100° C. to about 120° C., about 120° C. to about 180° C., about 120° C. to about 160° C., about 120° C. to about 140° C., about 140° C. to about 180° C., about 140° C. to about 160° C., or about 160° C. to about 180° C.).

A second activation step can be carried out at any appropriate pressure. In some embodiments, a second activation step can be conducted at superatmospheric pressure. For example, the pressure can be about 0.1 to about 400 psig (e.g., about 0.1 to about 300 psig, about 0.1 to about 200 psig, about 0.1 to about 100 psig, about 0.1 to about 50 psig, about 0.1 to about 10 psig, about 0.1 to about 5 psig, about 0.1 to about 1 psig, about 1 to about 400 psig, about 1 to about 300 psig, about 1 to about 200 psig, about 1 to about 100 psig, about 1 to about 50 psig, about 1 to about 10 psig, about 1 to about 5 psig, about 5 to about 400 psig, about 5 to about 300 psig, about 5 to about 200 psig, about 5 to about 100 psig, about 5 to about 50 psig, about 5 to about 10 psig, about 10 to about 400 psig, about 10 to about 300 psig, about 10 to about 200 psig, about 10 to about 100 psig, about 10 to about 50 psig, about 50 to about 400 psig, about 50 to about 300 psig, about 50 to about 200 psig, about 50 to about 100 psig, about 100 to about 400 psig, about 100 to about 300 psig, about 100 to about 200 psig, about 200 to about 400 psig, about 200 to about 300 psig, or about 300 to about 400 psig).

The duration of a second activation step can be any appropriate duration. For example, the duration of a second activation step can be less than 180 minutes (e.g., less than 120 minutes, 90 minutes, or 60 minutes). In some embodiments, the duration of a second activation step can be greater than 15 minutes (e.g., greater than 30 minutes or 45 minutes). In some embodiments, a second activation step can have a duration of about 15 minutes to about 180 minutes (e.g., about 15 to about 120 minutes, about 15 to about 90 minutes, about 15 to about 60 minutes, about 15 to about 45 minutes, about 15 to about 30 minutes, about 30 to about 180 minutes, about 30 to about 120 minutes, about 30 to about 90 minutes, about 30 to about 60 minutes, about 30 to about 45 minutes, about 45 minutes to about 180 minutes, about 45 to about 120 minutes, about 45 to about 90 minutes, about 45 to about 60 minutes, about 60 to about 180 minutes, about 60 to about 120 minutes, about 60 to about 90 minutes, about 90 minutes to about 180 minutes, about 90 to about 120 minutes, or about 120 to about 180 minutes). It will be appreciated that the duration of a second activation step will vary depending upon many factors including severity of the activation step, e.g., the temperature and pressure.

It will be appreciated that the temperatures, pressures, and duration of a second activation step can be combined in any desired combination. Accordingly, for example, the second activation step may comprise subjecting the first activated cellulose stream to a temperature between 60 and 240° C. for 15 to 120 minutes at a pressure of 0 to 500 psig or a temperature between 80 and 150° C. for at least 60 minutes at a pressure of 0 to 300 psig.

A second activation step can include any appropriate conditions. In some embodiments, conditions of a second activation step can include an alkali treatment. Alkali can be provided in any appropriate form. In some embodiments, alkali can be provided in the form of one or more of sodium hydroxide, potassium hydroxide, magnesium hydroxide, and ammonia. In some embodiments, the alkali is sodium hydroxide. The alkali treatment can include any appropriate alkali loading. For example, the alkali loading can be between about 1% to about 10% (e.g., about 1% to about 9%, about 1% to about 8%, about 1% to about 7%, about 1% to about 6%, about 1% to about 5%, about 1% to about 4%, about 1% to about 3%, about 1% to about 2%, about 2% to about 10%, about 2% to about 9%, about 2% to about 8%, about 2% to about 7%, about 2% to about 6%, about 2% to about 5%, about 2% to about 4%, about 2% to about 3%, about 3% to about 10%, about 3% to about 9%, about 3% to about 8%, about 3% to about 7%, about 3% to about 6%, about 3% to about 5%, about 3% to about 4%, about 4% to about 10%, about 4% to about 9%, about 4% to about 8%, about 4% to about 7%, about 4% to about 6%, about 4% to about 5%, about 5% to about 10%, about 5% to about 9%, about 5% to about 8%, about 5% to about 7%, about 5% to about 6%, about 6% to about 10%, about 6% to about 9%, about 6% to about 8%, about 6% to about 7%, about 7% to about 10%, about 7% to about 9%, about 7% to about 8%, about 8% to about 10%, about 8% to about 9%, or about 9% to about 10%) of the dry weight of the solids in the second activation step (e.g., a first activated cellulose stream, a washed first activated cellulose stream, or a combination thereof). Without being bound by any particular theory, it is believed that alkali swells cellulose and further breaks inter and intramolecular hydrogen bonds of the cellulose, thereby further modifying crystalline structure.

In some embodiments, the second activating step can be performed in the presence of an oxidizing agent. In some embodiments, the second activating step can be performed in the presence of an enzyme such as a laccase and/or a lignin modifying enzyme.

In some embodiments, conditions of a second activation step can include an oxidizing agent. Examples of oxidizing agents suitable for use in the second activation step include, without limitation, hydrogen peroxide ($H_2O_2$). The oxidizing agent can be loaded in any appropriate loading. In some embodiments, the oxidizing agent can be loaded in an amount of about 0.0001% to about 2% (e.g., about 0.0001% to about 1%, about 0.0001% to about 0.1%, about 0.0001% to about 0.01%, about 0.0001% to about 0.001%, about 0.001% to about 2%, about 0.001% to about 1%, about 0.001% to about 0.1%, about 0.001% to about 0.01%, about 0.01% to about 2%, about 0.01% to about 1%, about 0.01% to about 0.1%, about 0.1% to about 2%, about 0.1% to about 1%, or about 1% to about 2%) of the dry weight of the solids in the second activation step (e.g., a first activated cellulose stream, a washed first activated cellulose stream, or a combination thereof).

A second activated cellulose stream can have any appropriate solids content. In some embodiments, a second activated cellulose stream can have between about 5% and 50% solids by weight, preferably between about 20% and 35% solids. In some embodiments, the solids can include mainly cellulose.

A second activated cellulose stream can be subjected to one or more washing steps after activation, e.g., remove alkali and solubilized lignin. A second activated cellulose stream can be washed to form a second washed activated cellulose stream. A second activated cellulose stream can be washed with water. The water can include any appropriate solutes. In some embodiments, the wash water can have a temperature of about 40° C. to about 100° C. (e.g., about 40° C. to about 95° C., about 40° C. to about 90° C., about 40° C. to about 80° C., about 40° C. to about 70° C., about 40° C. to about 60° C., about 40° C. to about 50° C., about 50° C. to about 100° C., about 50° C. to about 95° C., about 50° C. to about 90° C., about 50° C. to about 80° C., about 50° C. to about 70° C., about 50° C. to about 60° C., about 60° C. to about 100° C., about 60° C. to about 95° C., about 60° C. to about 90° C., about 60° C. to about 80° C., about 60° C. to about 70° C., about 70° C. to about 100° C., about 70° C. to about 95° C., about 70° C. to about 90° C., about 70° C. to about 80° C., about 80° C. to about 100° C., about 80° C. to about 95° C., about 80° C. to about 90° C., about 90° C. to about 100° C., about 90° C. to about 95° C., or about 95° C. to about 100° C.).

A second activated cellulose stream, a second washed activated cellulose stream, a first activated cellulose stream, a first washed activated cellulose stream, or a combination thereof, can undergo further processing steps in some cases. In some embodiments, a first activated cellulose stream, a first washed activated cellulose stream, or a combination thereof can undergo treatment with one or more enzymes to produce a glucose-rich sugar stream.

An enzyme can be any appropriate enzyme. In some embodiments, an enzyme can be a cellulose enzyme. Treatment with an enzyme can occur at any appropriate temperature. In some embodiments, treatment with an enzyme can occur at temperature of about 40° C. to 55° C.

In general, cellulase enzymes may be selected to break cellulose down into monomeric sugars. For example, cellulase enzymes may be selected to hydrolyze 1,4-beta-D-glycosidic linkages into monosaccharides. Cellulase enzymes can comprise an enzyme with at least one of cellobiohydrolase, endoglucanase, and beta-glucosidase activity. While cellulase enzyme preparations may be isolated from a number of sources such as natural cultures of bacteria, yeast, or fungi, a person skilled in the art will appreciate that enzymes produced using recombinant techniques can be used as described herein. Examples of commercially available enzymes suitable for use with the methods described herein include, without limitation, Novozymes Ctec 2 or 3, AB Enzymes Rohament.

An enzyme can be added in any appropriate loading. Enzymes may be added at a loading of 0.1 to 120 mg, 0.2 to 60 mg or 1 to 30 mg of enzyme protein per gram of glucan. In one embodiment, the enzymes are added at a loading of 0.1 to 5 mg of enzyme protein per gram of glucan in the activated cellulose. In one embodiment, the enzymes are added to the activated cellulose at a loading of about 2 to about 60 Filter Paper Units (FPU)/g of glucan, or optionally at a loading of about 2 to 30 or 1 to 15 FPU/g of glucan. The enzymes may be added separately to the activated cellulose directly or first combined with a surfactant and/or dispersant as described subsequently.

The enzymes may be contacted with the activated cellulose for a suitable length of time (e.g., for between 24-144 hours, between 48-144 hours, between 48-60 hours or between 24 and 72 hours) to in order to convert the cellulose into monomeric sugars through enzymatic hydrolysis.

In some embodiments, at least about 70%, 75%, 80%, 85%, 90%, or 95% of the theoretical yield of glucose based on the glycan content of the activated cellulose is converted to glucose during enzymatic hydrolysis to produce a glucose-rich sugar stream. In some embodiments, enzymatic hydrolysis is conducted for a predetermined length of time or until a predetermined yield of glucose is obtained. After a certain amount of time, the rate of glucose production from the enzymatic hydrolysis of cellulose may decrease as the cellulose substrate is depleted or the presence of glucose inhibits the activity of the cellulase enzymes.

Optionally, an activated cellulose may be contacted with enzymes in the presence of a surfactant and/or a dispersant. In some embodiments, the dispersant is polyaspartic acid.

A surfactant can be any appropriate surfactant. A surfactant can be a non-ionic surfactant, optionally a polysorbate surfactant such as Tween. The surfactant can also be a blend of surfactants. In some embodiments, the surfactant can be a blend of Tween 80, an alkoxylated glyceride, and nonyl phenol. In some embodiments, the surfactant is present at a loading of less than about 2% and/or greater than about 0.01%. In some embodiments, the surfactant can be present at a loading between 1% and 0.01%, between 0.5% and 0.05% or between about 0.1% and 0.2% of the weight of the cellulose content in the activated cellulose.

The dispersant can be any appropriate dispersant. In some embodiments, the dispersant may be an oligopeptide, optionally a non-enzymatic polypeptide with molecular weight between 500 and 10,000 or between 1000 and 5000. The oligopeptide can be polyaspartic acid. The polyaspartic acid can have a molecular weight between 500 and 10,000, between 1000 and 5000, or between 3500 and 4500. The polyaspartic acid can be present at a loading of less than about 2% and/or greater than about 0.001% of the weight of the cellulose content in the activated cellulose. In some embodiments, the polyaspartic acid can be present at a loading between 1% and 0.001%, between 0.25% and 0.025%, or about 0.1% of the weight of the cellulose content in the activated cellulose.

Optionally, the ratio of surfactant to dispersant (e.g., polyaspartic acid) in the enzymatic hydrolysis mix is from 0.1:1 to 10:1, optionally from 0.5:1 to 2:1.

Optionally, the molar ratio of dispersant (e.g., polyaspartic acid) to the one or more cellulase enzymes is from 0.01 to 10:1.

Accordingly, an enzymatic hydrolysis mix comprising one or more cellulase enzymes, one or more surfactants, and one or more dispersants may be used in any enzymatic hydrolysis process or may be used in association with any of the activation and enzymatic hydrolysis processes described herein. The enzymatic hydrolysis mix is particularly suitable for the enzymatic hydrolysis of activated cellulose comprising cellulose II and cellulose IV described herein.

A first soluble extract (e.g., including hemicellulose) can undergo further processing steps in some cases. In some embodiments, first soluble extract can undergo one or more purification steps to form a purified hemicellulose composition.

Purification can include any appropriate purifying steps. In some embodiments, purifying steps can include one or more of: decolorizing, treating with carbon (e.g., activated carbon), performing ion exchange (IX), performing reverse osmosis, and nanofiltering, in any appropriate order. In some embodiments, a first soluble extract is decolorized prior to any other purification steps.

Decolorizing can include any appropriate conditions. In some embodiments, decolorizing can include alkaline peroxide conditions. Without being bound by any particular theory, it is believed that alkaline peroxide conditions work to reduce the molecular weight of the hemicellulose in the first soluble extract and/or work to release polyphenols and/or other color compounds from the hemicellulose. It is noted that decolorization does not necessarily mean that the hemicellulose is completely decolored, instead, it means that the color of the hemicellulose is typically lessened (e.g., the hemicellulose typically becomes whiter).

Decolorizing can be carried out at any appropriate temperature. In some embodiments, the temperature can be greater than about 50° C. (e.g., greater than about 60° C. or 70° C.). In some embodiments, the temperature can be less than about and may be less than about 100° C. (e.g., less than about 90° C. or 80° C.). In some embodiments, decolorizing can be conducted at a temperature in the range of about 50° C. to about 250° C. (e.g., about 50° C. to about 225° C., about 50° C. to about 200° C., about 50° C. to about 175° C., about 50° C. to about 150° C., about 50° C. to about 125° C., about 50° C. to about 100° C., about 50° C. to about 75° C., about 75° C. to about 250° C., about 100° C. to about 250° C., about 125° C. to about 250° C., about 150° C. to about 250° C., about 175° C. to about 250° C., about 200° C. to about 250° C., about 225° C. to about 250° C., about 100° C. to about 200° C., about 50° C. to about 90° C., about 60° C. to about 80° C., about 55° C. to about 85° C., about 55° C. to about 75° C., about 55° C. to about 65° C.).

Decolorizing can be carried out at any appropriate pressure. In some embodiments, decolorizing can be conducted at superatmospheric pressure. For example, the pressure can be about 0.1 to about 400 psig (e.g., about 0.1 to about 300 psig, about 0.1 to about 200 psig, about 0.1 to about 100 psig, about 0.1 to about 50 psig, about 0.1 to about 10 psig, about 0.1 to about 5 psig, about 0.1 to about 1 psig, about 1 to about 400 psig, about 1 to about 300 psig, about 1 to about 200 psig, about 1 to about 100 psig, about 1 to about 50 psig, about 1 to about 10 psig, about 1 to about 5 psig, about 5 to about 400 psig, about 5 to about 300 psig, about 5 to about 200 psig, about 5 to about 100 psig, about 5 to about 50 psig, about 5 to about 10 psig, about 10 to about 400 psig, about 10 to about 300 psig, about 10 to about 200 psig, about 10 to about 100 psig, about 10 to about 50 psig, about 50 to about 400 psig, about 50 to about 300 psig, about 50 to about 200 psig, about 50 to about 100 psig, about 100 to about 400 psig, about 100 to about 300 psig, about 100 to about 200 psig, about 200 to about 400 psig, about 200 to about 300 psig, or about 300 to about 400 psig).

The duration of decolorizing can be any appropriate duration. For example, the duration of decolorizing can be less than about 5 hours (e.g., less than about 4 hours or less than about 3 hours). In some embodiments, the duration of decolorizing can be greater than 1 hour (e.g., greater than 2 hours). In some embodiments, a decolorizing can have a duration of about 1 hour to about 5 hours (e.g., about 1 hour to about 4 hours, about 1 hour to about 3 hours, about 1 hour to about 2 hours, about 2 hours to about 5 hours, about 2 hours to about 4 hours, about 2 hours to about 3 hours, about 3 hours to about 5 hours, about 3 hours to about 4 hours, about 4 hours to about 5 hours, about 2 hours to about 3 hours, about 4 hours, or about 5 hours). It will be appreciated that the duration of decolorizing will vary depending upon many factors including severity of the decolorizing step, e.g., the temperature and pressure.

It will be appreciated that the temperatures, pressures, and duration of decolorizing can be combined in any desired combination. Accordingly, for example, decolorizing may comprise subjecting the first soluble extract to a temperature between 60 and 80° C. for 2 to 4 hours at a pressure of 0 to 500 psig or a temperature between 70 and 90° C. for at least 1 hour at a pressure of 0 to 300 psig.

In some embodiments, decolorizing can include alkaline treatment. Alkali can be provided in any appropriate form. In some embodiments, alkali can be provided in the form of one or more of sodium hydroxide, potassium hydroxide, magnesium hydroxide, and ammonia. In some embodiments, the alkali is sodium hydroxide. The alkaline treatment can be at any appropriate pH. In some embodiments, the alkaline treatment can be carried out a pH of about 9.5 to about 11.5 (e.g., about 9.5 to about 11.0, about 9.5 to about 10.5, about 9.5 to about 10.0, about 10.0 to about 11.5, about 10.0 to about 11.0, about 10.0 to about 10.5, about 10.5 to about 11.5, about 10.5 to about 11.0, about 11.0 to about 11.5, about 9.5, about 10.0, about 10.5, about 11.0, or about 11.5).

In some embodiments, decolorizing can include treating with an oxidizing agent. In some embodiments, decolorizing can include or an enzyme such as a laccase and/or a lignin modifying enzyme.

In some embodiments, decolorizing can include treating with an oxidizing agent. Examples of oxidizing agents suitable for use in decolorizing step include, without limitation, hydrogen peroxide ($H_2O_2$). The oxidizing agent can be loaded in any appropriate loading. In some embodiments, the oxidizing agent can be loaded in an amount of about 5 to about 40% (e.g., about 5% to about 30%, about 5% to about 20%, about 5% to about 10%, about 10% to about 40%, about 10% to about 30%, about 10% to about 20%, about 20% to about 40%, about 20% to about 30%, or about 30% to about 40%) of the dry weight of one or more components in the hemicellulose (e.g., xylan (e.g., arabinoxylan)).

Carbon treatment can include treating a first soluble extract (or a first soluble extract that has undergone one or more purifying steps) with carbon (e.g., activated carbon). The loading of carbon can be any appropriate loading. For example, the carbon (e.g., activated carbon) can be used in a loading of about 0.05% to about 0.5% (e.g., 0.05% to about 0.4%, about 0.05% to about 0.3%, about 0.05% to about 0.2%, about 0.05% to about 0.1%, about 0.1% to about 0.5%, about 0.1% to about 0.4%, about 0.1% to about 0.3%, about 0.1% to about 0.2%, about 0.2% to about 0.5%, about 0.2% to about 0.4%, about 0.2% to about 0.3%, about 0.3% to about 0.5%, about 0.3% to about 0.4%, about 0.4% to about 0.5%, about 0.05%, about 0.1%, about 0.2%, about 0.3%, about 0.4%, about 0.5%) by dry weight of one or more components in the hemicellulose (e.g., xylan (e.g., arabinoxylan)).

Ion exchange (e.g., of a first soluble extract or a first soluble extract that has undergone one or more purifying steps) can include passing a first soluble extract (or a first soluble extract that has undergone one or more purifying steps) over an ion exchange resin. An ion exchange resin can be any appropriate ion exchange resin, for example, a cation exchange resin or an anion exchange resin. In some embodiments, both a cation exchange resin and an anion exchange resin are used during purification of a first soluble extract (or a first soluble extract that has undergone one or more purifying steps) (this can be called two-stage ion exchange).

Reverse osmosis (e.g., of a first soluble extract or a first soluble extract that has undergone one or more purifying steps) can include any appropriate conditions. In some embodiments, a nanofiltration membrane (e.g., a filter with a pore size of about 1 to about 10 nm) can be used in reverse osmosis. In some embodiments, an ultrafiltration membrane (e.g., a filter with a pore size of about 0.01 μm to about 0.1 μm) can be used in reverse osmosis. Without being bound by any particular theory, it is believed that reverse osmosis with a nanofilter can remove low molecular weight impurities, ions, and/or water can concentrate the hemicellulose.

Nanofiltering (e.g., of a first soluble extract or a first soluble extract that has undergone one or more purifying steps) can include any appropriate conditions. Without being bound by any particular theory, it is believed that nanofiltration can remove low molecular weight impurities, ions, and/or water and concentrate the hemicellulose.

In some embodiments, a first soluble extract can be purified by, sequentially, decolorization, carbon treatment, ion exchange, and reverse osmosis with a nanofilter to form a purified hemicellulose composition.

In some cases, a lignocellulosic biomass used to produce glucose (e.g., dextrose) described herein can be the same type of lignocellulosic biomass as the lignocellulosic biomass used to produce a purified hemicellulose composition described herein (e.g., both are corn stover or both are wheat straw). In some cases, a lignocellulosic biomass used to produce glucose (e.g., dextrose) described herein can be the same lignocellulosic biomass as the lignocellulosic biomass used to produce a purified hemicellulose composition described herein (e.g., the same lot of corn stover or the same lot of wheat straw).

Hemicellulose (e.g., crude hemicellulose) can be prepared by methods other than those specifically disclosed herein (e.g., from a lignocellulosic biomass using a first activation step as disclosed herein and washing a first activated cellulose stream to form a first soluble extract described herein). For example, a crude hemicellulose can be obtained from a commercial supplier. A crude hemicellulose can, in some cases, have an alkaline pH. In some embodiments, crude hemicellulose can have a hemicellulose portion with a molecular weight ($M_w$) of at least about 20 kDa (e.g., at least about 30, 50, 75, or 100 kDa). In some embodiments, hemicellulose can have a molecular weight of about 20 kDa to about 300 kDa (e.g., about 20 to about 250 kDa, about 20 to about 200 kDa, about 20 to about 150 kDa, about 20 to about 100 kDa, about 20 to about 50 kDa, about 50 to about 300 kDa, about 100 to about 300 kDa, about 150 to about 300 kDa, about 200 to about 200 kDa, about 250 to about 300 kDa, or about 100 to about 200 kDa)

A crude hemicellulose can be treated to reduce the molecular weight ($M_w$) to form a reduced-mass hemicellulose. In some embodiments, alkaline conditions can be used to reduce the molecular weight of a crude hemicellulose. In some embodiments, alkaline conditions can include a pH of 9.5 to about 11.5 (e.g., about 9.5 to about 11.0, about 9.5 to about 10.5, about 9.5 to about 10.0, about 10.0 to about 11.5, about 10.0 to about 11.0, about 10.0 to about 10.5, about 10.5 to about 11.5, about 10.5 to about 11.0, about 11.0 to about 11.5, about 9.5, about 10.0, about 10.5, about 11.0, or about 11.5). Without being bound by any particular theory, it is believed that a reduction in molecular weight is related to the pH, duration, temperature, and pressure of treatment. In some embodiments, the pressure can be atmospheric pressure. In some embodiments, the duration of alkaline treatment can be about 30 minutes to about 8 hours (e.g., about 30 minutes to about 6 hours, about 30 minutes to about 4 hours, about 30 minutes to about 2 hours, about 30 minutes to about 1 hour, about 1 hour to about 8 hours, about 1 hour to about 6 hours, about 1 hour to about 4 hours, about 1 hour to about 2 hours, about 2 hours to about 8 hours, about 2 hours to about 6 hours, about 2 hours to about 4 hours, about 4 hours to about 8 hours, about 4 hours to about 6 hours, or about 6 hours to about 8 hours). In some embodiments, the temperature can be about 60° C. to about 150° C. (e.g., about 60° C. to about 140° C., about 60° C. to about 120° C., about 60° C. to about 100° C., about 60° C. to about 80° C., about 60° C. to about 100° C., about 80° C. to about 150° C., about 80° C. to about 140° C., about 80° C. to about 120° C., about 80° C. to about 100° C., about 100° C. to about 150° C., about 100° C. to about 140° C., about 100° C. to about 120° C., about 100° C. to about 150° C., about 100° C. to about 140° C., about 100° C. to about 120° C., about 120° C. to about 150° C., about 120° C. to about 140° C., about 140° C. to about 150° C., about 60° C., about 70° C., about 80° C., about 90° C., about 100° C., about 110° C., about 120° C., about 130° C., about 140° C., or about 150° C.). The alkaline treatment can reduce the molecular weight to a desired molecular weight, depending on the conditions. In some embodiments, the molecular weight of the alkaline-treated hemicellulose can be about 4500 to about 6500 Da (e.g., about 4500 to about 6000 Da, about 4500 to about 5500 Da, about 4500 to about 5000 Da, about 5000 to about 6500 Da, about 5000 to about 6000 Da, about 5000 to about 5500 Da, about 5500 to about 6500, about 5500 to about 6000 Da, or about 6000 to about 6500 Da).

A reduced-mass hemicellulose can be purified using any appropriate purifying steps to form a purified hemicellulose composition described herein. In some embodiments, a reduced-mass hemicellulose can be purified using any of the purifying steps as described herein to from a purified hemicellulose composition. In some embodiments, a reduced-mass hemicellulose can undergo treating with carbon (e.g., activated carbon), performing ion exchange (IX), performing reverse osmosis, or nanofiltering, in any appropriate order, to form a purified hemicellulose composition. In some embodiments, a purified hemicellulose composition made from a reduced-mass hemicellulose can be used in a sweetener composition, such as any of the sweetener compositions described herein.

In some embodiments, a reduced-mass hemicellulose can be combined with a decolorized hemicellulose, in any appropriate ratio. For example, about 25% to about 75% (e.g., about 25% to about 50%, about 50% to about 75%, about 25%, about 50%, or about 75%) by dry weight of reduced-mass hemicellulose can be combined with about 25% to about 75% (e.g., about 25% to about 50%, about 50% to about 75%, about 25%, about 50%, or about 75%) by dry weight of decolorized hemicellulose. Such a combination, in some embodiments, can undergo treating with carbon (e.g., activated carbon), performing ion exchange (IX), performing reverse osmosis, or nanofiltering, in any appropriate order, to form a purified hemicellulose composition. In some embodiments, a purified hemicellulose composition made from a combination of a reduced-mass hemicellulose and a decolorized hemicellulose can be used in a sweetener composition, such as any of the sweetener compositions described herein.

A purified hemicellulose composition can be dried (e.g., partially or fully dried). A purified hemicellulose composition can be dried using any appropriate method. For example, in some embodiments, a purified hemicellulose composition can be dried using spray drying, mat drying, or freeze drying.

This document also provides methods of preparing a sweetener composition. Any of the sweetener compositions described herein can be prepared by the methods described herein. Methods of preparing a sweetener composition can include combining glucose (e.g., as dextrose, or a combination of glucose and dextrose) and a purified hemicellulose composition. Combining can include any appropriate steps. In some embodiments, combining can include mixing, blending, agitating, dissolving, emulsifying, or a combination thereof. For example, in some embodiments, dry glucose and a dry purified hemicellulose composition can be mixed together, and, optionally, water can be added to form a syrup (e.g., at about 70% to about 80% dry matter). In some embodiments, a dry purified hemicellulose composition can be added to a glucose syrup (e.g., by mixing, blending, dissolving, or a combination thereof). In some embodiments, dry glucose can be added to a purified hemicellulose composition in the form of a syrup (e.g., by mixing, blending, dissolving, or a combination thereof). In some embodiments, a glucose syrup can be combined (e.g., by mixing or blending) with a purified hemicellulose composition in the form of a syrup. The purified hemicellulose composition can be any of the purified hemicellulose compositions described herein. The glucose and the purified hemicellulose composition can be combined in any appropriate ratio, for example, to yield any of the sweetener compositions described herein. For example, in some embodiments, about 1 to about 20 (e.g., about 1 to about 15, about 1 to about 10, about 1 to about 5, about 5 to about 20, about 5 to about 15, about 5 to about 10, about 10 to about 20, about 10 to about 15, about 15 to about 20, about 1, about 2, about 5, about 10, about 15, or about 20) parts by dry weight of glucose can be combined with about 1 part by dry weight of purified hemicellulose. For example, in some embodiments, about 1 to about 20 (e.g., about 1 to about 15, about 1 to about 10, about 1 to about 5, about 5 to about 20, about 5 to about 15, about 5 to about 10, about 10 to about 20, about 10 to about 15, about 15 to about 20, about 1, about 2, about 5, about 10, about 15, or about 20) parts by dry weight of purified hemicellulose can be combined with about 1 part by dry weight of glucose.

In one embodiment, the composition comprising glucose and purified hemicellulose is prepared by the following method:

lignocellulosic biomass is treated with steam to extract, hydrolyze and separate the hemicellulose from the lignocellulosic biomass matrix. (See, e.g., U.S. Patent Application Publication No. US20180119188(A1) or PCT Publication No. WO2016161515(A1) for exemplary treatment, both of which are incorporated herein by reference in their entirety.)

hemicellulose is recovered by washing with water, (See, e.g., U.S. Patent Application Publication No. US20180119188(A1) or PCT Publication No. WO2016161515(A1) for exemplary washing details.)

hemicellulose is purified by sequential treatment with activated carbon (to remove organic impurities) and then a two stage ion exchange (cationic/anionic) to remove inorganic impurities.

hemicellulose is optionally concentrated and or dried.

Although in the forgoing example hemicellulose is purified by sequential treatment with activated carbon and then two stage ion exchange, it will be understood by a person of skill in the art that there are alternative methods known in the art for purifying hemicellulose, which may achieve a similarly purified product.

Concentration of the hemicellulose can be carried out, for example, by evaporation or reverse osmosis. Reverse osmosis may also be used to pre-concentrate the hemicellulose followed by evaporation. Various drying methods are known in the art and can be used alone or in combination with various concentration methods. A preferred evaporation method to preserve taste and/or color, is falling film evaporation under vacuum. Preferred drying methods to preserve taste and/or color are freeze drying or spray drying.

The sweetener compositions comprising dextrose and hemicellulose described herein can be used in the production of foods and beverages. They can also be used as additives in pharmaceutical composition or supplements, particularly those that are administered orally. Supplements may include but are not limited to natural health products, fiber supplements, vitamin or mineral supplements, protein or amino acid supplements and the like. A sweetener composition described herein can also be sold for use as a sugar substitute for home use such as in cooking or baking or as a condiment.

A sweetener composition comprising dextrose and purified hemicellulose described herein may be used as a food ingredient that provides properties other than sweetness to a food product. For example, the ratio of dextrose and purified hemicellulose may be selected to provide increased viscosity or moisture retention properties and may impart very little or no sweet flavor. In a further aspect, the purified hemicellulose can be used alone as a food additive as a source of soluble fiber and or prebiotics. In some embodiments, the purified hemicellulose will be hydrolyzed or partially hydrolyzed. The purified hemicellulose may include xylose and xylo-oligosaccharide and xylan. The purified hemicellulose may further include other sugar polymers. The other sugar polymers may also be hydrolyzed or partially hydrolyzed to their component sugars or oligosaccharides of those sugars. In one embodiment, the purified hemicellulose can include up to 10% of other sugar polymers. In some embodiments of the purified, hydrolyzed hemicellulose, the amount of xylan can range from 20-95%, the amount of xylo-oligosaccharide can range from 5-60%, and the xylose can range from 1-40%. In some embodiments, the amount of xylan can range from 50-95%, the amount of xylo-oligosaccharide can range from 5-30%, and the xylose can range from 1-25%. In some embodiments, the purified hydrolyzed hemicellulose comprises about 87% xylan, about 9% xylo-oligosaccharide, and about 4% xylose.

In another aspect, there is provided a composition comprising partially hydrolyzed cellulose and partially or fully hydrolyzed hemicellulose. The composition may be used as a sweetener or food additive and may be used to impart sweetness or viscosity or a combination thereof. In some embodiments, the composition comprises dextrose, oligosaccharides of dextrose, and purified hemicellulose. In some embodiments, the purified hemicellulose comprises xylose, xylo-oligosaccharides, and xylan. In still a further aspect, the composition of the purified hemicellulose may further include other sugar polymers. The other sugar polymers may also be hydrolyzed or partially hydrolyzed to their component sugars or oligosaccharides of those sugars. In some embodiments, the purified hemicellulose can include up to 10% of other sugar polymers. In some embodiments of the purified, hydrolyzed hemicellulose, the amount of xylan can range from 20-95%, the amount of xylo-oligosaccharide can range from 5-60%, and the xylose can range from 1-40%. In some embodiments, the amount of xylan can range from 50-95%, the amount of xylo-oligosaccharide can range from 5-30%, and the xylose can range from 1-25%. In some embodiments, the purified hydrolyzed hemicellulose comprises about 87% xylan, about 9% xylo-oligosaccharide, and about 4% xylose.

In a further aspect, the compositions as described herein can be used as taste modulators. The composition can be used to modulate the taste of other sweeteners including high potency sweeteners and bulk sweeteners, such as erythritol.

EXEMPLARY EMBODIMENTS

Embodiment 1 is a sweetener composition comprising: about 5% to about 95% by dry weight of glucose; and about 5% to about 95% by dry weight of a purified hemicellulose.

Embodiment 2 is the sweetener composition of embodiment 1, wherein the purified hemicellulose comprises xylose, xylo-oligosaccharide, and xylan.

Embodiment 3 is the sweetener composition of embodiment 1 or embodiment 2, wherein the purified hemicellulose comprises hydrolysis products of xylose, hydrolysis products of xylo-oligosaccharide, or hydrolysis products of xylan.

Embodiment 4 is the sweetener composition of any one of embodiments 1-3, wherein the sweetener composition comprises about 30% to about 75% by dry weight of glucose.

Embodiment 5 is the sweetener composition of any one of embodiments 1-3, wherein the sweetener composition comprises about 40% to about 60% by dry weight of glucose.

Embodiment 6 is the sweetener composition of any one of embodiments 1-3, wherein the sweetener composition comprises about 45% to about 55% by dry weight of glucose.

Embodiment 7 is the sweetener composition of any one of embodiments 1-6, wherein the sweetener composition comprises about 30% to about 75% by dry weight of purified hemicellulose.

Embodiment 8 is the sweetener composition of any one of embodiments 1-6, wherein the sweetener composition comprises about 40% to about 60% by dry weight of purified hemicellulose.

Embodiment 9 is the sweetener composition of any one of embodiments 1-8, wherein the sweetener composition comprises about 45% to about 55% by dry weight of purified hemicellulose.

Embodiment 10 is the sweetener composition of any one of embodiments 1-8, wherein the purified hemicellulose comprises about 20% to about 95% by dry weight of xylan.

Embodiment 11 is the sweetener composition of any one of embodiments 1-8, wherein the purified hemicellulose comprises about 30% to about 95% by dry weight of xylan.

Embodiment 12 is the sweetener composition of any one of embodiments 1-8, wherein the purified hemicellulose comprises about 50% to about 95% by dry weight of xylan.

Embodiment 13 is the sweetener composition of any one of embodiments 1-8, wherein the purified hemicellulose comprises about 80% to about 95% by dry weight of xylan.

Embodiment 14 is the sweetener composition of any one of embodiments 1-13, wherein the purified hemicellulose comprises about 87% by dry weight of xylan.

Embodiment 15 is the sweetener composition of any one of embodiments 2-14, wherein the xylan comprises about 70% to about 99% by dry weight of arabinoxylan.

Embodiment 16 is the sweetener composition of any one of embodiments 2-14, wherein the xylan comprises about 80% to about 99% by dry weight of arabinoxylan.

Embodiment 17 is the sweetener composition of any one of embodiments 2-14, wherein the xylan comprises about 90% to about 99% by dry weight of arabinoxylan.

Embodiment 18 is the sweetener composition of any one of embodiments 2-14, wherein the xylan comprises about 95% to about 99% by dry weight of arabinoxylan.

Embodiment 19 is the sweetener composition of any one of embodiments 1-18, wherein the purified hemicellulose comprises about 5% to about 60% by dry weight of xylo-oligosaccharide.

Embodiment 20 is the sweetener composition of any one of embodiments 1-18, wherein the purified hemicellulose comprises about 5% to about 30% by dry weight of xylo-oligosaccharide.

Embodiment 21 is the sweetener composition of any one of embodiments 1-18, wherein the purified hemicellulose comprises about 5% to about 15% by dry weight of xylo-oligosaccharide.

Embodiment 22 is the sweetener composition of any one of embodiments 1-18, wherein the purified hemicellulose comprises about 9% by dry weight of xylo-oligosaccharide.

Embodiment 23 is the sweetener composition of any one of embodiments 1-22, wherein the purified hemicellulose comprises about 0.1% to about 25% by dry weight of xylose.

Embodiment 24 is the sweetener composition of any one of embodiments 1-22, wherein the purified hemicellulose comprises about 0.1% to about 40% by dry weight of xylose.

Embodiment 25 is the sweetener composition of any one of embodiments 1-22, wherein the purified hemicellulose comprises about 0.1% to about 10% by dry weight of xylose.

Embodiment 26 is the sweetener composition of any one of embodiments 1-22, wherein the purified hemicellulose comprises about 4% by dry weight of xylose.

Embodiment 27 is the sweetener composition of any one of embodiments 1-26, wherein the purified hemicellulose comprises glucomannan, maltose, or a combination thereof.

Embodiment 28 is the sweetener composition of any one of embodiments 1-26, wherein the purified hemicellulose comprises less than 10% by dry weight of glucomannan, maltose, or a combination thereof.

Embodiment 29 is the sweetener composition of any one of embodiments 1-26, wherein the purified hemicellulose comprises less than 5% by dry weight of glucomannan, maltose, or a combination thereof.

Embodiment 30 is the sweetener composition of any one of embodiments 1-26, wherein the purified hemicellulose comprises less than 1% by dry weight of glucomannan, maltose, or a combination thereof.

Embodiment 31 is the sweetener composition of any one of embodiments 1-30, wherein the sweetener composition comprises less than 10% by dry weight of glucomannan, maltose, or a combination thereof.

Embodiment 32 is the sweetener composition of any one of embodiments 1-30, wherein the sweetener composition comprises less than 5% by dry weight of glucomannan, maltose, or a combination thereof.

Embodiment 33 is the sweetener composition of any one of embodiments 1-30, wherein the sweetener composition comprises less than 1% by dry weight of glucomannan, maltose, or a combination thereof.

Embodiment 34 is the sweetener composition of any one of embodiments 1-33, wherein the purified hemicellulose comprises less than 10% by dry weight of a sugar or a sugar polymer that is not xylose, xylo-oligosaccharide, xylan, or a hydrolysis product thereof.

Embodiment 35 is the sweetener composition of any one of embodiments 1-33, wherein the purified hemicellulose comprises less than 5% by dry weight of a sugar or a sugar polymer that is not xylose, xylo-oligosaccharide, xylan, or a hydrolysis product thereof.

Embodiment 36 is the sweetener composition of any one of embodiments 1-33, wherein the purified hemicellulose comprises less than 1% by dry weight of a sugar or a sugar polymer that is not xylose, xylo-oligosaccharide, xylan, or a hydrolysis product thereof.

Embodiment 37 is the sweetener composition of any one of embodiments 1-36, wherein the sweetener composition comprises less than 10% by dry weight of a sugar or a sugar polymer that is not dextrose, xylose, xylo-oligosaccharide, xylan, or a hydrolysis product thereof.

Embodiment 38 is the sweetener composition of any one of embodiments 1-36, wherein the sweetener composition comprises less than 5% by dry weight of a sugar or a sugar polymer that is not dextrose, xylose, xylo-oligosaccharide, xylan, or a hydrolysis product thereof.

Embodiment 39 is the sweetener composition of any one of embodiments 1-36, wherein the sweetener composition comprises less than 1% by dry weight of a sugar or a sugar polymer that is not dextrose, xylose, xylo-oligosaccharide, xylan, or a hydrolysis product thereof.

Embodiment 40 is the sweetener composition of any one of embodiments 1-39, wherein the sweetener composition has a DE of about 35 to about 75.

Embodiment 41 is the sweetener composition of any one of embodiments 1-39, wherein the sweetener composition has a DE of about 40 to about 65.

Embodiment 42 is the sweetener composition of any one of embodiments 1-39, wherein the sweetener composition has a DE of 42, 53, or 63.

Embodiment 43 is the sweetener composition of any one of embodiments 1-39, wherein the sweetener composition has a DE of 42.

Embodiment 44 is the sweetener composition of any one of embodiments 1-39, wherein the sweetener composition has a DE of 53.

Embodiment 45 is the sweetener composition of any one of embodiments 1-39, wherein the sweetener composition has a DE of 63.

Embodiment 46 is the sweetener composition of any one of embodiments 1-45, wherein the sweetener composition has a glycemic index of about 35 to about 50.

Embodiment 47 is the sweetener composition of any one of embodiments 1-45, wherein the sweetener composition has a glycemic index of about 40 to about 45.

Embodiment 48 is the sweetener composition of any one of embodiments 1-45, wherein the sweetener composition has a glycemic index of about 42.

Embodiment 49 is the sweetener composition of any one of embodiments 1-48, wherein the sweetener composition provides about 175 to about 225 calories per 100 g of the sweetener composition.

Embodiment 50 is the sweetener composition of any one of embodiments 1-48, wherein the sweetener composition provides about 180 to about 200 calories per 100 g of the sweetener composition.

Embodiment 51 is the sweetener composition of any one of embodiments 1-48, wherein the sweetener composition provides about 190 calories per 100 g of the sweetener composition.

Embodiment 52 is the sweetener composition of any one of embodiments 1-51, wherein the sweetener composition comprises soluble fiber.

Embodiment 53 is the sweetener composition of any one of embodiments 1-52, wherein the sweetener composition comprises about 20 g to about 60 g of soluble fiber per 100 g of the sweetener composition.

Embodiment 54 is the sweetener composition of any one of embodiments 1-52, wherein the sweetener composition comprises about 35 g to about 45 g of soluble fiber per 100 g of the sweetener composition.

Embodiment 55 is the sweetener composition of any one of embodiments 1-52, wherein the sweetener composition comprises about 41 g of soluble fiber per 100 g of the sweetener composition.

Embodiment 56 is the sweetener composition of any one of embodiments 1-55, wherein the sweetener composition comprises prebiotics.

Embodiment 57 is the sweetener composition of any one of embodiments 1-55, wherein the sweetener composition comprises about 2 g to about 6 g of prebiotics per 100 g of the sweetener composition.

Embodiment 58 is the sweetener composition of any one of embodiments 1-55, wherein the sweetener composition comprises about 3 g to about 5 g of prebiotics per 100 g of the sweetener composition.

Embodiment 59 is the sweetener composition of any one of embodiments 1-55, wherein the sweetener composition comprises about 4 g of prebiotics per 100 g of the sweetener composition.

Embodiment 60 is the sweetener composition of any one of embodiments 1-59, wherein the sweetener composition does not comprise insoluble fiber.

Embodiment 61 is the sweetener composition of any one of embodiments 1-60, wherein the glucose is provided, at least in part, in the form of dextrose.

Embodiment 62 is the sweetener composition of any one of embodiments 1-61, wherein the sweetener composition is a solid.

Embodiment 63 is the sweetener composition of any one of embodiments 1-61, wherein the sweetener composition is a syrup.

Embodiment 64 is the sweetener composition of embodiment 63, wherein the sweetener composition has a viscosity of about 2500 to about 3000 cP at a temperature of 120° C.

Embodiment 65 is the sweetener composition of embodiment 63, wherein the sweetener composition has a viscosity of about 2700 to about 2900 cP at a temperature of 120° C.

Embodiment 66 is the sweetener composition of embodiment 63, wherein the sweetener composition has a viscosity of about 2800 cP at a temperature of 120° C.

Embodiment 67 is a sweetener composition comprising:
about 48% to about 53% by dry weight of dextrose;
about 41% to about 45% by dry weight of xylan;
about 4% to about 5% by dry weight of xylo-oligosaccharides; and
about 2% to about 2.5% by dry weight of xylose.

Embodiment 68 is a sweetener composition comprising:
about 50% by dry weight of dextrose;
about 43% by dry weight of xylan;
about 4% by dry weight of xylo-oligosaccharides; and
about 2% by dry weight of xylose.

Embodiment 69 is a food product comprising the sweetener composition of any one of embodiments 1-68.

Embodiment 70 is a pharmaceutical composition comprising the sweetener composition of any one of embodiments 1-68.

Embodiment 71 is a dietary supplement comprising the sweetener composition of any one of embodiments 1-68.

Embodiment 72 is a use of a sweetener composition of any one of embodiments 1-68 in a food product.

Embodiment 73 is a use of a sweetener composition of any one of embodiments 1-68 in a pharmaceutical composition.

Embodiment 74 is a use of a sweetener composition of any one of embodiments 1-68 in a dietary supplement.

Embodiment 75 is a method of sweetening a food product comprising adding a sweetener composition of any one of embodiments 1-68 to the food product.

Embodiment 76 is a method of sweetening a pharmaceutical composition comprising adding a sweetener composition of any one of embodiments 1-68 to the pharmaceutical composition.

Embodiment 77 is a method of sweetening a dietary supplement comprising adding a sweetener composition of any one of embodiments 1-68 to the dietary supplement.

Embodiment 78 is a method of reducing the calorie content of a food product prepared from a recipe comprising:
providing a recipe including an amount of a sugar or sugar syrup; and
preparing the food product according to the recipe, but replacing at least a portion of the amount of the sugar or sugar syrup with a sweetener composition of any one of embodiments 1-68 in an amount of about 50% to about 150% of the portion of the amount of the sugar or sugar syrup.

Embodiment 79 is a method of reducing the glycemic index of a food product prepared from a recipe comprising:
providing a recipe including an amount of a sugar or sugar syrup; and
preparing the food product according to the recipe, but replacing at least a portion of the amount of the sugar or sugar syrup with a sweetener composition of any one of embodiments 1-68 in an amount of about 50% to about 150% of the portion of the amount of the sugar or sugar syrup.

Embodiment 80 is the method of embodiment 78 or embodiment 79, wherein the portion of the amount of the sugar or sugar syrup is replaced with a sweetener composition of any one of embodiments 1-68 in an amount of about 80% to about 120% of the portion of the amount of the sugar or sugar syrup.

Embodiment 81 is the method of embodiment 78 or embodiment 79, wherein the portion of the amount of the sugar or sugar syrup is replaced with a sweetener composition of any one of embodiments 1-68 in an amount of about 100% of the portion of the amount of the sugar or sugar syrup.

Embodiment 82 is a purified hemicellulose composition comprising:
about 82% to about 92% by dry weight of xylan;
about 8% to about 9% by dry weight of xylo-oligosaccharide; and
about 4% to about 5% by dry weight of xylose.

Embodiment 83 is a purified hemicellulose composition comprising:
about 87% to about 88% by dry weight of xylan;
about 8% to about 9% by dry weight of xylo-oligosaccharide; and
about 4% to about 5% by dry weight of xylose.

Embodiment 84 is a purified hemicellulose composition comprising:
about 87.3% by dry weight of xylan;
about 8.5% by dry weight of xylo-oligosaccharide; and
about 4.2% by dry weight of xylose.

Embodiment 85 is the purified hemicellulose composition of any one of embodiments 82-84, wherein the purified hemicellulose composition is off-white.

Embodiment 86 is the purified hemicellulose composition of any one of embodiments 82-85, wherein the purified hemicellulose composition has a molecular weight ($M_w$) of less than 4000 Da.

Embodiment 87 is the purified hemicellulose composition of any one of embodiments 82-86, wherein the purified hemicellulose composition has a polyphenol content of less than about 0.5% by dry weight.

Embodiment 88 is the purified hemicellulose composition of any one of embodiments 82-87, wherein the purified hemicellulose composition has an antioxidant level of less than about 10000 µmol TE/100 g.

Embodiment 89 is the purified hemicellulose composition of any one of embodiments 82-88, wherein the purified hemicellulose composition has a purity of at least 95%.

Embodiment 90 is the purified hemicellulose composition of any one of embodiments 82-89, wherein the xylan comprises about 70% to about 99% by dry weight of arabinoxylan.

Embodiment 91 is the purified hemicellulose composition of any one of embodiments 82-90, wherein the xylan comprises about 80% to about 99% by dry weight of arabinoxylan.

Embodiment 92 is the purified hemicellulose composition of any one of embodiments 82-90, wherein the xylan comprises about 90% to about 99% by dry weight of arabinoxylan.

Embodiment 93 is the purified hemicellulose composition of any one of embodiments 82-90, wherein the xylan comprises about 95% to about 99% by dry weight of arabinoxylan.

Embodiment 94 is a food product comprising the purified hemicellulose composition of any one of embodiments 82-93.

Embodiment 95 is a sweetener composition comprising the purified hemicellulose composition of any one of embodiments 82-93.

Embodiment 96 is a pharmaceutical composition comprising the purified hemicellulose composition of any one of embodiments 82-93.

Embodiment 97 is a dietary supplement comprising the purified hemicellulose composition of any one of embodiments 82-93.

Embodiment 98 is a use of a purified hemicellulose composition of any one of embodiments 82-93 in a food product.

Embodiment 99 is a use of a purified hemicellulose composition of any one of embodiments 82-93 in a sweetener composition.

Embodiment 100 is a use of a purified hemicellulose composition of any one of embodiments 82-93 in a pharmaceutical composition.

Embodiment 101 is a use of a purified hemicellulose composition of any one of embodiments 82-93 in a dietary supplement.

Embodiment 102 is a method of preparing purified hemicellulose comprising:
providing a lignocellulosic biomass;
combining the lignocellulosic biomass with water;
activating the lignocellulosic biomass and water using conditions comprising a first temperature and a first pressure to form a first activated cellulose stream;
washing the first activated cellulose stream to form a washed first activated cellulose stream and a first soluble extract, wherein the first soluble extract comprises hemicellulose; and
purifying the first soluble extract to form purified hemicellulose.

Embodiment 103 is the method of embodiment 102, wherein the first temperature is about 190° C. to about 225° C.

Embodiment 104 is the method of embodiment 102 or embodiment 103, wherein the first pressure is about 200 to about 500 psig.

Embodiment 105 is the method of any one of embodiments 102-104, wherein the activating step has a duration of about 1 to about 30 minutes.

Embodiment 106 is the method of any one of embodiments 102-105, wherein washing comprises washing with water at a temperature of about 40° C. and about 100° C.

Embodiment 107 is the method of any one of embodiments 102-106, wherein purifying comprises one or more of decolorizing, treating with carbon, performing ion exchange (IX), performing reverse osmosis, nanofiltering, or a combination thereof.

Embodiment 108 is the method of embodiment 107, wherein treating with carbon is treating with activated carbon.

Embodiment 109 is the method of embodiment 107, wherein performing IX comprises performing two-stage ion exchange.

Embodiment 110 is the method of embodiment 107, wherein performing reverse osmosis comprises using a nanofiltration membrane.

Embodiment 111 is the method of any one of embodiments 107-110, wherein decolorizing comprises alkaline peroxide treatment.

Embodiment 112 is the method of any one of embodiments 107-110, wherein decolorizing comprises conditions comprising a pH of about 9.5 to about 11.5.

Embodiment 113 is the method of any one of embodiments 107-110, wherein decolorizing comprises conditions comprising a pH of about 10.0 to about 11.0.

Embodiment 114 is the method of any one of embodiments 107-111, wherein decolorizing comprises peroxide treatment.

Embodiment 115 is the method of embodiment 114, wherein peroxide treatment comprises a peroxide loading of about 5% to about 40% based on the dry weight of a xylan component of the hemicellulose.

Embodiment 116 is the method of embodiment 114, wherein peroxide treatment comprises a peroxide loading of about 5% to about 40% based on the dry weight of an arabinoxylan component of the hemicellulose.

Embodiment 117 is the method of any one of embodiments 107-116, wherein decolorizing has a duration of about 1 to about 5 hours.

Embodiment 118 is the method of any one of embodiments 107-116, wherein decolorizing has a duration of about 2 to about 4 hours.

Embodiment 119 is the method of any one of embodiments 107-118, wherein decolorizing is performed at a temperature of about 50° C. to about 100° C.

Embodiment 120 is the method of any one of embodiments 107-118, wherein decolorizing is performed at a temperature of about 60° C. to about 80° C.

Embodiment 121 is the method of any one of embodiments 102-108, wherein purifying comprises, sequentially, decolorizing, treating with carbon, performing ion exchange (IX), and performing reverse osmosis, to form purified hemicellulose.

Embodiment 122 is the method of any one of embodiments 102-121, further comprising adding a reduced-mass hemicellulose to a decolorized hemicellulose.

Embodiment 123 is the method of embodiment any one of embodiments 102-122, further comprising drying the purified hemicellulose.

Embodiment 124 is a purified hemicellulose prepared by the method of any one of embodiments 102-123.

Embodiment 125 is a method of preparing a sweetener composition comprising: providing glucose;
providing purified hemicellulose; and
combining the glucose and the purified hemicellulose to form a sweetener composition.

Embodiment 126 is the method of embodiment 124, wherein the glucose comprises glucose prepared from lignocellulosic biomass.

Embodiment 127 is the method of any one of embodiments 125-126, wherein the purified hemicellulose comprises purified hemicellulose prepared from lignocellulosic biomass.

Embodiment 128 is the method of embodiment 126 or embodiment 127, wherein the lignocellulosic biomass comprises hard wood, soft wood, plant stems, plant stalks, or a combination thereof.

Embodiment 129 is the method of embodiment 126 or embodiment 127, wherein the lignocellulosic biomass comprises wheat straw, wheat flour, wheat bran, corn stover, sugarcane bagasse, hard wood, soft wood, or a combination thereof.

Embodiment 130 is the method of any one of embodiments 125-129, wherein the glucose is prepared by a method comprising steam treatment of a lignocellulosic biomass, enzymatic treatment of a lignocellulosic biomass, or a combination thereof.

Embodiment 131 is the method of any one of embodiments 125-130, wherein the purified hemicellulose is prepared by a method comprising steam treatment of a lignocellulosic biomass, enzymatic treatment of a lignocellulosic biomass, or a combination thereof.

Embodiment 132 is the method of any one of embodiments 125-131, wherein the hemicellulose is prepared by the method of any one of embodiments 102-123.

Embodiment 133 is the method of any one of embodiments 125-132, wherein the purified hemicellulose is the purified hemicellulose of any one of embodiments 82-93.

Embodiment 134 is the method of any one of embodiments 125-133, wherein about 1-20 parts by dry weight of glucose are combined with about 1 part by dry weight of purified hemicellulose.

Embodiment 135 is the method of any one of embodiments 125-133, wherein about 1 part by dry weight of glucose is combined with about 1 part by dry weight of purified hemicellulose.

Embodiment 136 is the method of any one of embodiments 125-135, wherein the purified hemicellulose comprises xylose, xylo-oligosaccharide, and xylan.

Embodiment 137 is the method of any one of embodiments 125-135, wherein the purified hemicellulose comprises hydrolysis products of xylose, hydrolysis products of xylo-oligosaccharide, or hydrolysis products of xylan.

Embodiment 138 is the method of any one of embodiments 125-137, wherein the sweetener composition comprises about 30% to about 75% by dry weight of glucose.

Embodiment 139 is the method of any one of embodiments 125-137, wherein the sweetener composition comprises about 40% to about 60% by dry weight of glucose.

Embodiment 140 is the method of any one of embodiments 125-137, wherein the sweetener composition comprises about 45% to about 55% by dry weight of glucose.

Embodiment 141 is the method of any one of embodiments 125-140, wherein the sweetener composition comprises about 30% to about 75% by dry weight of purified hemicellulose.

Embodiment 142 is the method of any one of embodiments 125-140, wherein the sweetener composition comprises about 40% to about 60% by dry weight of purified hemicellulose.

Embodiment 143 is the method of any one of embodiments 125-140, wherein the sweetener composition comprises about 45% to about 55% by dry weight of purified hemicellulose.

Embodiment 144 is the method of any one of embodiments 125-143 wherein the purified hemicellulose comprises about 20% to about 95% by dry weight of xylan.

Embodiment 145 is the method of any one of embodiments 125-143, wherein the purified hemicellulose comprises about 30% to about 95% by dry weight of xylan.

Embodiment 146 is the method of any one of embodiments 125-143, wherein the purified hemicellulose comprises about 50% to about 95% by dry weight of xylan.

Embodiment 147 is the method of any one of embodiments 125-143, wherein the purified hemicellulose comprises about 80% to about 95% by dry weight of xylan.

Embodiment 148 is the method of any one of embodiments 125-143, wherein the purified hemicellulose comprises about 87% by dry weight of xylan.

Embodiment 149 is the method of any one of embodiments 135-148, wherein the xylan comprises about 70% to about 99% by dry weight of arabinoxylan.

Embodiment 150 is the method of any one of embodiments 135-148, wherein the xylan comprises about 80% to about 99% by dry weight of arabinoxylan.

Embodiment 151 is the method of any one of embodiments 135-148, wherein the xylan comprises about 90% to about 99% by dry weight of arabinoxylan.

Embodiment 152 is the method of any one of embodiments 135-148, wherein the xylan comprises about 95% to about 99% by dry weight of arabinoxylan.

Embodiment 153 is the method of any one of embodiments 125-152, wherein the purified hemicellulose comprises about 5% to about 60% by dry weight of xylo-oligosaccharide.

Embodiment 154 is the method of any one of embodiments 125-152, wherein the purified hemicellulose comprises about 5% to about 30% by dry weight of xylo-oligosaccharide.

Embodiment 155 is the method of any one of embodiments 125-152, wherein the purified hemicellulose comprises about 5% to about 15% by dry weight of xylo-oligosaccharide.

Embodiment 156 is the method of any one of embodiments 125-152, wherein the purified hemicellulose comprises about 9% by dry weight of xylo-oligosaccharide.

Embodiment 157 is the method of any one of embodiments 125-156, wherein the purified hemicellulose comprises about 0.1% to about 25% by dry weight of xylose.

Embodiment 158 is the method of any one of embodiments 125-156, wherein the purified hemicellulose comprises about 0.1% to about 40% by dry weight of xylose.

Embodiment 159 is the method of any one of embodiments 125-156, wherein the purified hemicellulose comprises about 0.1% to about 10% by dry weight of xylose.

Embodiment 160 is the method of any one of embodiments 125-156, wherein the purified hemicellulose comprises about 4% by dry weight of xylose.

Embodiment 161 is the method of any one of embodiments 125-160, wherein the purified hemicellulose comprises glucomannan, maltose, or a combination thereof.

Embodiment 162 is the method of any one of embodiments 125-161, wherein the purified hemicellulose comprises less than 10% by dry weight of glucomannan, maltose, or a combination thereof.

Embodiment 163 is the method of any one of embodiments 125-161, wherein the purified hemicellulose comprises less than 5% by dry weight of glucomannan, maltose, or a combination thereof.

Embodiment 164 is the method of any one of embodiments 125-161, wherein the purified hemicellulose comprises less than 1% by dry weight of glucomannan, maltose, or a combination thereof.

Embodiment 165 is the method of any one of embodiments 125-164, wherein the sweetener composition comprises less than 10% by dry weight of glucomannan, maltose, or a combination thereof.

Embodiment 166 is the method of any one of embodiments 125-164, wherein the sweetener composition comprises less than 5% by dry weight of glucomannan, maltose, or a combination thereof.

Embodiment 167 is the method of any one of embodiments 125-164, wherein the sweetener composition comprises less than 1% by dry weight of glucomannan, maltose, or a combination thereof.

Embodiment 168 is the method of any one of embodiments 125-167, wherein the purified hemicellulose comprises less than 10% by dry weight of a sugar or a sugar polymer that is not xylose, xylo-oligosaccharide, xylan, or a hydrolysis product thereof.

Embodiment 169 is the method of any one of embodiments 125-167, wherein the purified hemicellulose comprises less than 5% by dry weight of a sugar or a sugar polymer that is not xylose, xylo-oligosaccharide, xylan, or a hydrolysis product thereof.

Embodiment 170 is the method of any one of embodiments 125-167, wherein the purified hemicellulose comprises less than 1% by dry weight of a sugar or a sugar polymer that is not xylose, xylo-oligosaccharide, xylan, or a hydrolysis product thereof.

Embodiment 171 is the method of any one of embodiments 125-170, wherein the sweetener composition comprises less than 10% by dry weight of a sugar or a sugar polymer that is not dextrose, xylose, xylo-oligosaccharide, xylan, or a hydrolysis product thereof.

Embodiment 172 is the method of any one of embodiments 125-170, wherein the sweetener composition comprises less than 5% by dry weight of a sugar or a sugar polymer that is not dextrose, xylose, xylo-oligosaccharide, xylan, or a hydrolysis product thereof.

Embodiment 173 is the method of any one of embodiments 125-170, wherein the sweetener composition comprises less than 1% by dry weight of a sugar or a sugar polymer that is not dextrose, xylose, xylo-oligosaccharide, xylan, or a hydrolysis product thereof.

Embodiment 174 is the method of any one of embodiments 125-173, wherein the sweetener composition has a DE of about 35 to about 75.

Embodiment 175 is the method of any one of embodiments 125-173, wherein the sweetener composition has a DE of about 40 to about 65.

Embodiment 176 is the method of any one of embodiments 125-173, wherein the sweetener composition has a DE of 42, 53, or 63.

Embodiment 177 is the method of any one of embodiments 125-173, wherein the sweetener composition has a DE of 42.

Embodiment 178 is the method of any one of embodiments 125-173, wherein the sweetener composition has a DE of 53.

Embodiment 179 is the method of any one of embodiments 125-173, wherein the sweetener composition has a DE of 63.

Embodiment 180 is the method of any one of embodiments 125-179, wherein the sweetener composition has a glycemic index of about 35 to about 50.

Embodiment 181 is the method of any one of embodiments 125-179, wherein the sweetener composition has a glycemic index of about 40 to about 45.

Embodiment 182 is the method of any one of embodiments 125-179, wherein the sweetener composition has a glycemic index of about 42.

Embodiment 183 is the method of any one of embodiments 125-182, wherein the sweetener composition provides about 175 to about 225 calories per 100 g of the sweetener composition.

Embodiment 184 is the method of any one of embodiments 125-182, wherein the sweetener composition provides about 180 to about 200 calories per 100 g of the sweetener composition.

Embodiment 185 is the method of any one of embodiments 125-182, wherein the sweetener composition provides about 190 calories per 100 g of the sweetener composition.

Embodiment 186 is the method of any one of embodiments 125-185, wherein the sweetener composition comprises soluble fiber.

Embodiment 187 is the method of any one of embodiments 125-186, wherein the sweetener composition comprises about 20 g to about 60 g of soluble fiber per 100 g of the sweetener composition.

Embodiment 188 is the method of any one of embodiments 125-186, wherein the sweetener composition comprises about 35 g to about 45 g of soluble fiber per 100 g of the sweetener composition.

Embodiment 189 is the method of any one of embodiments 125-186, wherein the sweetener composition comprises about 41 g of soluble fiber per 100 g of the sweetener composition.

Embodiment 190 is the method of any one of embodiments 125-189, wherein the sweetener composition comprises prebiotics.

Embodiment 191 is the method of any one of embodiments 125-189, wherein the sweetener composition comprises about 2 g to about 6 g of prebiotics per 100 g of the sweetener composition.

Embodiment 192 is the method of any one of embodiments 125-189 wherein the sweetener composition comprises about 3 g to about 5 g of prebiotics per 100 g of the sweetener composition.

Embodiment 193 is the method of any one of embodiments 125-189, wherein the sweetener composition comprises about 4 g of prebiotics per 100 g of the sweetener composition.

Embodiment 194 is the method of any one of embodiments 125-193, wherein the sweetener composition does not comprise insoluble fiber.

Embodiment 195 is the method of any one of embodiments 125-194, wherein the glucose is provided, at least in part, in the form of dextrose.

Embodiment 196 is the method of any one of embodiments 125-195, wherein the sweetener composition is a solid.

Embodiment 197 is the method of any one of embodiments 125-196, wherein the sweetener composition is a syrup.

Embodiment 198 is the method of embodiment 197, wherein the sweetener composition has a viscosity of about 2500 to about 3000 cP at a temperature of 120° C.

Embodiment 199 is the method of embodiment 197, wherein the sweetener composition has a viscosity of about 2700 to about 2900 cP at a temperature of 120° C.

Embodiment 200 is the method of embodiment 197, wherein the sweetener composition has a viscosity of about 2800 cP at a temperature of 120° C.

Embodiment 201 is a sweetener composition prepared by the method of any one of embodiments 125-200.

Embodiment 202 is a food product comprising a sweetener composition prepared by the method of any one of embodiments 125-200.

Embodiment 203 is a pharmaceutical composition comprising a sweetener composition prepared by the method of any one of embodiments 125-200.

Embodiment 204 is a dietary supplement comprising a sweetener composition prepared by the method of any one of embodiments 125-200.

Embodiment 205 is a use of a sweetener composition prepared by the method of any one of embodiments 125-200 in a food product.

Embodiment 206 is a use of a sweetener composition prepared by the method of any one of embodiments 125-200 in a pharmaceutical composition.

Embodiment 207 is a use of a sweetener composition prepared by the method of any one of embodiments 125-200 in a dietary supplement.

Embodiment 208 is a food product comprising:
an amount of the sweetener composition of any one of embodiments 1-68,
wherein the food product has organoleptic properties comparable to a similar food product comprising an amount of an alternate sweetener composition other than the sweetener composition, wherein the amount of the sweetener composition in the food product is from about 50% to about 150% of the amount of the alternate sweetener composition in the similar food product.

Embodiment 209 is the food product of embodiment 208, wherein a dextrose equivalent (DE) of the sweetener composition is from about 50% to about 150% of a DE of the alternate sweetener composition.

Embodiment 210 is the food product of any one of embodiments 208-209, wherein the food product has a calorie content of no more than about 95% of a calorie content of the similar food product.

Embodiment 211 is the food product of any one of embodiments 208-209, wherein the food product has a calorie content of no more than about 92% of a calorie content of the similar food product.

Embodiment 212 is the food product of any one of embodiments 208-211, wherein a serving of the food product provides at least one gram more of dietary fiber than a serving of the similar food product.

Embodiment 213 is the food product of any one of embodiments 208-211, wherein a serving of the food product provides at least two grams more of dietary fiber than a serving of the similar food product.

Embodiment 214 is the food product of any one of embodiments 208-213, wherein the DE of the sweetener composition of any one of embodiments 1-68 is about 30 to about 75.

Embodiment 215 is the food product of any one of embodiments 208-213, wherein the DE of the sweetener composition of any one of embodiments 1-68 is 42, 53, or 63.

Embodiment 216 is a sweetener composition comprising: glucose, xylose, xylo-oligosaccharide, and xylan.

Embodiment 217 is the sweetener composition of embodiment 216, wherein the glucose, xylose, xylo-oligosaccharide, and xylan are obtained from lignocellulosic biomass.

Embodiment 218 is the sweetener composition of embodiment 216 or 217, wherein the glucose is obtained from cellulose, and the xylose, xylo-oligosaccharide, and xylan are obtained from hemicellulose.

Embodiment 219 is the sweetener composition of any one of embodiments 216-218 having a DE of from 35-75.

Embodiment 220 is the sweetener composition of any one of embodiments 216-219 having a DE of 42, 53, or 63.

Embodiment 221 is the sweetener composition of any one of embodiments 216-220 having a DE of 53.

Embodiment 222 is the sweetener composition of embodiment 216, wherein the viscosity is about 2800 at 120° F. (cP).

Embodiment 223 is the sweetener composition of any one of embodiments 216-222, wherein the sweetener composition has fewer calories per gram than corn syrup of the same DE.

Embodiment 224 is a sweetener composition comprising 50.4 wt % dextrose, 2.1 wt % xylose, 4.2 wt % xylo-oligosaccharide, and 43.3 wt % xylan.

Embodiment 225 is a method of making a sweetener from lignocellulosic biomass comprising:
obtaining glucose;
obtaining a purified hemicellulose; and
combining the glucose and the purified hemicellulose.

Embodiment 226 is the method of embodiment 225, wherein the glucose is dextrose obtained by hydrolysis of cellulose.

Embodiment 227 is the method of embodiment 225, wherein the purified hemicellulose is comprised of a mixture of xylose, xylo-oligosaccharide and xylan.

Embodiment 228 is the method of embodiment 225 or 227, wherein the purified hemicellulose is prepared by steam treatment of lignocellulosic biomass.

Embodiment 229 is the method of embodiment 225 or 227, wherein the purified hemicellulose is prepared by enzymatic treatment of lignocellulosic biomass.

Embodiment 230 is the method of embodiments 225 or 227, wherein the purified hemicellulose is prepared by steam treatment and enzymatic treatment of lignocellulosic biomass.

Embodiment 231 is the method of any one of embodiments 225-230, wherein the glucose and the mixture of xylose, xylo-oligosaccharide, and xylan are combined in a proportion to provide a sweetener having a desired dextrose equivalent (DE) value.

Embodiment 232 is the method of embodiment 231, wherein the DE value is in the range of 35-75.

Embodiment 233 is the method of embodiment 232, wherein the DE is in the range of 40-64.

Embodiment 234 is the method of embodiment 233, wherein the DE is 53, 42, or 63.

Embodiment 235 is the method of any one of embodiments 225-234, wherein the glucose and purified hemicellulose are produced in the same processing facility and/or from the same source of lignocellulosic material.

Embodiment 236 is the use of a sweetener according to any one of embodiments 216-224 in a food or beverage.

Embodiment 237 is the use of a sweetener according to any one of embodiments 216-224 in a pharmaceutical or supplement.

Embodiment 238 is a food additive comprising purified hemicellulose where the hemicellulose is purified by sequential treatment with activated carbon (to remove organic impurities) and then two stage ion exchange (cationic/anionic) to remove inorganic impurities.

Embodiment 239 is a food additive of embodiment 238, wherein the purified hemicellulose is partially hydrolyzed to provide a mixture of xylan, xylo-oligosaccharide, and xylose.

Embodiment 240 is the food additive of embodiment 239, wherein the amount of xylan can range from 20-95%, the amount of xylo-oligosaccharide can range from 5-60% and the xylose can range from 1-40%.

Embodiment 241 is the food additive of embodiment 239 or 240, wherein the purified hemicellulose further comprises other sugar polymers such as glucuronoxylan, arabinoxylan, glucomannan, and xyloglucan and sugars derived therefrom.

Embodiment 242 is the food additive of embodiment 239, comprising about 87% xylan, about 9% xylo-oligosaccharide and about 4% xylose.

Embodiment 243 is the food additive of any one of embodiments 238-241, wherein the purified hemicellulose is a source of soluble fiber.

Embodiment 244 is the food additive of any one of embodiments 238-241, wherein the purified hemicellulose is a source of prebiotics.

Embodiment 245 is the use of a food additive according to any one of embodiments 238-244 in a food or beverage.

Embodiment 246 is the use of a food additive according to any one of embodiments 238-244 in a pharmaceutical or supplement.

Embodiment 247 is the sweetener composition of any one of embodiments 216-224, wherein the xylose, xylo-oligosaccharide, and xylan are a source of soluble fiber.

Embodiment 248 is the sweetener composition of any one of embodiments 216-224, wherein the xylose, xylo-oligosaccharide, and xylan are a source of prebiotics.

Embodiment 249 is a purified hemicellulose composition comprising about 85% to about 95% by dry weight of xylan, about 5% to about 25% by dry weight of xylo-oligosaccharide, and about 0% to about 5% by dry weight of xylose.

Embodiment 250 is the purified hemicellulose composition of embodiment 249, wherein the purified hemicellulose composition comprises about 85% to about 93% by dry weight of xylan.

Embodiment 251 is the purified hemicellulose composition of embodiment 249, wherein the purified hemicellulose composition comprises about 85% to about 91% by dry weight of xylan.

Embodiment 252 is the purified hemicellulose composition of embodiment 249, wherein the purified hemicellulose composition comprises about 85% to about 89% by dry weight of xylan.

Embodiment 253 is the purified hemicellulose composition of embodiment 249, wherein the purified hemicellulose composition comprises about 85% to about 87% by dry weight of xylan.

Embodiment 254 is the purified hemicellulose composition of embodiment 249, wherein the purified hemicellulose composition comprises about 87% to about 95% by dry weight of xylan.

Embodiment 255 is the purified hemicellulose composition of embodiment 249, wherein the purified hemicellulose composition comprises about 89% to about 95% by dry weight of xylan.

Embodiment 256 is the purified hemicellulose composition of embodiment 249, wherein the purified hemicellulose composition comprises about 91% to about 95% by dry weight of xylan.

Embodiment 257 is the purified hemicellulose composition of embodiment 249, wherein the purified hemicellulose composition comprises about 93% to about 95% by dry weight of xylan.

Embodiment 258 is the purified hemicellulose composition of embodiment 249, wherein the purified hemicellulose composition comprises about 87% to about 93% by dry weight of xylan.

Embodiment 259 is the purified hemicellulose composition of embodiment 249, wherein the purified hemicellulose composition comprises about 86% to about 88% by dry weight of xylan.

Embodiment 260 is the purified hemicellulose composition of embodiment 249, wherein the purified hemicellulose composition comprises about 88% to about 92% by dry weight of xylan.

Embodiment 261 is the purified hemicellulose composition of embodiment 249, wherein the purified hemicellulose composition comprises about 90% to about 95% by dry weight of xylan.

Embodiment 262 is the purified hemicellulose composition of any one of embodiments 249-261, wherein the purified hemicellulose composition comprises about 5% to about 20% by dry weight of xylo-oligosaccharide.

Embodiment 263 is the purified hemicellulose composition of any one of embodiments 249-261, wherein the purified hemicellulose composition comprises about 5% to about 15% by dry weight of xylo-oligosaccharide.

Embodiment 264 is the purified hemicellulose composition of any one of embodiments 249-261, wherein the purified hemicellulose composition comprises about 5% to about 10% by dry weight of xylo-oligosaccharide.

Embodiment 265 is the purified hemicellulose composition of any one of embodiments 249-261, wherein the purified hemicellulose composition comprises about 5% to about 8% by dry weight of xylo-oligosaccharide.

Embodiment 266 is the purified hemicellulose composition of any one of embodiments 249-261, wherein the purified hemicellulose composition comprises about 10% to about 25% by dry weight of xylo-oligosaccharide.

Embodiment 267 is the purified hemicellulose composition of any one of embodiments 249-261, wherein the purified hemicellulose composition comprises about 15% to about 25% by dry weight of xylo-oligosaccharide.

Embodiment 268 is the purified hemicellulose composition of any one of embodiments 249-261, wherein the purified hemicellulose composition comprises about 20% to about 25% by dry weight of xylo-oligosaccharide.

Embodiment 269 is the purified hemicellulose composition of any one of embodiments 249-261, wherein the purified hemicellulose composition comprises about 10% to about 20% by dry weight of xylo-oligosaccharide.

Embodiment 270 is the purified hemicellulose composition of any one of embodiments 249-261, wherein the purified hemicellulose composition comprises about 6% to about 12% by dry weight of xylo-oligosaccharide.

Embodiment 271 is the purified hemicellulose composition of any one of embodiments 249-261, wherein the purified hemicellulose composition comprises about 8% to about 10% by dry weight of xylo-oligosaccharide.

Embodiment 272 is the purified hemicellulose composition of any one of embodiments 249-271, wherein the purified hemicellulose composition comprises about 0% to about 4% by dry weight of xylose.

Embodiment 273 is the purified hemicellulose composition of any one of embodiments 249-271, wherein the purified hemicellulose composition comprises about 0% to about 2% by dry weight of xylose.

Embodiment 274 is the purified hemicellulose composition of any one of embodiments 249-271, wherein the purified hemicellulose composition comprises about 0% to about 1% by dry weight of xylose.

Embodiment 275 is the purified hemicellulose composition of any one of embodiments 249-271, wherein the purified hemicellulose composition comprises about 0% to about 0.5% by dry weight of xylose.

Embodiment 276 is the purified hemicellulose composition of any one of embodiments 249-271, wherein the purified hemicellulose composition comprises about 0% to about 0.1% by dry weight of xylose.

Embodiment 277 is the purified hemicellulose composition of any one of embodiments 249-271, wherein the purified hemicellulose composition comprises about 0.1% to about 5% by dry weight of xylose.

Embodiment 278 is the purified hemicellulose composition of any one of embodiments 249-271, wherein the purified hemicellulose composition comprises about 0.5% to about 5% by dry weight of xylose.

Embodiment 279 is the purified hemicellulose composition of any one of embodiments 249-271, wherein the purified hemicellulose composition comprises about 1% to about 5% by dry weight of xylose.

Embodiment 280 is the purified hemicellulose composition of any one of embodiments 249-271, wherein the purified hemicellulose composition comprises about 2% to about 5% by dry weight of xylose.

Embodiment 281 is the purified hemicellulose composition of any one of embodiments 249-271, wherein the purified hemicellulose composition comprises about 4% to about 5% by dry weight of xylose.

Embodiment 282 is the purified hemicellulose composition of any one of embodiments 249-271, wherein the purified hemicellulose composition comprises about 0.1% to about 5% by dry weight of xylose.

Embodiment 283 is the purified hemicellulose composition of any one of embodiments 249-271, wherein the purified hemicellulose composition comprises about 0.1% to about 4% by dry weight of xylose.

Embodiment 284 is the purified hemicellulose composition of any one of embodiments 249-271, wherein the purified hemicellulose composition comprises about 0.1% to about 2% by dry weight of xylose.

Embodiment 285 is the purified hemicellulose composition of any one of embodiments 249-271, wherein the purified hemicellulose composition comprises about 0.1% to about 1% by dry weight of xylose.

Embodiment 286 is the purified hemicellulose composition of any one of embodiments 249-271, wherein the purified hemicellulose composition comprises about 0.1% to about 0.5% by dry weight of xylose.

Embodiment 287 is the purified hemicellulose composition of any one of embodiments 249-271, wherein the purified hemicellulose composition comprises about 0.5% to about 4% by dry weight of xylose.

Embodiment 288 is the purified hemicellulose composition of any one of embodiments 249-271, wherein the purified hemicellulose composition comprises about 0.5% to about 2% by dry weight of xylose.

Embodiment 289 is the purified hemicellulose composition of any one of embodiments 249-271, wherein the purified hemicellulose composition comprises about 0.5% to about 1% by dry weight of xylose.

Embodiment 290 is a sweetener composition comprising the purified hemicellulose composition of any one of embodiments 249-289.

Embodiment 291 is a pharmaceutical composition comprising the purified hemicellulose composition of any one of embodiments 249-289.

Embodiment 292 is a dietary supplement comprising the purified hemicellulose composition of any one of embodiments 249-289.

Embodiment 293 is a use of a purified hemicellulose composition of any one of embodiments 249-289 in a food product.

Embodiment 294 is a use of a purified hemicellulose composition of any one of embodiments 249-289 in a sweetener composition.

Embodiment 295 is a use of a purified hemicellulose composition of any one of embodiments 249-289 in a pharmaceutical composition.

Embodiment 296 is a use of a purified hemicellulose composition of any one of embodiments 249-289 in a dietary supplement.

EXAMPLES

Example 1

A lignocellulosic composition comprising partially hydrolyzed hemicellulose combined with dextrose was prepared. The composition comprises dextrose, xylose, xylo-oligosaccharide and xylan in the proportions shown in Table 1.

Table 1 compares the chemical composition of a sweetener derived from lignocellulosic biomass "Lignocellulosic syrup" with a standard corn syrup sweetener. The Lignocellulosic syrup was prepared from partially hydrolyzed hemicellulose composition and glucose derived from cellulose. The cellulose and hemicellulose were derived from the same source of lignocellulosic biomass. The Lignocellulosic syrup composition comprises 50.4% dextrose, 43.3% xylan, 4.2% xylo-oligosaccharide and 2.1% xylose while the corn syrup contains maltose and maltotriose but no xylose or xylo-oligosaccharides. Furthermore, the higher saccharides found in the corn syrup are C6 polysaccharides having a degree of polymerization 2::4, as compared to the C5 polysaccharide, xylan, found in the Lignocellulosic Syrup.

TABLE 1

|  | Lignocellulosic Syrup | Corn Syrup |
|---|---|---|
| DE (Dextrose Equivalent) |  | 53 |
| Percent Dextrose (wt %) | 50.4% |  |
| Dry Solids (OS) (wt %) | 80 | 80 |
| Composition: |  |  |
| Dextrose | 50.4 | 28 |
| Maltose | 0 | 18 |
| Maltotriose | 0 | 13 |
| Xylose | 2.1 | 0 |
| XOS | 4.2 | 0 |
| Higher saccharides | 43.3 (xylan) | 41 (DP4+ C6 saccharides) |

DP4+ = degree of polymerization 2::4

Example 2

Table 2 compares the chemical and physical properties of a Lignocellulosic Syrup comprising 50.4 dextrose and a 53 DE Corn Syrup. As shown in the Table 2, the lignocellulosic syrup composition as described in Table 1 has a viscosity of 2800 at 120° F. (cP) this is comparable to the viscosity of 1800 observed for corn syrup. Viscosity of the compositions was measured using the standard procedure ASTM Method D7042.

TABLE 2

|  | Lignocellulosic Syrup | Corn Syrup |
|---|---|---|
| Dry Solids (OS) (%) | 80 | 80 |
| Viscosity @ 120° F. (cP) | 2800 | 1800 |
| Calories/100 g | 190 | 336 |
| Soluble Fiber (g/100 g) | 41 | 0 |
| Insoluble Fiber (g/100 g) | 0 | 0 |
| Glycemic Index (glucose = 100) | 42 | 105 |
| Prebiotics (g/100 g) | 4 | 0 |
| Appearance | Clear liquid | Clear liquid |
| Taste | Sweet, bland | Sweet, bland |
| Odour | Characteristic | Characteristic |

Although the viscosity of the two sweeteners is similar, the lignocellulosic syrup has significantly fewer calories than the corn syrup. The lignocellulosic syrup also has more soluble fiber and a lower glycemic index. The lignocellulosic syrup is also a source of prebiotics while the corn syrup is not.

The lower calorie sweetener that provides the same degree of sweetness and viscosity can be used to lower the calorie count of the foods into which it is incorporated. This feature is highly advantageous in producing foods and beverages for use with reduced calorie diets which are favored when trying to lose weight or prevent weight gain.

Example 3

It has further been found that glucose produced from lignocellulose has a lower overall carbon emission than glucose produced from starch. In particular, emissions from the production of dextrose from corn stover versus corn grain based dextrose were quantified and are presented in Table 3. As shown in Table 3, corn stover derived dextrose results in lower emission intensities than grain based dextrose. GHG emission reductions are quantified as 0.61 tonnes $CO_2$-e/tonne dextrose.

TABLE 3

Stover Based Dextrose versus Corn Based Dextrose Emissions

| Corn stover dextrose ($CO_2e$ Tonnes/Tonne Dextrose) | Corn grain dextrose ($CO_2e$ Tonnes/Tonne Dextrose) | Net emission Reduction ($CO_2e$ Tonnes/Tonne Dextrose) |
|---|---|---|
| 0.34 | 0.95 | 0.61 |

(Emission reduction = corn grain emission − corn stover emission; positive value = net reduction in emissions.)

Emissions reductions per tonne hemicellulose and lignin have been calculated and compared to emissions from the productions of sugarcane molasses. The results are presented in Table 4. As it can be seen, hemicellulose and lignin result in similar emission intensities to that of sugarcane molasses. The emission intensity for hemicellulose and lignin has been quantified as 0.17 and 0.04 tonnes Core/tonne material higher than sugarcane molasses.

TABLE 4

Hemicellulose and Lignin vs. Cane Molasses

| | Hemicellulose/lignin (CO2e Tonnes/Tonne Dextrose) | Cane molasses (CO2e Tonnes/Tonne Dextrose) | Net emission Reductions (CO2e Tonnes/Tonne Dextrose) |
|---|---|---|---|
| Hemicellulose vs. cane molasses | 0.50 | 0.33 | −0.17 |
| Lignin vs. cane molasses | 0.36 | 0.33 | −0.04 |

The emission intensities are calculated based on a combination of factors including anticipated one time set up and decommissioning emissions and ongoing up-stream, on site and down-stream emissions.

Example 4

Wheat straw was treated using steam for a given temperature and time (activation step; see, e.g., U.S. Patent Application Publication No. US20180119188(A1)), rendering the crude/unpurified hemicellulose water soluble.

The material was water extracted, and the liquid unpurified hemicellulose was removed via vacuum filtration.

Unpurified hemicellulose was then treated with alkaline peroxide conditions and elevated temperature. The pH was about 9.5 to about 11.5 (e.g., about 10.5). A peroxide loading of 5-40% (e.g., 10-20%) (w/w) based on the dry AX content was used. The temperature was between 60° C. and 80° C. (e.g., about 60° C.) for a period of about 2 hours to about 4 hours (e.g., about 2 hours). In general, the higher the temperature, the lower a time is used. Typically, temperatures above 100° C. are not used, as they generally include a pressurized system which is more complicated and expensive. This treatment was employed to remove polyphenols and other color compounds related to lignin and degradation products from the AX molecule. Molecular weight of AX drops during this step, so the reaction can be optimized for a given color removal and molecular weight. Molecular weight can affect physical properties (e.g., viscosity, water/oil binding) as well as prebiotic properties (for example, certain gut bacteria digest certain molecular weight AX differently). Molecular weight and degree of color removal (e.g., the degree of polyphenol left on the AX molecule) can affect downstream purification; membrane separation is a preferred approach, but if the molecular weight of the AX is similar to the molecular weight of removed color compound(s), then other methods can be used such as carbon or ion exchange (IX) (e.g., adsorption separation methods). When using carbon or IX, polyphenols still attached to the AX can adsorb onto carbon and IX, thereby reducing AX recovery (yield).

The alkaline peroxide treated hemicellulose was then purified to remove impurities from AX as follows (the order of these steps can be varied):

a. Activated carbon—can remove color compounds and degradation products as well as protein
b. IX—can remove color, degradation products, salts
c. Nanofiltration and/or reverse osmosis—can remove low molecular weight impurities and water (e.g., to concentrate the product before either evaporation to a syrup or drying)

AX with at purity greater than 95% with little or no polyphenols or color was the final product and can be evaporated to a concentrated syrup, or dried to a powder. Some properties of the prepared AX are shown in Table 5.

TABLE 5

| Property | AX |
|---|---|
| MW (Da) | <4000 |
| Colour | Off white |
| Polyphenol (%) | <0.5% (estimated) |
| Purity (%) | >95% |
| Antioxidant level (umol TE/100 g) | <10000 (estimated) |

Example 6

An improved process was developed to produce sweetener syrups from agricultural coproducts such as corn stalks and wheat straw. The syrups have properties similar to conventional corn syrups, but with reduced calories and increased fiber content. The performance of the 63DE syrup was evaluated in target applications relative to standard commercial ingredients.

63DE corn syrup is typically used in baking and confectionery applications to provide sweetness, texture, and binding. The performance of Comet 63DE syrup relative to a commercial 63DE corn syrup in pie filling, taffy chews, soft cookie, and cereal bar applications was evaluated.

Results:
1. Comet 63DE syrup exhibited good functionality in the pie filling, taffy chew, and cereal bar applications.
2. Comet syrup resulted in noticeably less spread in the soft chocolate chip cookies.
3. A modest (10%) calorie reduction was observed in the Comet pie filling (89 g per serving) and cereal bars, but not in the chews (40 g per serving) or cookies (30 g per serving).
4. A modest sugar reduction was also observed in the Comet pie filling and taffy chews.
5. An increase in fiber (1-3 g per serving) was observed in all Comet applications tested.
6. Substituting Comet syrup and solids for all the conventional corn syrup and sugar used in applications such as taffy chews and cereal bars has potential to yield greater calorie, carbohydrate, and sugar reductions along with increased fiber.

Materials & Methodology:

Cherry Pie Filling. Cherry pie filling formulas are shown in Table 6.

TABLE 6

| | | Control 63DE Corn Syrup | | | Comet 63DE Syrup | | |
|---|---|---|---|---|---|---|---|
| Ingredient | Supplier | Formula (%) | Weight (g) | Syrup Solids (g) | Formula (%) | Weight (g) | Syrup Solids (g) |
| IQF Dark Cherries | Wild Harvest | 49.93% | 250.00 | | 49.35% | 250.00 | |
| Water | | 26.66% | 133.50 | | 25.58% | 129.60 | |
| 63DE corn syrup (80% solids) | Cargill | 11.68% | 58.50 | 40.95 | 0.00% | 0.00 | |
| 63DE syrup (60% solids) | Comet | 0.00% | 0.00 | | 13.47% | 68.25 | 40.95 |
| Sugar | Domino | 8.29% | 41.50 | | 8.19% | 41.50 | |
| Red Food coloring | McCormick | 0.14% | 0.70 | | 0.14% | 0.70 | |

TABLE 6-continued

|  |  | Control 63DE Corn Syrup | | | Comet 63DE Syrup | | |
|---|---|---|---|---|---|---|---|
| Ingredient | Supplier | Formula (%) | Weight (g) | Syrup Solids (g) | Formula (%) | Weight (g) | Syrup Solids (g) |
| Pure-gel food starch | GPC | 3.10% | 15.50 |  | 3.06% | 15.50 |  |
| Salt | Cargill | 0.10% | 0.50 |  | 0.10% | 0.50 |  |
| Citric acid | Tate & Lyle | 0.10% | 0.50 |  | 0.10% | 0.50 |  |
| Total |  | 100.00 | 500.70 |  | 100.00 | 506.55 |  |

Procedure for Cherry Pie Filling:
1. Thoroughly mix starch and 30% of the water. Set aside.
2. Mix sugar, corn syrup, salt, citric acid, 20% of the cherries, and remaining 70% water. Bring slowly to boil.
3. Add starch slurry. Continue heating to 190° F. with stirring.
4. Add remaining cherries and red food coloring. Stir until cherries and coloring are fully incorporated Soft Chocolate Chip Cookies. Soft chocolate chip cookie formulas are shown in Table 7.

TABLE 7

|  | Ingredients | | Control 63DE Corn Syrup | | | | Comet 63DE Syrup | | | |
|---|---|---|---|---|---|---|---|---|---|---|
| Ingredient | Supplier | Solids (%) | Formula (%) | Weight (g) | Total Solids (g) | Water (g) | Formula (%) | Weight (g) | Total Solids (g) | Water (g) |
| Light brown sugar | C&H, retail |  | 12.54% | 62.70 |  |  | 12.54% | 62.70 |  |  |
| Shortening, all purpose | Cargill | 100% | 11.81% | 59.05 | 59.05 |  | 11.81% | 59.05 | 59.05 |  |
| Water |  | 0% | 2.42% | 12.10 |  | 12.10 | 1.34% | 6.71 |  | 6.71 |
| 63DE corn syrup | Cargill | 80.00% | 12.54% | 62.70 | 50.16 | 12.54 |  |  |  |  |
| 63DE syrup | Comet | 60.00% |  |  |  |  | 16.72% | 83.60 | 50.16 | 33.44 |
| Whole egg powder | Oskaloosa Food Products Corp. | 100.00% | 1.08% | 5.39 | 5.39 |  | 1.08% | 5.39 | 5.39 |  |
| Water |  | 0.00% | 3.10% | 15.51 |  | 15.51 | 0.00% | 0.00 |  |  |
| Vanilla extract | McCormick |  | 0.70% | 3.50 |  |  | 0.70% | 3.50 |  |  |
| Flour, all purpose | Gold Medal, retail |  | 26.76% | 133.80 |  |  | 26.76% | 133.80 |  |  |
| Baking soda | Church & Dwight |  | 0.50% | 2.50 |  |  | 0.50% | 2.50 |  |  |
| Salt | Cargill |  | 0.11% | 0.55 |  |  | 0.11% | 0.55 |  |  |
| Semi-sweet chocolate chips | Nestle |  | 28.44% | 142.20 |  |  | 28.44% | 142.20 |  |  |
| Total |  |  | 100.00% | 500.00 | 114.60 | 40.15 | 100.00% | 500.00 | 114.60 | 40.15 |

Procedure:
1. Cream shortening and sugar in KitchenAid mixer for 30 seconds on speed 1, then 1 minute on speed 4. Add egg, corn syrup, vanilla, and water, then mix again for 30 seconds on speed 1 and 1 minute on speed 4
2. Stir in the flour, soda, and salt. Mix on slow speed until dough forms, scraping bowl as needed.
3. Stir in chocolate chips on low speed for 15 seconds or until dispersed consistently throughout dough.
4. Drop 25-27 g balls of dough on parchment lined pan. Bake at 350° F. for 11 minutes. Cool for 1-2 minutes before removing from pan, then place on wire rack to cool completely.

Chews. Taffy Chew formulas are shown in Table 8.

TABLE 8

|  | Ingredient | | Cargill 63DE Corn Syrup | | | Comet 63DE Syrup | | |
|---|---|---|---|---|---|---|---|---|
| Ingredient | Supplier | Solids (%) | Formula (%) | Weight (g) | Solids (g) | Formula (%) | Weight (g) | Solids (g) |
| Water |  |  | 4.80 | 25.20 |  | 0.00 | 0.00 |  |
| Sugar | Domino |  | 40.56 | 213.00 |  | 40.56 | 213.00 |  |
| Corn syrup 43DE | Cargill |  | 23.74 | 124.65 |  | 23.74 | 124.65 |  |
| Corn syrup 63DE | Cargill | 82.50% | 12.83 | 67.35 | 55.56 | 0.00 | 0.00 |  |
| Comet 63DE syrup | Comet | 60.00% | 0.00 | 0.00 |  | 17.63 | 92.60 | 55.56 |
| Coconut oil, organic | Hain Celestial |  | 7.20 | 37.80 |  | 7.20 | 37.80 |  |

TABLE 8-continued

| Ingredient | Supplier | Solids (%) | Cargill 63DE Corn Syrup | | | Comet 63DE Syrup | | |
|---|---|---|---|---|---|---|---|---|
| | | | Formula (%) | Weight (g) | Solids (g) | Formula (%) | Weight (g) | Solids (g) |
| Sweetened condensed milk | Eagle | | 10.15 | 53.30 | | 10.15 | 53.30 | |
| Lecithin | Cargill | | 0.19 | 1.00 | | 0.19 | 1.00 | |
| Red food color | McCormick | | 0.06 | 0.30 | | 0.06 | 0.30 | |
| Flavor | | | 0.48 | 2.50 | | 0.48 | 2.50 | |
| Total | | | 100.00 | 525.10 | | 100.00 | 525.15 | |

Procedure.
1. Mix water, sugar, syrups, coconut oil, and lecithin in pan.
2. While continuously stirring, heat to 252° F.
3. Transfer mixture to heated (150° F.) KitchenAid mixer bowl.
4. Add sweetened condensed milk and mix on speed 4 for two minutes.
5. Add flavor and color. Mix on speed 4 for thirteen minutes.
6. Pour mixture onto cold marble slab to cool.
7. Cut into pieces and wrap.

Cereal Bars. Cereal bar formulas are shown in Tables 9 and 10.

TABLE 9

Control Formula:

| | | | | | 1 Control Bars | | |
|---|---|---|---|---|---|---|---|
| | Ingredient | Supplier | % | g | start (g) | cooked (g) | solids (%) |
| Syrup | Clearsweet 63/43DE corn syrup (80.0% solids) | Cargill | 58.5 | 117.0 | solids 93.6 | 87.2 | |
| | | | | | water 23.4 | 23.0 | −0.4 g water Briefly heated to dissolve |
| | Comet 63DE syrup (60.0% solids) | Comet | | | | | |
| | Sugar | C&H, retail | 32.0 | 64.0 | 64.0 | 64.0 | |
| | Salt | Morton, retail | 1.0 | 2.0 | | | |
| | Canola Oil | Essential Everyday, retail | 6.5 | 13.0 | | | |
| | Topcithin UB Lecithin | Cargill | 1.0 | 2.0 | | | |
| | Vanilla | McCormick, retail | 1.0 | 2.0 | | | |
| | Syrup Total | | 100.0 | 200.0 | 181 | 174.2 | 86.8 target solids |
| Bar | Old Fashioned Rolled Oats | Essential Everyday, retail | 35.0 | 87.5 | | | |
| | Rice Krispies | Kellogg's, retail | 10.0 | 25.0 | | | |
| | 87 brix Syrup (from above) | | 35.0 | 87.5 | | | |
| | Milk Chocolate Chips | Nestle Toll House, retail | 20.0 | 50.00 | | | |

TABLE 10

Comet Formula:

| | | | | | 2 Comet Bars | | |
|---|---|---|---|---|---|---|---|
| | Ingredient | Supplier | % | g | start (g) | cooked (g) | solids (%) |
| Syrup | Clearsweet 63/43DE corn syrup (80.0% solids) | Cargill | | | | | |
| | Comet 63DE syrup (60.0% solids) | Comet | 72.7 | 145.4 | solids 87.2 | 87.2 | |
| | | | | | water 58.2 | 24.0 | −34.2 g water |
| | Sugar | C&H, retail | 32.0 | 72.0 | 72.0 | 72.0 | |

TABLE 10-continued

Comet Formula:

| | | | 2 Comet Bars | | | | |
|---|---|---|---|---|---|---|---|
| | Ingredient | Supplier | % | g | start (g) | cooked (g) | solids (%) |
| | Salt | Morton, retail | 1.0 | 2.0 | | | |
| | Canola Oil | Essential Everyday, retail | 6.5 | 13.0 | | | |
| | Topcithin UB Lecithin | Cargill | 1.0 | 2.0 | | | |
| | Vanilla | McCormick, retail | 1.0 | 2.0 | | | |
| | Syrup Total | | 118.2 | 236.4 | 217.4 | 183.2 | 86.9 target solids |
| Bar | Old Fashioned Rolled Oats | Essential Everyday, retail | 35.0 | 87.5 | | | |
| | Rice Krispies | Kellogg's, retail | 10.0 | 25.0 | | | |
| | 87 brix Syrup (from above) | | 35.0 | 87.5 | | | |
| | Milk Chocolate Chips | Nestle Toll House, retail | 20.0 | 50.00 | | | |
| | Bar Total | | 100.0 | 250.0 | | | |

Procedure.
1. Weigh chocolate chips in a small cup and place in freezer.
2. Weigh rolled oats and rice crisps into bowl. Set aside.
3. Weigh sugar and syrup into small saucepan.
4. Cook syrup over medium-high heat to target solids content (by weight loss).
5. Add salt, oil, lecithin, and vanilla to cooked syrup and stir well.
6. Weigh syrup into oats and rice mixture. Mix well.
7. Add frozen chocolate chips and mix.
8. Press into greased pan. Cool, cut, and wrap bars.

Nutrition Facts

Nutrition facts panels were generated using Genesis software and ingredient database. Comet 63DE nutrition profile was adjusted for 60% solids and used in the analysis.

Results

Cherry Pie Filling

Figure 2:
FIG. 2 shows cherry pie filling prepared with an exemplary sweetener composition according to some embodiments (Comet) and a control cherry pie filling (Control).
Figure 3:
FIG. 3 shows a cherry pie prepared with an exemplary sweetener composition according to some embodiments (Comet) and a control cherry pie (Control).

In this study, Comet 63DE syrup was evaluated on an equal syrup solids basis to a commercial 63DE corn syrup Control in a cherry pie filling application. The Control syrup was 82.5% solids and the Comet 63DE syrup sample was 60% solids, so some water was added to the Control formula to equalize the solids. The appearance and texture of Comet 63DE pie filling was good and comparable to the Control during preparation of the filling and also in the finished baked pie application (FIGS. 2 and 3).

Nutrition facts were calculated for a ⅓ cup (89 g) serving of each filling. The analysis shows that the Comet pie filling has 10% fewer Calories (100 vs 110), slightly lower sugars (21 g vs 24 g) and 3 g of added fiber per serving (FIG. 4).

Fruit-On-the-Bottom Yogurt

A paper exercise was conducted to estimate what a simple strawberry fruit-on-the-bottom formulated with sugar vs Comet 63DE syrup might look like. First, a yogurt formulation that matches the serving size and nutritional profile of Dannon Strawberry Fruit-On-The-Bottom yogurt was created using Genesis nutrition analysis software (Table 11). Then, Comet 63DE syrup (78% dry solids) was substituted for sugar and water at equivalent sweetness using the assumption that Comet 63DE is 70% as sweet as sugar, similar to conventional 63DE corn syrup.

TABLE 11

| SUGAR CONTROL YOGURT | | COMET YOGURT | |
|---|---|---|---|
| Ingredient | % | Ingredient | % |
| Plain lowfat yogurt | 75.0 | Plain lowfat yogurt | 75.0 |
| Sugar | 9.0 | Comet 63DE syrup | 12.8 |
| Water | 7.0 | Water | 3.2 |
| Fresh strawberries | 7.0 | Fresh strawberries | 7.0 |
| Modified food starch | 2.0 | Modified food starch | 2.0 |
| Total | 100.0 | Total | 100.0 |

By making the Comet substitution, Calories were reduced by 8% (120 vs 130 kcals), sugars were reduced by 18% (18 g vs 22 g), and fiber was increased to 5 g per serving. Total Carbohydrates increased slightly, from 25 g to 26 g per serving. The Nutrition Facts panels are shown in FIG. 5 for comparison.

Soft Chocolate Chip Cookies

Corn syrups are used in cookie formulations to provide soft and chewy texture. In this study, Comet syrup was compared to 63DE corn syrup at equal solids and water content. There were no differences observed in the appearance and handling of the raw dough.

Figure 6:
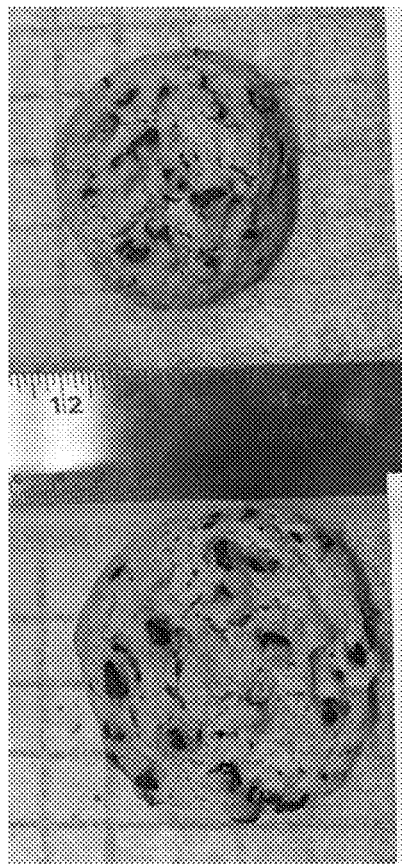
FIG. 6 shows a cookie prepared with an exemplary sweetener composition according to some embodiments (Comet) and a control cookie (Control).
Figure 7:
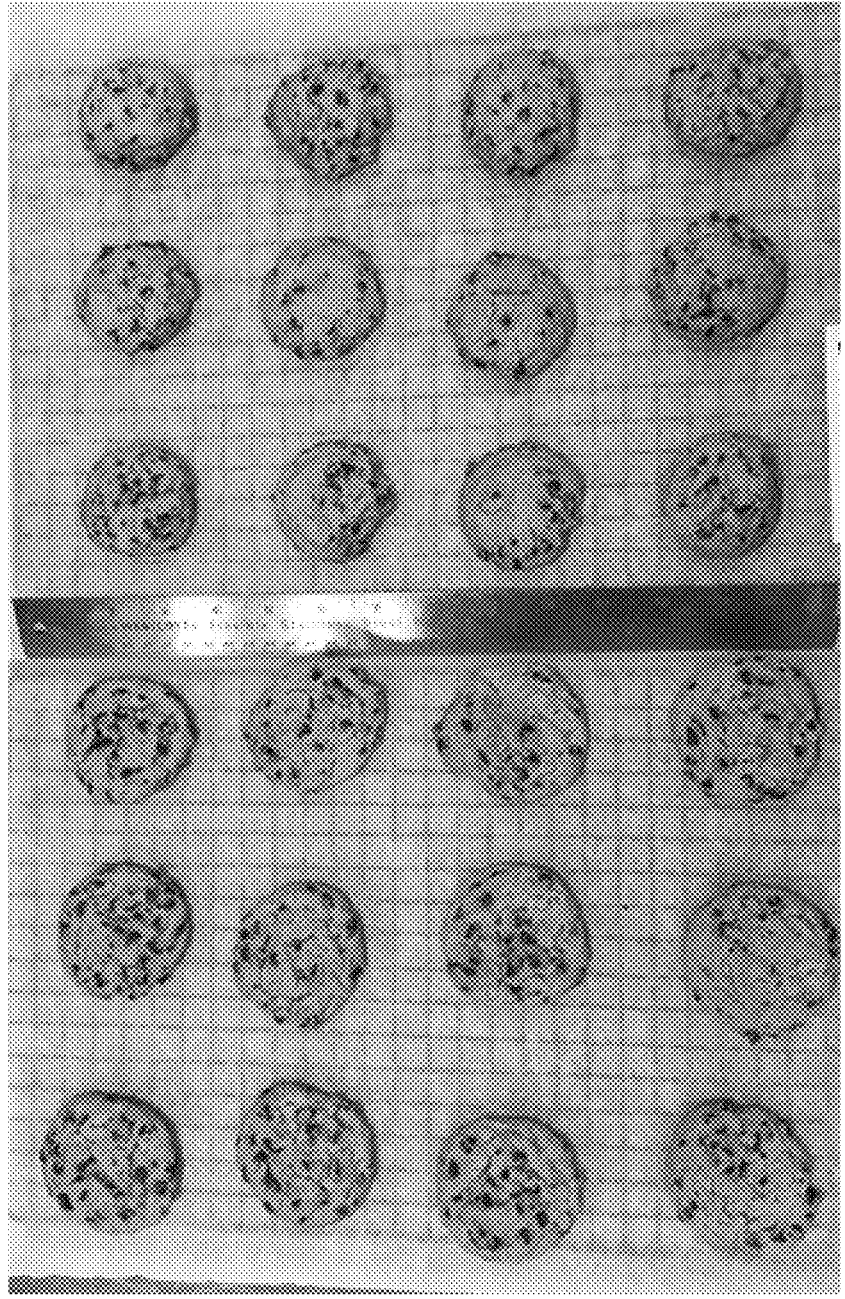
FIG. 7 shows cookies prepared with an exemplary sweetener composition according to some embodiments (Comet) and control cookies (Control).

In the baked cookies, Comet syrup resulted in less spread than the Control syrup. The average diameter (n=11) of the Comet cookies was 2.2 inches compared to 2.6 inches for the Control cookies (Table 12), and this difference was visually apparent (FIGS. 6 and 7). The Comet cookies had a more mounded appearance and cakey texture. The reduced spread observed in the Comet cookies can likely be attributed to fiber in the Comet syrup. It is possible that formula modifications can be made to improve the spread of the Comet cookies. There was no difference in browning or bake time between treatments.

TABLE 12

| Comet 63DE Syrup Dough 25-27 g Diameter of cookie (inches) | Control 63DE Syrup Dough 25-27 g Diameter of cookie (inches) |
|---|---|
| 2.20 | 2.70 |
| 2.10 | 2.55 |
| 2.00 | 2.55 |
| 2.20 | 2.70 |
| 2.20 | 2.45 |
| 2.25 | 2.60 |
| 2.25 | 2.50 |
| 2.15 | 2.50 |
| 2.20 | 2.50 |
| 2.25 | 2.55 |
| 2.25 | 2.55 |
| Average 2.19 | Average 2.56 |

Nutrition facts were calculated for both cookie formulas (FIG. 8). There was no difference in Calories or sugar content of the cookies, but the Comet cookies did contain 2 g of fiber compared to 1 g in the Control.

Taffy Chews

Figure 9:
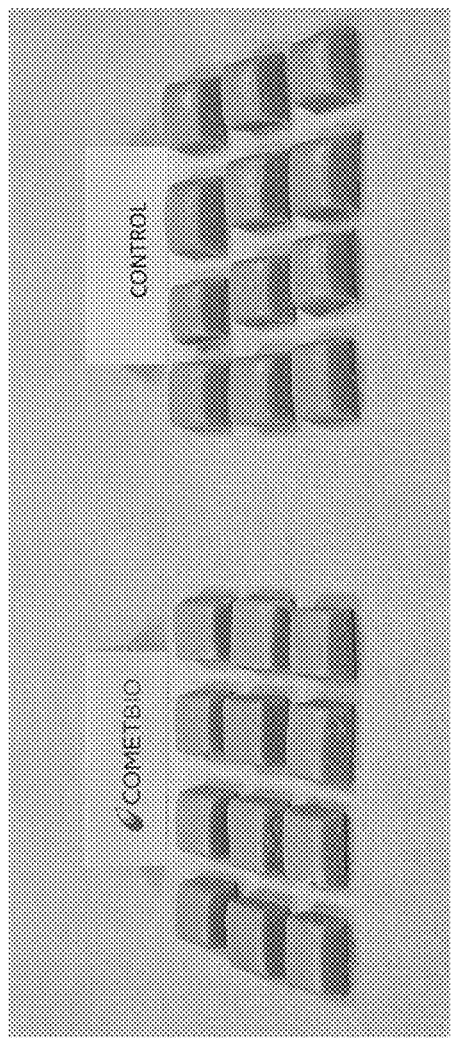
FIG. 9 shows taffy chews prepared with an exemplary sweetener composition according to some embodiments (Comet) and control taffy chews (Control).

63DE corn syrup is used for sweetness, texture, and to prevent sweetness in confectionery chew applications. In this study, Comet syrup was substituted for 63DE corn syrup, at equal solids content, in a 63DE and 42DE blend to produce a chewy candy prototype. The Comet syrup blend performed well in this application and comparable to the 63DE corn syrup Control with respect to appearance and texture (FIG. 9).

Figure 10:
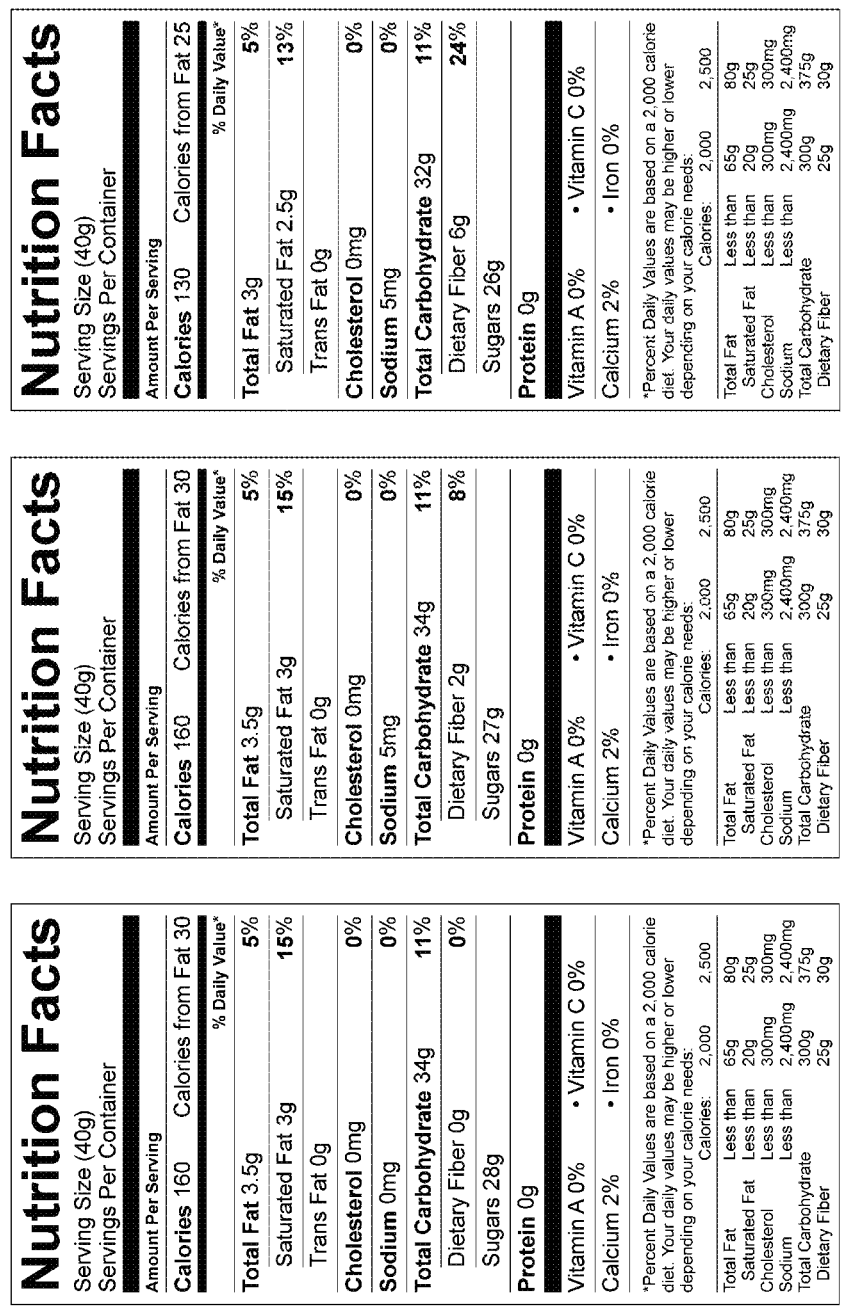
FIG. 10 shows nutrition facts for taffy chews prepared with two exemplary sweetener compositions according to some embodiments (Comet and Comet 63DE&42DE) and for control taffy chews (Control).

No difference in Calories was observed per 40 g serving, but the Comet chews had slightly lower sugar content (27 g vs 28 g) and 2 g of fiber compared to none in the Control (FIG. 10).

Because a fair amount of the sugar and calories in this taffy chew formula is coming from the conventional 42DE corn syrup, a paper exercise was conducted to evaluate the impact of substituting Comet 42DE syrup into this candy chew formula. This exercise demonstrated that a potential reduction in calories (130 vs 160), total carbohydrates (32 vs 34), and sugar (26 vs 28) may be achieved using the combination of both Comet 63DE and Comet 42DE syrups (FIG. 10).

Cereal Bars

Corn syrups are typically used in cereal bars, granola bars, protein bars, etc. for sweetness, binding, and texture. Both 63DE, 42DE syrups, and combinations thereof are used depending on the particular bar formula and desired properties. In this study, Comet 63DE syrup was evaluated relative to conventional 63DE corn syrup, at equal solids content, in a cereal bar application.

Figure 11:
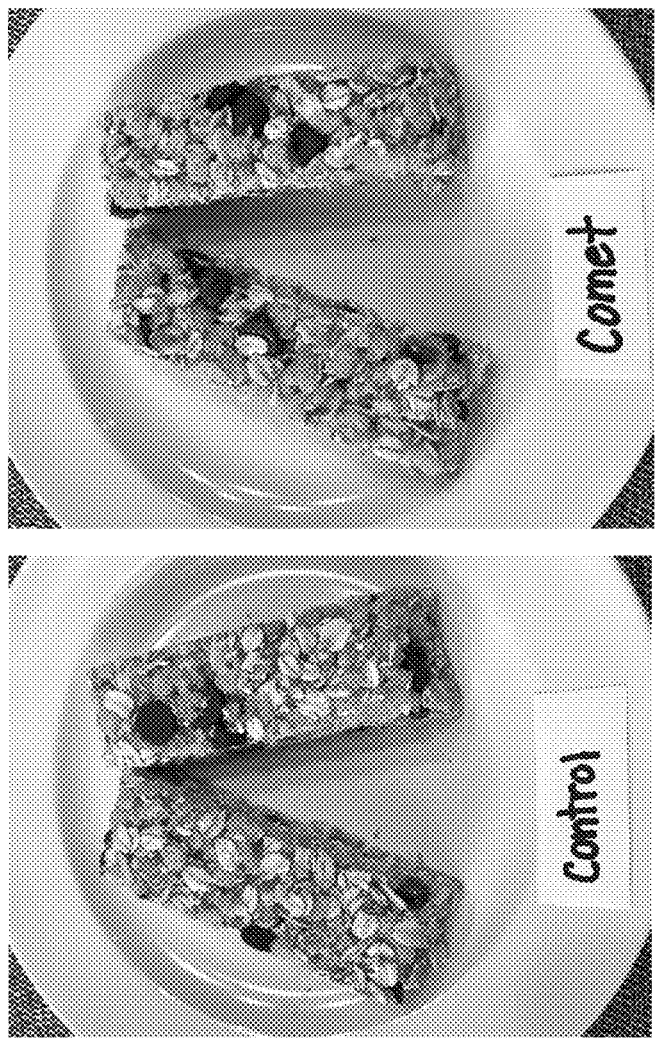
FIG. 11 shows cereal bars prepared with an exemplary sweetener composition according to some embodiments (Comet) and control cereal bars (Control).

Because the Comet 63DE syrup was a lower solids content than the commercial Control, it was cooked longer to drive off more moisture and reach equivalent solids content (87%) to the Control binding syrup. The Comet binding syrup looked creamy white, tasted sweet, and bound the bar particulates together well. The initial performance of Comet 63DE syrup in this applications appears comparable to the Control (FIG. 11).

Comparison of the nutrition facts panels shows that bars made with Comet 63DE have lower calories (150 vs 160) and higher fiber (4 g vs 2 g). No difference was observed in total carbohydrates and sugar (FIG. 12).

Example 7

Wheat straw is treated with steam at about 110° C. to about 150° C. (e.g., about 130° C.) for about 5 minutes to about 30 minutes (e.g., about 15 minutes) at a pressure of about 10 psi to about 20 psi (e.g., about 15 psi) in a pre-activation step. The ratio of steam to wheat straw is about 0.1 to about 1.0 (e.g., about 0.1 to about 0.8, about 0.1 to about 0.5, about 0.1 to about 0.3, about 0.3 to about 1, about 0.5 to about 1, about 0.8 to about 1, about 0.3 to about 0.5, about 0.3 to about 0.8, or about 0.5 to about 0.8). The straw is then treated with steam at about 200° C. to about 240° C. (e.g., about 222° C.) for about 5 minutes to about 20 minutes (e.g., about 10 minutes) at a pressure of about 300 psi to about 350 psi (e.g., about 305 to about 335 psi). The ratio of steam to wheat straw is about 0.1 to about 2.0 (e.g., about 0.1 to about 1.5, about 0.1 to about 1.0, about 0.1 to about 0.5, about 0.5 to about 2.0, about 1.0 to about 2.0, about 1.5 to about 2.0, about 0.5 to about 1.5, about 0.5 to about 1.0, or about 1.0 to about 1.5).

The material is extracted with water at a temperature of about 25° C. to about 95° C. (e.g., about 25° C. to about 75° C., about 25° C. to about 50° C., about 50° C. to about 95° C., about 75° C. to about 95° C., about 25° C. to about 50° C., or about 25° C. to about 75° C.), and the liquid unpurified hemicellulose is removed via vacuum filtration.

Example 8

An unpurified hemicellulose (e.g., the unpurified hemicellulose of Example 7) is treated with alkaline peroxide conditions and elevated temperature (also called decolorizing). The pH is about 9.5 to about 11.5 (e.g., about 10.5). A peroxide loading of 5-40% (e.g., 10-20%) (w/w) based on the dry AX content is used. In some cases, the temperature is between 60° C. and 80° C. (e.g., about 60° C.) for a period of about 2 hours to about 4 hours (e.g., about 2 hours). In general, the higher the temperature, the lower a time is used. Typically, temperatures above 100° C. are not used, as they generally include a pressurized system which is more complicated and expensive to remove polyphenols and other color compounds related to lignin and degradation products from the AX molecule.

The alkaline peroxide treated hemicellulose is then purified to remove impurities from AX as follows (the order of these steps can be varied):

a. Activated carbon—can remove color compounds and degradation products as well as protein
b. IX—can remove color, degradation products, salts
c. Nanofiltration and/or reverse osmosis—can remove low molecular weight impurities and water (e.g., to concentrate the product before either evaporation to a syrup or drying)

In some cases, steps a-c are performed in the order: a, b, c. In some cases, IX includes two-stage ion exchange. AX with at purity greater than 95% with little or no polyphenols or color is the final product and can be evaporated to a concentrated syrup, or dried to a powder. Some properties of the prepared AX are shown in Table 13.

TABLE 13

| Property | AX |
|---|---|
| MW (Da) | <4000 |
| Colour | Off white |
| Polyphenol (%) | <0.5% (estimated) |
| Purity (%) | >95% |
| Antioxidant level (umol TE/100 g) | <10000 (estimated) |

Example 9

A crude hemicellulose preparation is obtained from a commercial provider. The crude hemicellulose preparation (which can have polyphenols attached and a higher molecular weight, e.g., higher than about 20 kDa (e.g., about 30 to about 300 kDa) and can have an alkaline pH (e.g., about 9 to about 14)) is treated with alkaline conditions, either in the presence or absence of an oxidizing agent and additives that can improve the performance of the oxidizing agent and elevated temperature. In some cases, the temperature is between 60° C. and 200° C. (e.g., about 90° C.) for a period of 30 minutes to 8 hours (e.g., about 2 to 4 hours). In general, the higher the temperature, the lower time is used. Typically, temperatures above 100° C. are not used, as they generally include a pressurized system which is more complicated and expensive. The resulting hemicellulose has a molecular weight ($M_w$) of about 1500 to about 4000 Da.

Example 10

The hemicellulose made in Example 9 is combined with a hemicellulose that has undergone decolorizing but no other purification (e.g., the decolorized hemicellulose of Example 8). The combined hemicellulose is treated with activated carbon, purified with ion exchange, and purified with reverse osmosis with nanofiltration, for example, as in Example 8.

Example 11

The hemicellulose made in Example 9 undergoes decolorizing, treated with activated carbon, purified with ion exchange, and purified with reverse osmosis with nanofiltration as described in Example 8.

Other Embodiments

One or more inventions may reside in any combination or sub-combination of the elements or process steps disclosed in any part of this document including its claims.

Although the above description includes reference to certain specific embodiments, various modifications thereof will be apparent to those skilled in the art. Any examples provided herein are included solely for the purpose of illustration and are not intended to be limiting in anyway. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

We claim:

1. A method for preparing a purified hemicellulose composition comprising:
   providing a lignocellulosic biomass;
   combining the lignocellulosic biomass with water;
   activating the lignocellulosic biomass and water using conditions comprising a temperature and a pressure to form an activated cellulose stream;
   washing the activated cellulose stream to form a washed activated cellulose stream and a soluble extract, wherein the soluble extract comprises hemicellulose; and
   purifying the soluble extract to obtain a hemicellulose composition comprising:
   (a) about 82% to about 92% by dry weight of xylan, wherein said xylan comprises about 70% to about 99% of arabinoxylan;
   (b) about 8% to about 9% by dry weight of xylo-oligosaccharide; and
   (c) about 4% to about 5% by dry weight of xylose.

2. The method of claim 1, wherein the purified hemicellulose composition comprises about 87% to about 88% by dry weight of xylan.

3. The method of claim 1, wherein the purified hemicellulose composition has a molecular weight ($M_w$) of less than 4000 Da.

4. The method of claim 1, wherein the purified hemicellulose composition has a polyphenol content of less than about 0.5% by dry weight.

5. The method of claim 1, wherein the purified hemicellulose composition has an antioxidant level of less than about 10000 μmol TE/100 g.

6. The method of claim 1, wherein the purified hemicellulose composition has a purity of at least 95%.

7. The method of claim 1, wherein the xylan comprises about 90% to about 99% by dry weight of arabinoxylan.

8. The method of claim 1, wherein the temperature is about 190° C. to about 225° C.

9. The method of claim 1, wherein the pressure is about 200 to about 500 psig.

10. The method of claim 1, wherein the activating step has a duration of about 1 to about 30 minutes.

11. The method of claim 1, wherein washing comprises washing with water at a temperature of about 40° C. and about 100° C.

12. The method of claim 1, wherein purifying comprises one or more of decolorizing, treating with carbon, performing ion exchange (IX), performing reverse osmosis, nanofiltering, or a combination thereof.

13. The method of claim 12, wherein purifying comprises, sequentially, decolorizing, treating with carbon, performing ion exchange (IX), and performing reverse osmosis, to form purified hemicellulose.

14. The method of claim 1, wherein the lignocellulosic biomass comprises wheat straw, wheat flour, wheat bran, corn stover, sugarcane bagasse, hard wood, soft wood, or a combination thereof.

15. The method of claim 1, further comprising drying the purified hemicellulose.

* * * * *